US005544306A

United States Patent [19]
Deering et al.

[11] Patent Number: 5,544,306
[45] Date of Patent: Aug. 6, 1996

[54] FLEXIBLE DRAM ACCESS IN A FRAME BUFFER MEMORY AND SYSTEM

[75] Inventors: Michael F. Deering, Los Altos; Stephen A. Schlapp, San Jose; Michael G. Lavelle, Saratoga, all of Calif.

[73] Assignee: Sun Microsystems, Inc., Mountain View, Calif.

[21] Appl. No.: 237,307

[22] Filed: May 3, 1994

[51] Int. Cl.$^6$ .................................................... G06F 12/00
[52] U.S. Cl. ............................................. 395/164; 395/162
[58] Field of Search ...................................... 395/162–166

[56] References Cited

U.S. PATENT DOCUMENTS

| | | | |
|---|---|---|---|
| 4,941,107 | 7/1990 | Hasebe | 364/518 |
| 5,131,080 | 7/1992 | Fredrickson et al. | 395/164 |
| 5,388,073 | 2/1995 | Usami et al. | 365/230.03 |

FOREIGN PATENT DOCUMENTS

| | | | |
|---|---|---|---|
| 0427114 | 10/1990 | European Pat. Off. | G09G 1/16 |
| 0447225 | 3/1991 | European Pat. Off. | G09G 1/16 |
| 0548586 | 11/1992 | European Pat. Off. | G06F 15/72 |

OTHER PUBLICATIONS

A. Goris et al. "A Configurable Pixel Cache for Fast Image Generation" IEEE CG&A, Mar. 1987, pp. 24–32.

M. Deering et al. "FBRAM: A new form of Memory Optimized for 3D Graphics" SIGGRAPH 94, Jul. 24–29, 1994, pp. 167–174.

*Primary Examiner*—Mark R. Powell
*Assistant Examiner*—U. Chauhan
*Attorney, Agent, or Firm*—Blakey Sokoloff Taylor & Zafman

[57] ABSTRACT

A frame buffer dynamic random access memory (FBRAM) is disclosed that enables accelerated rendering of Z-buffered graphics primitives. The FBRAM converts read-modify-write transactions such as Z-buffer compare and RBG alpha blending into a write only operation. The FBRAM also implements two levels of internal pixel caches, and a four-way interleaved frame buffer.

61 Claims, 34 Drawing Sheets

FLEXIBLE DRAM ACCESS IN A FRAME BUFFER MEMORY AND SYSTEM

BACKGROUND OF THE INVENTION

1. Field of the Invention

The present invention pertains to the field of computer graphics systems. More particularly, this invention relates to a frame buffer memory device that provides a write-mostly architecture for accelerated rendering operations.

2. Art Background

Prior computer graphics systems typically employ a frame buffer comprised of video random access memory (VRAM) chips. The VRAM chips store a set of pixel data that defines an image for display on display device. Typically, a rendering controller in such a system renders the image and writes the pixel data into the VRAM chips. In such a system, a random access memory digital to analog conversion device (RAMDAC) typically accesses the pixel data from the VRAM chips and performs color lookup table and digital to analog conversion functions on the pixel data. The RAMDAC usually generates a set of video signals for generating the image on the display device.

Prior VRAM chips typically contain a dynamic random access memory (DRAM) array along with a random access port and a serial access port. Typically, the rendering controller accesses the DRAM array of a VRAM chip through the random access port. The RAMDAC typically accesses the DRAM array of a VRAM chip through the serial access port.

Typical prior VRAM chips implement a DRAM page mode access mechanism for the parallel access port. The DRAM page mode access mechanism provides a set of sense amplifiers that enable access to a page of the DRAM array. The page mode sense amplifiers typically map to horizontal rows of the raster scan displayed on the display device. The DRAM page mode access mechanism usually enables relatively high speed access to pixels arranged along the horizontal rows of the raster scan. For example, the DRAM page mode access mechanism enables the rendering controller to perform relatively high speed rendering into a frame buffer comprised of such VRAM chips while drawing horizontal lines or performing block fills.

On the other hand, the DRAM page mode mechanism of such prior VRAM chips delivers severely reduced pixel access speeds if the rendering controller traverses more than two or three rows of the raster scan while drawing a line. Typically, a pixel access that traverses the vertical boundaries of a sense amplifier page causes such a VRAM chip to drop out of page mode and reload the sense amplifies with a new page from the DRAM array. As a result, the rendering of most graphics primitives cause such VRAM chips to drop out of page mode, thereby reducing rendering throughput in such prior systems.

Moreover, the sense amplifiers in such a VRAM chip usually require a precharge time interval before loading from the new rows from the DRAM array. Such a precharge access latency typically occurs each time the VRAM chips drop out of page mode. Such precharge access latencies increase the access time to the DRAM array and severely reduces overall pixel access speeds while the rendering controller draws commonly occurring graphics primitives.

As a consequence, the performance of many prior rendering controllers has surpassed the input bandwidth of typical prior VRAM chips. Some prior computer graphics systems attempt to overcome the bandwidth limitations of prior VRAM chips by increasing the width of input/output busses to the VRAM chips. Other prior computer graphics systems implement interleaved VRAM frame buffers with high interleave factors. Unfortunately, the increased bus widths and high interleave factors for such prior systems greatly increases the costs of such systems.

Typically, the rendering processor in a system that employs prior VRAM chips performs read-modify-write access cycles to the random access port of the VRAM chips while rendering Z buffered images. The typical Z-buffer algorithm for hidden surface rendering requires that the rendering processor read an old Z value from the Z-buffer of the frame buffer, numerically compare the old Z value with a new Z value, and then conditionally replace the old Z and other associated pixel values with the new Z and associated pixel values.

In addition, the rendering controller in such systems typically performs blending functions that require read-modify-write access cycles to the random access port of the VRAM chips. Blending functions are performed during compositing functions and during rendering of transparent objects and anti-aliased lines. A blending operation typically requires that the rendering controller add a fraction of a new pixel value to a fraction of an old pixel value stored in the frame buffer.

Such read-modify-write accesses require that data traverse the random access port input/output pins of the VRAM chips twice during each access. For example, during Z-buffer operations the Z data traverses the data pins of a VRAM chip a first time to read the old Z value, and a second time to write the new Z value. In addition, a read operation to a prior VRAM chip is typically slower than a write operation. Moreover, the data pins of typical VRAM chips impose an electrical turn around time penalty between the read and the write operations. As a consequence, such read-modify-write operations are significantly slower than write operations.

Some prior systems employ complex techniques such as burst batches of read or write operations to reduce electrical turn around delays. Unfortunately, the fragmentation effects of burst batches limit the performance enhancement provided by such techniques. Because of the turnaround time penalty, they are also even slower than the time to perform a read plus the time to perform a write.

Prior computer graphics systems that employ such VRAM chips may implement fast clear operations for a limited number of display windows by providing a fast clear bit plane for each display window having fast clear. The fast clear bit plane indicates the pixels that correspond to cleared display windows. Such systems typically employ the flash write mode of prior VRAMs to clear a set of fast clear bits in one page precharge plus access cycle. Unfortunately, the extra bit planes in such systems increases the size of the frame buffer memory and the number of VRAM chips, thereby increasing system cost. Further, a system that employs such extra bit planes usually provides only a limited number of fast clear windows.

SUMMARY OF THE INVENTION

A frame buffer random access memory (FBRAM) chip is disclosed. The FBRAM chip provides accelerated rendering of Z buffered images in a computer graphics system. The FBRAM chip also provides accelerated pixel blending operations. The FBRAM chip provides circuitry that converts Z buffer compare read-modify-write operations and internal blending read-modify-write operations into a write operation at the input/output pins of the FBRAM chip.

The FBRAM chip contains a multiported high speed pixel buffer accessible by a rendering controller over a rendering bus. The FBRAM chip provides internal comparator circuits that perform Z buffer compare and window ID compare operations. The FBRAM chip also includes internal multiplier accumulator circuits for blending operations. The FBRAM chip internally performs Boolean bit operations for raster operations. The FBRAM chip provides circuitry that enables either internal blend operations or Boolean raster operations to proceed in parallel with the internal Z and window ID compare operations. The multiported pixel buffer provides independent high speed read and write ports for the ALU that enable the ALU to convert internal read-modify-write cycles to write only cycles at the data pins with a throughput rate of one clock per pixel.

The FBRAM chip contains multiple banks of high bit density DRAM arrays, each comprising storage cells that are organized into pages. The FBRAM chip contains sense amplifiers that access an entire page of each DRAM array and that function as a page buffer cache for the DRAM array. The FBRAM chip also provides a duplicate page mechanism for each DRAM array. The duplicate page mechanism enables fast clear operations on an unlimited number display windows, without the cost of extra bit planes.

The sense amplifier page buffers, the multi-ported pixel buffer, and the pixel ALU are organized within a caching hierarchy of the FBRAM chip. The FBRAM caching hierarchy is organized to facilitate graphics access operations. The FBRAM caching hierarchy also matches the bandwidth of the high speed input/output pins of the FBRAM chip to the slower storage cells of the DRAM array. The FBRAM provides a system of separate pixel ALU/pixel buffer and DRAM control pins to enable the rendering controller to manage the internal pixel data flow. The FBRAM chip reduces the cache miss costs by providing wide and fast internal buses.

The FBRAM chip provides circuitry for transmitting the results of the internal comparisons, such as Z-compare, across multiple FBRAM chips. The internal comparison results are transferred in systems that require pixel components such as red, green, blue, and Z pixel representations or components of normals or alpha components that are wider than the internal pixel ALU of a single FBRAM chip. Examples of systems with wide pixel representations include double buffered red, green, blue color, normal components, alpha transparency values, and more than 8 bits per component frame buffers designed for accumulation buffering or for high precision linear color images. In such a system, the comparison results are transferred from an output pin of the FBRAM chip and into an input enable pin of another FBRAM chip that contains other pixel planes. The comparison results are also used internally by the FBRAM chip that buffers the Z planes.

DETAILED DESCRIPTION

Figure 1:
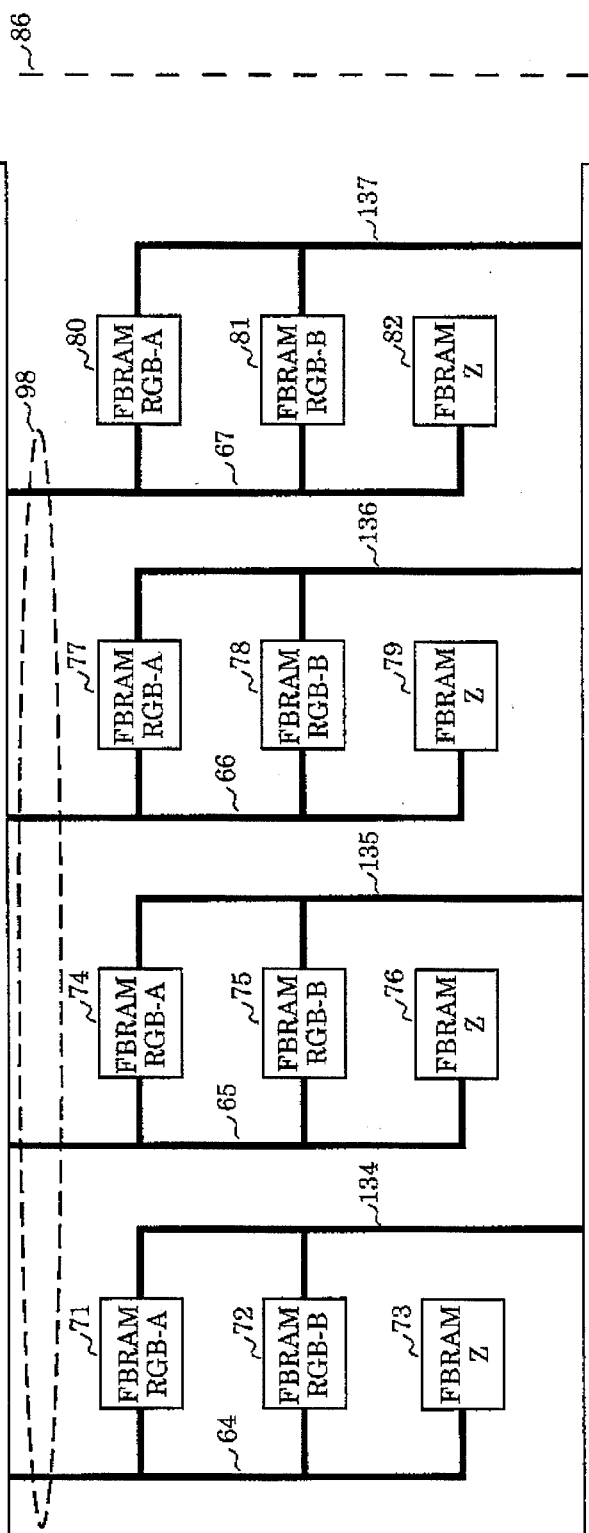
FIG. 1 illustrates a graphics subsystem comprising a set of FBRAM chips, a rendering controller, and video output circuit.

FIG. 1 illustrates a graphics subsystem 86. The graphics subsystem 86 comprises a set of FBRAM chips 71–82, a rendering controller 70, and video output circuit 84. The graphics subsystem 86 is a four way horizontally interleaved frame buffer. The pixel depth of each interleaved portion of the graphics subsystem 86 comprises three FBRAM chips. The graphics subsystem 86 is double buffered and includes red, green, and blue pixel data (RGB) buffers A and B and also a single buffered Z buffer. For one embodiment, the graphics subsystem 86 comprises a 1280×1024×96 bit frame buffer.

The FBRAM chips 71–73 comprise a first interleave portion of the graphics subsystem 86 including an RGB pixel buffer A (FBRAM 71), an RGB pixel buffer B (FBRAM 72), and a Z buffer (FBRAM 73). The FBRAM chips 74–76 comprise a second interleave portion of the graphics subsystem 86 including an RGB pixel buffer A (FBRAM 74), an RGB pixel buffer B (FBRAM 75), and a Z buffer (FBRAM 76). The FBRAM chips 77–79 comprise a third interleave portion of the graphics subsystem 86 including an RGB pixel buffer A (FBRAM 77), an RGB pixel buffer B (FBRAM 78), and a Z buffer (FBRAM 79). The FBRAM chips 80–82 comprise a fourth interleave portion of the graphics subsystem 86 including an RGB pixel buffer A (FBRAM 80), an RGB pixel buffer B (FBRAM 81), and a Z buffer (FBRAM 82).

The rendering controller 70 transfers control information for the FBRAM chips 71–82 and performs data accesses to and from the FBRAM chips 71–82 over a rendering bus 98. The rendering bus 98 comprises a set of interleaved rendering buses 64–67 that enable independent control and access to each interleave portion of the graphics subsystem 86.

Each FBRAM chip 71–82 contains internal ALU and pipelining circuitry for providing a "write-mostly" interface to the rendering controller 70. The write mostly architecture of the FBRAM chips 71–82 minimizes the average memory cycle time on the rendering bus 98 during rendering operations by the rendering controller 70.

For one embodiment, each FBRAM chip 71–82 contains a 10 megabit DRAM array that supports a 320×1024×32 bit deep frame buffer. The DRAM array in each FBRAM chip 71–82 comprises four independent interleaved DRAM banks.

Each FBRAM chip 71–82 also contains a pixel ALU, and a static random access memory (SRAM) pixel buffer. The SRAM pixel buffer in each FBRAM chip 71–82 functions as a pixel cache for accesses by the rendering controller 70 over the rendering bus 98.

Each FBRAM chip 71–82 contains a global bus that enables high bandwidth communication between the four DRAM banks and the SRAM pixel buffer. Each FBRAM chip 71–82 also contains a pair of video buffers that perform CRT refresh operations for a display device.

The pixel ALU in each FBRAM chip 71–82 includes a set of four raster operations units. Each raster operation unit performs selectable raster operations on each individual byte of pixel data transferred to the corresponding SRAM pixel buffer over the rendering bus 98. The pixel ALU in each FBRAM chip 71–82 contains a set of four pixel blending units. Each pixel blending unit combines one byte of old internal pixel values with one byte of new pixel values and related information received over the rendering bus 98. The pixel ALU in each FBRAM chip 71–82 also contains a 32 bit wide match comparator and a 32 bit wide magnitude comparator.

Each FBRAM chip 71–82 includes circuitry that enables concurrent operations involving the DRAM array, the SRAM pixel buffer, the pixel ALU, and an internal set of video buffers. Each FBRAM chip 71–82 includes circuitry that enables pixel data transfer between the DRAM array and the SRAM pixel buffer while the rendering controller 70 accesses the SRAM pixel buffer through the pixel ALU and while the video output circuit 84 reads video data from the video buffers.

The FBRAM chips 71–82 transfer video data to the video output circuit 84 over a set of video buses 134–137. The video output circuit 84 generates a set of corresponding video clocks on the video buses 134–137 that synchronize the transfer of video data from the FBRAM chips 71–82.

The rendering controller 70 writes pixel data to the FBRAM chips 71–82 over the rendering bus 98. The rendering controller 70 also reads pixel data from the FBRAM chips 71–82 over the rendering bus 98. The rendering controller 70 also transfers frame buffer control signals and commands to the FBRAM chips 71–82 over the rendering bus 98. The frame buffer control signals and commands control internal operations of the FBRAM chips 71–82, including the pixel ALU operations, the SRAM pixel buffer and DRAM array operations, and video buffer operations.

For one embodiment, the rendering bus 98 comprises 272 bits of data, plus control and address signals, and the interleaved rendering buses 64–67 each provide a 68 bit pixel data path to the corresponding interleaved portions of the frame buffer 86. For example, bus 64 provides 36 bits of data to the RGB FBRAMs 71 and 72, and another 32 bits of data to the Z FBRAM 73. The 272 bit rendering bus 98 enables transfer of four pixels to the FBRAM chips 71–82 in one bus cycle of the rendering bus 98. Each FBRAM chip 71–82 buffers complete pixel values each comprising 32 bits.

For another embodiment, the rendering bus 98 comprises 144 bits of data, and the interleaved rendering busses 64–67 each provide a 36 bit pixel data path. The rendering bus 64 multiplexes 36 bits of RGB data to the FBRAMs 71 and 72 with 32 bits of Z data to the FBRAM 73. Such a system saves a pin cost on the rendering controller 70 and requires 2 bus cycles when Z buffering is used.

For yet another embodiment, the rendering bus 98 comprises 72 bits of data by multiplexing the rendering bus 64 with the rendering bus 66 and the rendering bus 65 with the rendering bus 67, as well as multiplexing RGB with Z. Such a system is two way interleaved when each pixel requires unique data (shaded images for example) and is four way interleaved when all pixels receive the same data values (filled regions or text for example). Such a system saves even more on pin cost, and delivers lower levels of performance when shading and Z buffering and similar performance when filling regions or drawing text. Other embodiments are possible using differing combinations of data multiplexing.

Figure 2:
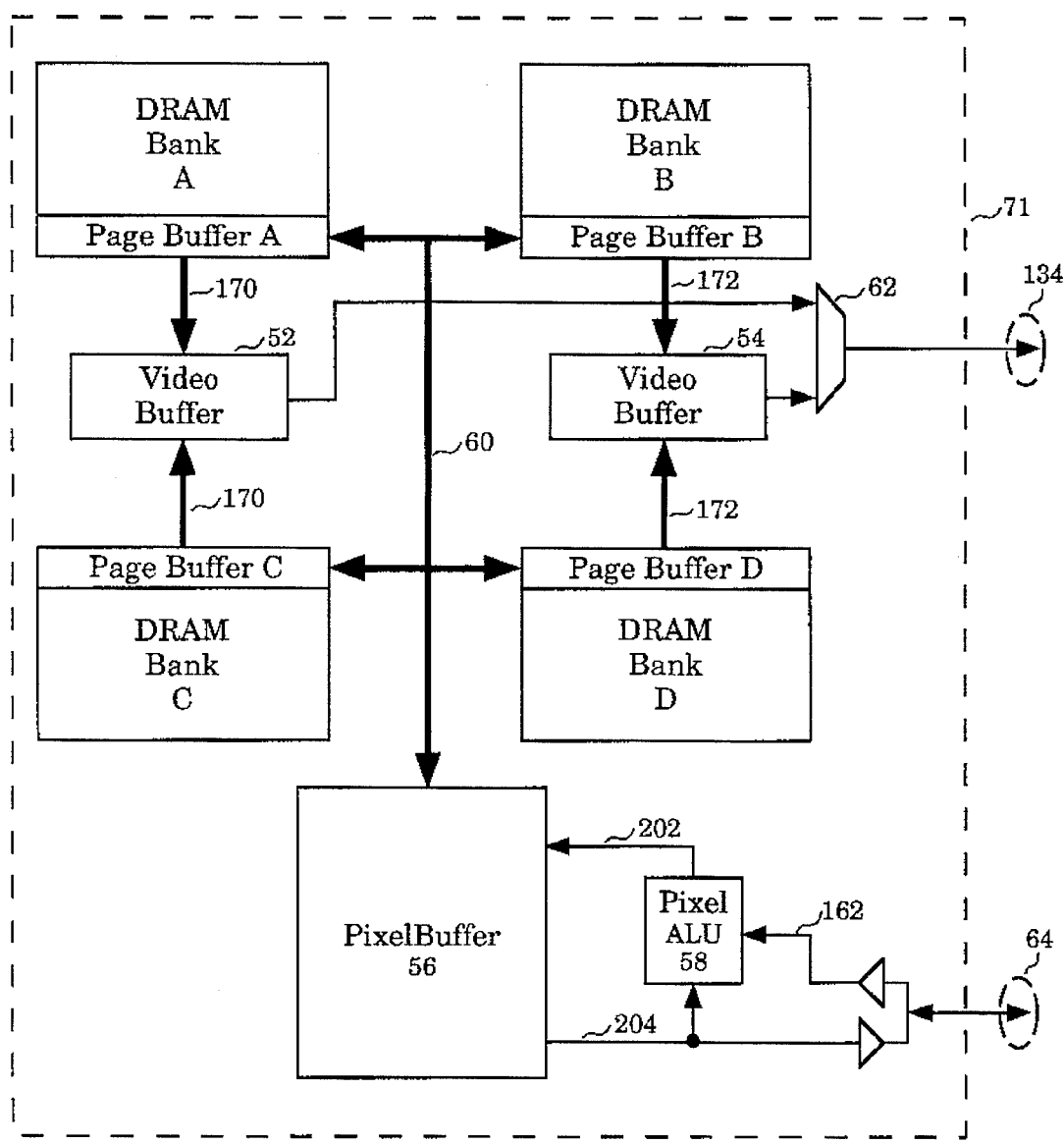
FIG. 2 illustrates an FBRAM chip for one embodiment comprising a set of DRAM banks, a pair of video buffers, a pixel buffer, and a pixel ALU.

FIG. 2 illustrates the FBRAM chip 71 for one embodiment. The FBRAM chip 71 comprises a DRAM array, a pair of video buffers 52 and 54, a pixel buffer 56, and a pixel ALU 58. The FBRAM chip 71 is substantially similar to each of the FBRAM chips 72–82.

The DRAM array in the FBRAM chip 71 comprises a set of four DRAM banks (DRAM banks A–D) and corresponding page buffers A–D. For one embodiment, each DRAM bank A–D comprises a 2.5 megabit DRAM array arranged in 257 pages. Each page comprises 320 words and each word comprises 32 bits.

The page buffers A–D comprise the sense amplifiers of the corresponding DRAM banks A–D. For one embodiment, each page buffer A–D buffers a 320 word page of the corresponding DRAM bank A–D.

The video buffers 52 and 54 buffer video data for transfer to the video output circuit 84 over the video bus 134. The video buffer 52 receives data from the page buffers A and C. The video buffer 54 receives data from the page buffers B and D. The data in the video buffers 52 and 54 is shifted out over the video bus 134 to the video output circuit 84 through a multiplexer 62.

The pixel buffer 56 is a high speed, 3 port static RAM (SRAM) and functions as a level one (L1) pixel cache for the FBRAM chip 71. The associativity parameters for the L1 pixel cache are determined externally and include fully associative mapping. The L1 pixel cache employs a write back policy. The L1 pixel cache comprises a set of L1 cache blocks. The rendering controller 70 performs data writes to each L1 cache block. The multiple writes are accumulated in each L1 cache block for subsequent transfer to the DRAM banks A–D through a level two (L2) pixel cache.

The pixel buffer 56 provides an ALU read port 204 and an ALU write port 202. The rendering controller 70 performs pipelined write operations over the interleaved rendering bus 64 to the ALU 58. The pixel input data 162 from the input/output pins of the FBRAM chip 71 provides source data for the pixel ALU 58. The pixel ALU 58 performs a selected pixel processing function and transfers write port data 202 into the ALU write port of the pixel buffer 56.

If the desired pixel processing function requires a read-modify-write operation, the pixel ALU 58 obtains the read data from the read port 204, performs the modification by merging the source data 162 with the read data 204, and then writes the result to the pixel buffer write port 202. The pixel buffer 56 read and write ports enable simultaneous one clock read and write operations that provide one-clock pipelined writes on the rendering bus 64 to accomplish one-clock pipelined read-modify-write cycles.

The rendering controller 70 reads data from the read port of the pixel buffer 56 over the interleaved rendering bus 64. The read port data 204 from the pixel buffer 56 is accessible on the interleaved rendering bus 64 through the input/output pins of the FBRAM chip 71.

The pixel buffer 56 provides a global read/write port 208 for block transfer operations over the global bus 60. The rendering controller 70 can cause the ALU read port, the ALU write port, and the global read/write port of the pixel buffer 56 to be active simultaneously.

For one embodiment, the pixel buffer 56 contains a 2048 bit SRAM buffer and a corresponding dirty tags memory. The 2048 bit SRAM buffer is organized into eight 256 bit L1 cache blocks. Each L1 cache block buffers eight words each comprising 32 bits. Each L1 cache block buffers pixel data for a 2 wide by 4 high rectangle of 32-bit pixels. The eight L1 cache blocks also correspond to eight sets of 32 bit dirty tag bits in the dirty tags memory. The global read/write port is 256 bits wide, and the ALU read and write ports are each 32 bits wide.

The pixel ALU 58 enables pipelined read-modify-write operations into the pixel buffer 56 over the interleaved rendering bus 64. The pipelined read-modify-write operations include Z-buffer compare, RGB alpha blending, and Boolean operations. The global read/write port of the pixel buffer 56 enables parallel transfer of an entire L1 cache block between the page buffers A–D and the pixel buffer 56 over a global bus 60.

The page buffers A–D comprise the L2 pixel cache. The L2 pixel cache is directly mapped to the DRAM banks A–D. Each page buffer A–D maps to one of the pages of the corresponding DRAM bank A–D. For one embodiment, an L2 pixel cache entry comprises 320 words of 32 bits for each word. Each L2 cache entry is arranged as a 20 wide by 16 high rectangle of pixels. The L2 pixel cache employs a write through policy. Pixel data written into a L2 pixel cache entry over the global bus 60 is transferred immediately into the corresponding page of the corresponding DRAM bank A–D.

The global bus 60 enables communication between the L1 pixel cache and the L2 pixel cache. For one embodiment, the global bus 60 is 256 bits wide and enables the parallel transfer of a 2×4 pixel block between the L1 pixel cache and L2 pixel cache.

Each DRAM bank A–D contains a sense amplifier bus comprising a set of bit lines. The sense amplifier buses couple the page buffers A–D to the DRAM banks A–D. For one embodiment, each sense amplifier bus enables the parallel transfer of a 20×16 (with 32 bit pixels) pixel rectangle from the DRAM banks A–D to the corresponding L2 pixel caches.

The rendering controller 70 interleaves accesses to the DRAM banks A–D via the control and address signals of the interleaved rendering bus 64. The rendering controller overlaps precharge operations on the sense amplifies of one of the page buffer A–D with rendering operations into another of the DRAM banks A–D. The rendering controller 70 also interleaves access page operations to one of the DRAM banks A–D with rendering operations into another of the DRAM banks A–D.

The FBRAM chip 71 provides internal mechanisms for accelerating rectangle fill operations. The rectangle fill mechanisms fill portions of the DRAM banks A–D with a constant value or to a repeating pattern.

One rectangle fill method employs high bandwidth data transfers over the global bus 60. An L1 pixel cache block is initialized to a constant color or pattern. Thereafter, the L1 pixel cache block is repeatedly copied to different blocks within the L2 pixel cache at the data transfer rates available over the global bus 60. Such a rectangle fill mechanism avoids the bandwidth constraints at the input/output pins of the FBRAM chip 71. In one embodiment, the global bus transfer rate is one half of the input pin transfer rate and the L1 cache block size is eight times greater than the input pin width. The next result is that this block filling mode is 4 times faster than the input pin fill rate. In addition, the interleaved FBRAM chips 71–82 yield four times the rectangle fill rate as a single FBRAM chip. The combined effect of this block fill method and four way interleaving is a 16 times faster filling rate.

Another rectangle fill method employs the high bandwidth data paths between the page buffers A–D and the corresponding DRAM banks A–D. An L1 pixel cache block is initialized to a constant color or pattern. The L1 pixel cache block is then copied to all blocks in all four pages of the L2 pixel cache over the global bus 60. The four pages of the L2 pixel cache are then copied to the corresponding DRAM banks A–D in an interleaved manner, using a page duplication cycle.

For one embodiment, the page duplication rate is one quarter the input pin transfer rate and the L2 page buffer size is 320 times greater than the input pin width. The page filling mode is 80 times faster than the input pin fill rate. The page fill mode combined with four way interleaving, yields a 320 times faster filling rate.

A read-modify-write operation in the FBRAM chip 71 normally comprises a prefetching read operation from the L2 pixel cache into the L1 pixel cache over the global bus 60, a modify operation on the L1 pixel cache, and then a copyback write operation to the L2 pixel cache over the global bus 60. The FBRAM chip 71 provides for optional skipping of the prefetching read operation. Such skipping of the prefetch operation doubles performance for write-only rendering operations by the rendering controller 70. Examples of write-only rendering operations includes text and simple 2D graphics rendering operations in a windowing system.

The FBRAM chip 71 provides one set of pixel port control and address input/output interface pins 114 for accessing the pixel buffer 56 via the ALU 58 and the read and write ports 204 and 202 and an independent set of DRAM port control and address input/output interface pins 112 for accessing the DRAM banks A–D via the global bus 60 or the video buffers 52 and 54. The independent sets of control and address pins enable operations for the DRAM banks A–D to proceed in parallel with ALU operations to the pixel buffer 56. The FBRAM chip 71 also provides another independent set of video port control interface pins 110 for video operations involving the video buffers 52 and 54 and the serial outputs 134.

Figure 3:
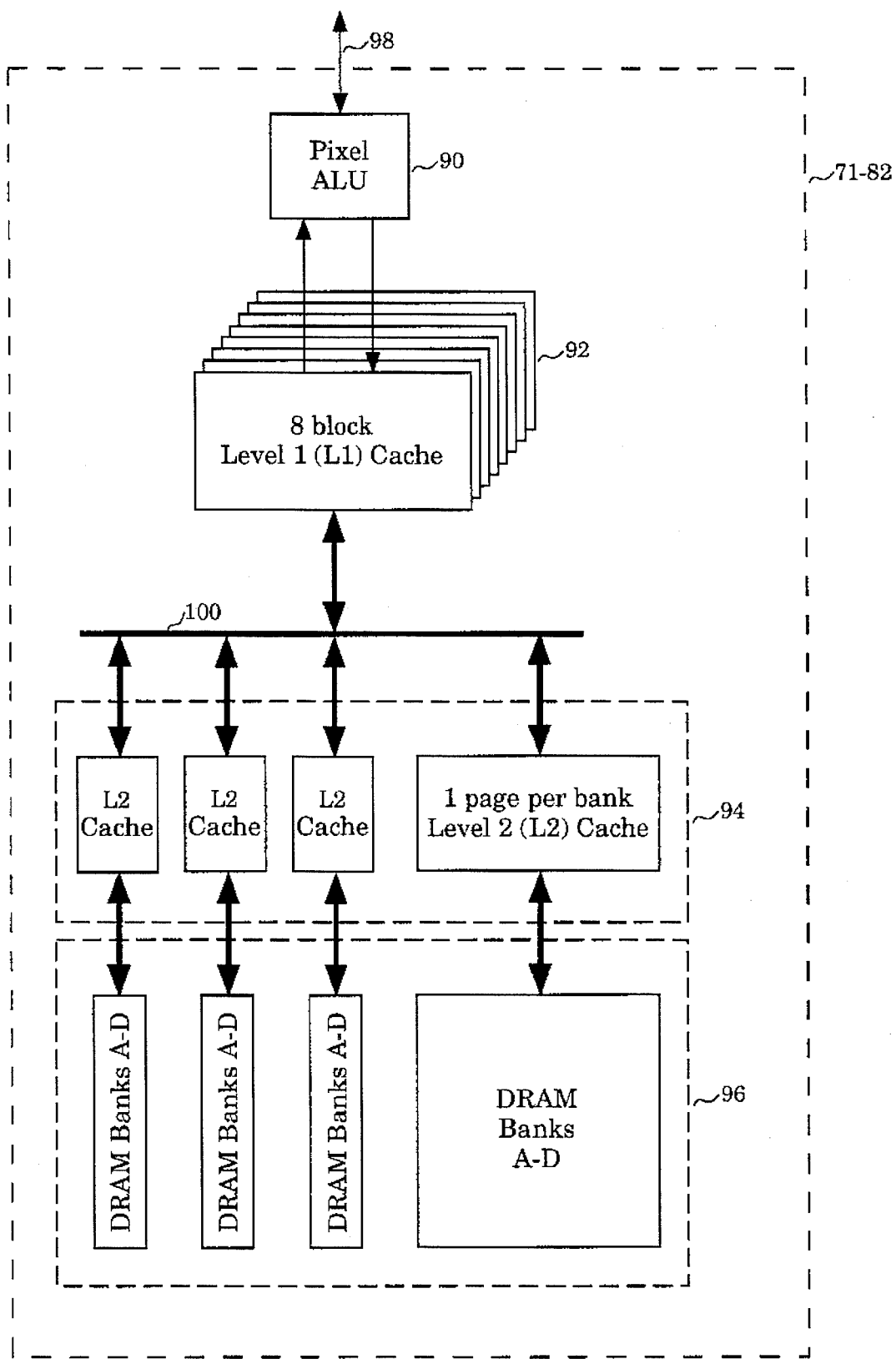
FIG. 3 is a logical block diagram which illustrates a frame buffer arrangement provided a set of FBRAM chips for one embodiment.

FIG. 3 is a logical block diagram which illustrates a frame buffer arrangement provided the FBRAM chips 71–82 for one embodiment. The FBRAM chips 71–82 function as one large frame buffer memory system accessible over the rendering bus 98. The four horizontal interleaves of the FBRAM chips 71–82 increase the number of input/output data pins on a rendering bus 98 by a factor of four in comparison to a non interleaved FBRAM frame buffer.

The FBRAM chips 71–82 enable the simultaneous writing of pixel data for four pixels over the rendering bus 98 including pixel components such as red, green, blue, and Z values. The FBRAM chips 71–82 also enable the simultaneous blending of pixel data for four pixels including pixel components such as red, green, blue, and Z values. The FBRAM chips 71–82 also enable the simultaneous Z buffering for four pixels.

The four horizontal interleaves of the frame buffer 86 effectively increases the size of the internal caches and the internal buses of the FBRAM chips 71–82 by a factor of four in the horizontal dimension. The FBRAM chips 71–82 effectively comprise a logical L1 pixel cache 92, a logical L2 pixel cache 94, and a set of logical DRAM 96. The logical L1 pixel cache 92 comprises the L1 pixel caches of the FBRAM chips 71–82. The logical L1 pixel cache 92 effectively comprises eight logical L1 cache blocks, wherein each logical L1 cache block is 8 pixels wide by 4 pixels high. The logical L2 pixel cache 94 effectively comprises the L2 pixel caches of the FBRAM chips 71–82. The entries of the logical L2 pixel cache are effectively 80 pixels wide by 16 pixels high.

The FBRAM chips 71–82 effectively comprise a logical global bus 100 which includes the aggregate width of the global buses in the FBRAM chips 71–82. The logical global bus 100 enables the parallel transfer of an 8×4 pixel block between the L1 pixel cache and L2 pixel cache.

The memory hierarchy of the FBRAM chips 71–82 comprises the logical L1 pixel cache 92, the logical L2 pixel cache 94, and the logical DRAM banks 96. The rendering controller 70 accesses up to four pixels during each cycle on the rendering bus 98. The rendering controller 70 performs concurrent operations to the frame buffer 86 by launching operations to different levels of the memory hierarchy.

The highest pixel access speeds to the FBRAM chips 71–82 occur if the pixels addressed over the rendering bus 98 are present in the logical L1 pixel cache 92. If a pixel addressed over the rendering bus 98 is not present in the logical L1 pixel cache 92, then the missing block corresponding to the addressed pixel is transferred from the logical L2 pixel cache 94 to the logical L1 pixel cache 92. The rendering operation to the addressed pixel is performed, and the missed block is written back to the logical L2 pixel cache 94. If the logical L2 pixel cache 94 does not contain the required block, then the required block is read from the logical DRAM 96.

Similarly, the L2 pixel cache is 80×16 pixels in size when interleaved as in FIGS. 1 and 3. The cost of a L2 cache miss is 4 to 8 clocks in one embodiment. When traveling vertically the probability of a miss is only 1 in 16 and is only 1 in 80 when traveling horizontally. The miss costs are overlapped with hits by using the separate DRAM controls and by interleaving the DRAM banks A–D.

Figure 4:
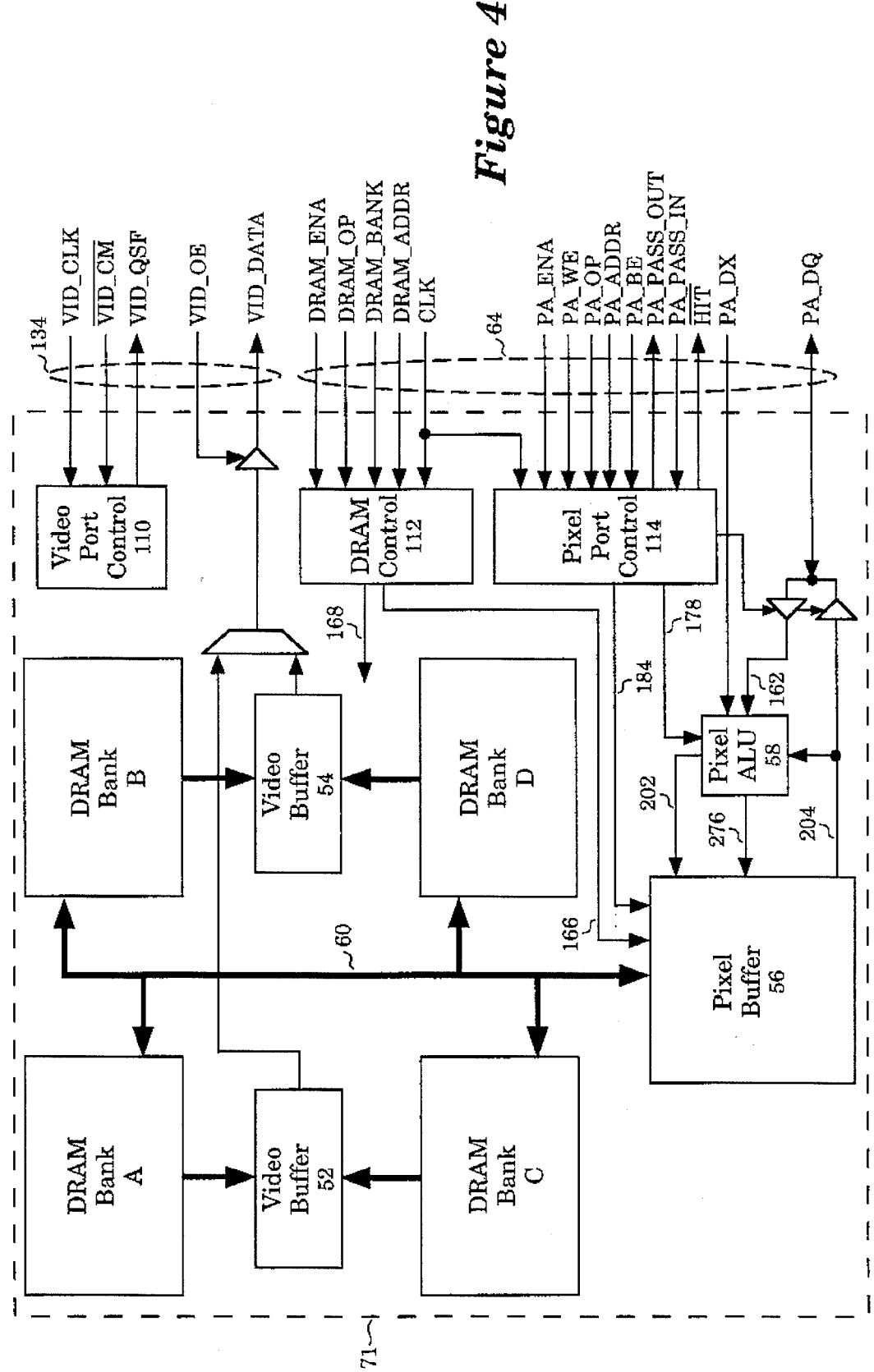
FIG. 4 illustrates the input/output interface to an FBRAM chip for one embodiment, including a pixel port control interface for the pixel port functions, a video port control interface for the video functions, and a DRAM control interface for DRAM functions.

FIG. 4 illustrates the input/output interface to the FBRAM chip 71 for one embodiment. The input/output interface comprises a pixel port control interface 114 for the pixel port operations, a video port control interface 110 for the video operations, and a DRAM control interface 112 for the DRAM operations in the FBRAM chip 71.

The pixel port access operations for the pixel ALU 58 and the pixel buffer 56 are controlled by a set of pixel port address and control signals. The operations for the DRAM banks A–D are controlled by a set of DRAM control signals. The functions of the video buffers 52 and 54 are controlled by a set of video control signals. The three sets of separate controls, along with the four way interleaved DRAM banks, enable up to six simultaneous operations for the FBRAM chip 71.

Table 1 lists the pixel port address and control signals for one embodiment. The rendering controller 70 controls pixel port operations to the pixel ALU 58 and the pixel buffer read and write ports 204 and 202 via the pixel port address and control signals. The rendering controller 70 asserts the PA_ENA[1..0] signals to initiate an operation for the pixel ALU 58 and pixel buffer ports 204 and 202. If either PA_ENA signal is unasserted, then the remaining pixel port control signals are ignored.

TABLE 1

| Signal Name | Pin Count | I/O | Description |
| --- | --- | --- | --- |
| PA_ENA | 2 | I | Enable Pixel ALU op |
| PA_WE | 1 | I | Pixel ALU Read/Write pin |
| PA_OP | 3 | I | Pixel ALU Opcode |
| PA_ADDR | 6 | I | Read/Write Address |
| PA_BE | 4 | I | Byte Write Output Enables |
| PA_DQ | 32 | I/O | Data pins |
| PA_DX | 4 | I | Data Extension pins for blend |
| PA_PASS_OUT | 1 | O | Compare output |
| PA_PASS_IN | 1 | I | Compare input |
| HIT | 1 | O | Picking logic flag |

The rendering controller 70 asserts the PA_WE signal to indicate a write operation. The PA_WE signal indicates a read operation if unasserted. The rendering controller 70 drives the PA_OP[2..0] signals in combination with the PA_WE signal to specify an operation for the pixel ALU 58. The rendering controller 70 employs the PA_ADDR[5..0] signals to specify the pixel buffer read and write port 204 and 202 addresses for the pixel ALU 58 operation.

The rendering controller 70 drives the PA_BE[3..0] signals during read and write operations including register writes and dirty tag writes. During a read operation, the PA_WE is unasserted and the PA_BE signals provide output byte enable signals. During a write operation, the PA_WE is asserted and the PA_BE signals provide write byte enable signals. The PA_BE[0] signal controls the PA_DQ[7..0] data byte, the PA_BE[1] signal controls the PA_DQ[15..8] data byte, the PA_BE[2] signal controls the PA_DQ[23..16] data byte, and the PA_BE[3] signal controls the PA_DQ [31..24] data byte.

The rendering controller 70 employs the PA_DQ[31..0] signals during read and write operations for the FBRAM chip 71. During write operations, the PA_DQ signals are transferred to the pixel ALU 58. During read operations, the PA_DQ signals are provided by the read port of the pixel buffer 56. During internal copy and vertical scroll operations, the rendering controller 70 supplies a write address with the PA_DQ[29..24] signals.

During ALU writes which perform blending, the rendering controller 70 uses the PA_DX[3..0] signals to provide extra high order data bits for the data bytes transferred via the PA_DQ signals. The PA_DX[0] signal provides a high order bit for the PA_DQ[7..0] byte. Similarly, the PA_DX [1] signal is a high order bit for the PA_DQ[15..8] byte, the PA_DX[2] signal is a high order bit for the PA_DQ [23..16], and the PA_DX[3] signal is a high order bit for the PA_DQ[31..24] byte.

The PA_PASS_IN and the PA_PASS_OUT signals enable coordination of the pass/fail compare unit results among the FBRAM chips 71–82. The compare result from the internal compare unit of the FBRAM chip 71 is transferred via the PA_PASS_OUT signal. The PA_PASS_OUT signal indicates whether an internal compare test failed during stateful write operations to the pixel buffer 56. Data is written into the pixel buffer 56 during a stateful data write operation if the PA_PASS_IN signal indicates pass and the PA_PASS_OUT signal indicates pass.

Table 2 describes the DRAM address and control signals for one embodiment. The rendering controller 70 initiates DRAM access operations for the DRAM banks A–D, the global bus 60, the pixel buffer global bus port, and the video buffers 52 and 54 via the DRAM address and control signals. The rendering controller 70 specifies a DRAM operation via the DRAM_OP[2..0] signals. The rendering controller 70 asserts the DRAM_ENA on a rising edge of the master clock CLK to initiate an operation to one of the DRAM banks A–D during the next CLK cycle.

TABLE 2

| Signal Name | Pin Count | I/O | Description |
| --- | --- | --- | --- |
| DRAM_ENA | 1 | I | Enable DRAM Operation next clock |
| DRAM_OP | 3 | I | DRAM Access Opcode |
| DRAM_BANK | 2 | I | Bank Select for DRAM Operation |
| DRAM_ADDR | 9 | I | Address for DRAM Operation |

The rendering controller 70 selects one of the DRAM banks A–D with the DRAM_BANK[1..0] signals. The rendering controller 70 selects a page in the selected DRAM bank A–D via the DRAM_ADDR[8..0] signals. In addition, the rendering controller 70 employs the DRAM_ADDR [8..0] signals to specify the pixel buffer global bus port address during block transfer operations over the global bus 60, and to specify transfers of video data from a DRAM page to one of the video buffers 52 and 54.

Table 3 lists the video control signals for one embodiment. The video control signals are employed to transfer video data to the video output circuit 84 over the video bus 134. The video data transferred over the video bus 134 is synchronized by the VID_CLK signal. The VID_CLK signal is a gated or free-running video shift clock. The $\overline{\text{VID\_CM}}$ signal is a synchronous signal used to mask the next VID_CLK cycle and disable a video counter in the FBRAM chip 71 that drives the video buffers 52 and 54. The VID_OE signal is an asynchronous video output enable for the video data provided by VID_DATA signals. A 16 bit wide video data bus provided by the VID_DATA[15..0] signals which enables transfer of two bytes of video data during one cycle. The VID_QSF signal indicates whether the video buffer 52 or the video buffer 54 is driving the video data transferred via the VID_DATA[15..0] signals.

TABLE 3

| Signal Name | Pin Count | I/O | Description |
| --- | --- | --- | --- |
| VID_CLK | 1 | I | Video Clock |
| VID_CM | 1 | I | Video Clock Mask |
| VID_OE | 1 | I | Video Output Enable |
| VID_DATA | 16 | O | Video Data Bus |
| VID_QSF | 1 | O | Video Buffer Indicator |

Figure 5:
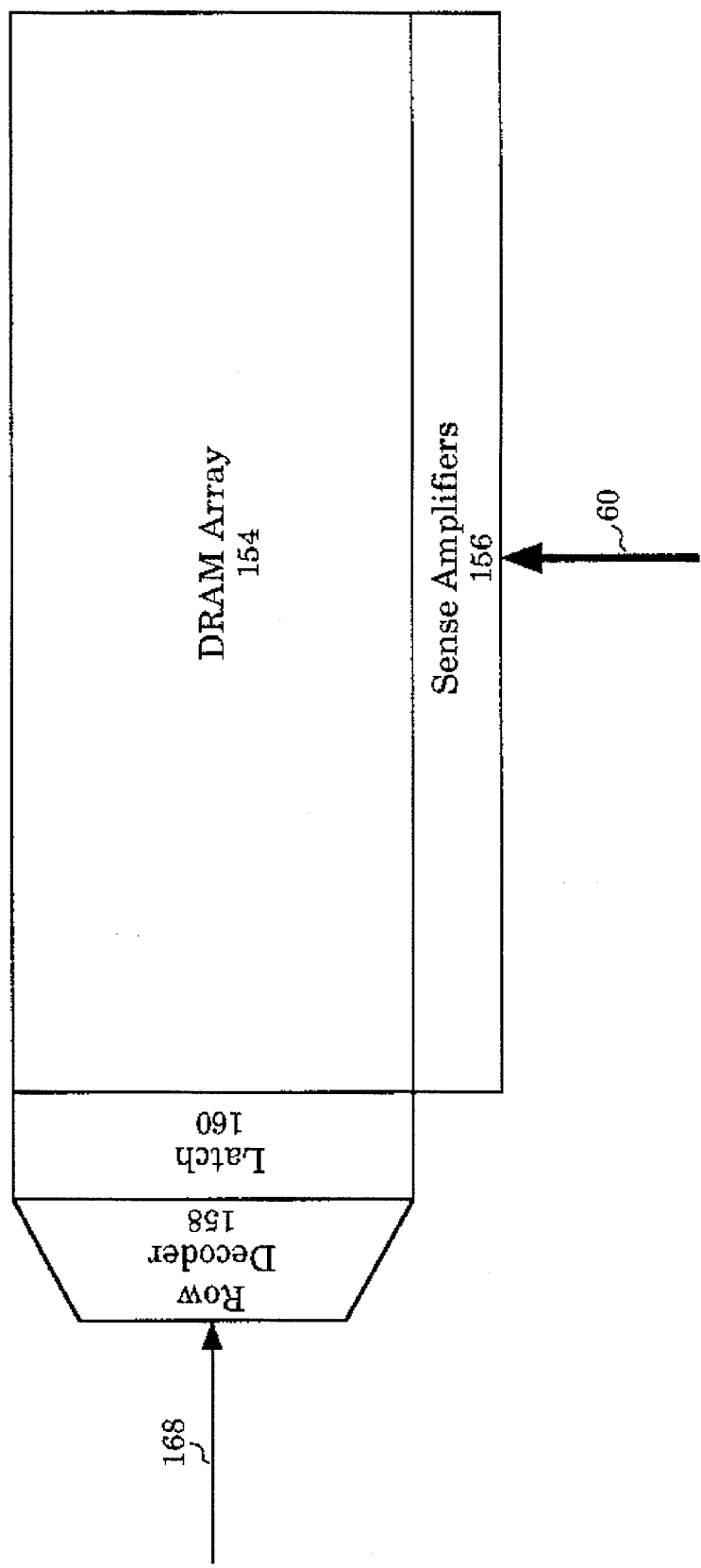
FIG. 5 illustrates the architecture of the DRAM bank A for one embodiment which comprises a DRAM array, a set of sense amplifiers, a row decoder circuit, and a latch.

FIG. 5 illustrates the architecture of the DRAM bank A for one embodiment. The DRAM bank A is substantially similar to the DRAM banks B–D. The DRAM bank A comprises a DRAM array 154, a set of sense amplifiers 156, a row decoder circuit 158, and a latch 160. The DRAM array 154 is arranged as 257 pages. Each page comprises 10,240 memory cells which yields a total storage of 2,631,680 bits for the DRAM bank A.

The row decoder circuit 158 receives the DRAM access signals 168 from the DRAM control circuit 112 and selects the word line for the page of the DRAM array 154 specified by the page address provided by the DRAM access signals 168. The word lines select a page of the DRAM array 154 for transfer to the sense amplifiers 156. The sense amplifiers 156 function as a page cache for the DRAM array 154. The sense amplifiers 156 are equalized and the DRAM bank A is idle when the word lines from the row decoder circuit 158 are inactive.

During an access page operation indicated by the DRAM access symbols 168, the row decoder circuit 158 selects a page of the DRAM array 154 by activating the appropriate word line. The activated word line transfers the bit cell charges of the corresponding page of the DRAM array 154 to the sense amplifiers 156. The sense amplifiers 156 amplify the bit cell charges of the selected page of the DRAM array 154.

The DRAM bank A provides a duplicate page mechanism for writing a page of data to any page of the DRAM array 154. If the DRAM access signals 168 indicate a duplicate page operation, the row decoder circuit 158 selects a word line without first equalizing the sense amplifiers 156. The selected word line writes the data contained in the sense amplifiers 156 over the data in the selected page of the DRAM array 154.

The DRAM bank A is precharged before a page access to the DRAM array 154. A precharge operation may begin to the DRAM bank A after completion of a data transfer operation over the global bus 60 or communication to the video buffer 52. A precharge operation is indicated by the DRAM access signals 168. The precharge operation deactivates the selected word line and equalizes the sense amplifiers 156. After the precharge operation, the page of the DRAM array 154 that corresponds to the deactivated word line contains the data previously in the sense amplifiers 156. The page access from the DRAM array 154 follows the precharge operation without delay.

Figure 6:
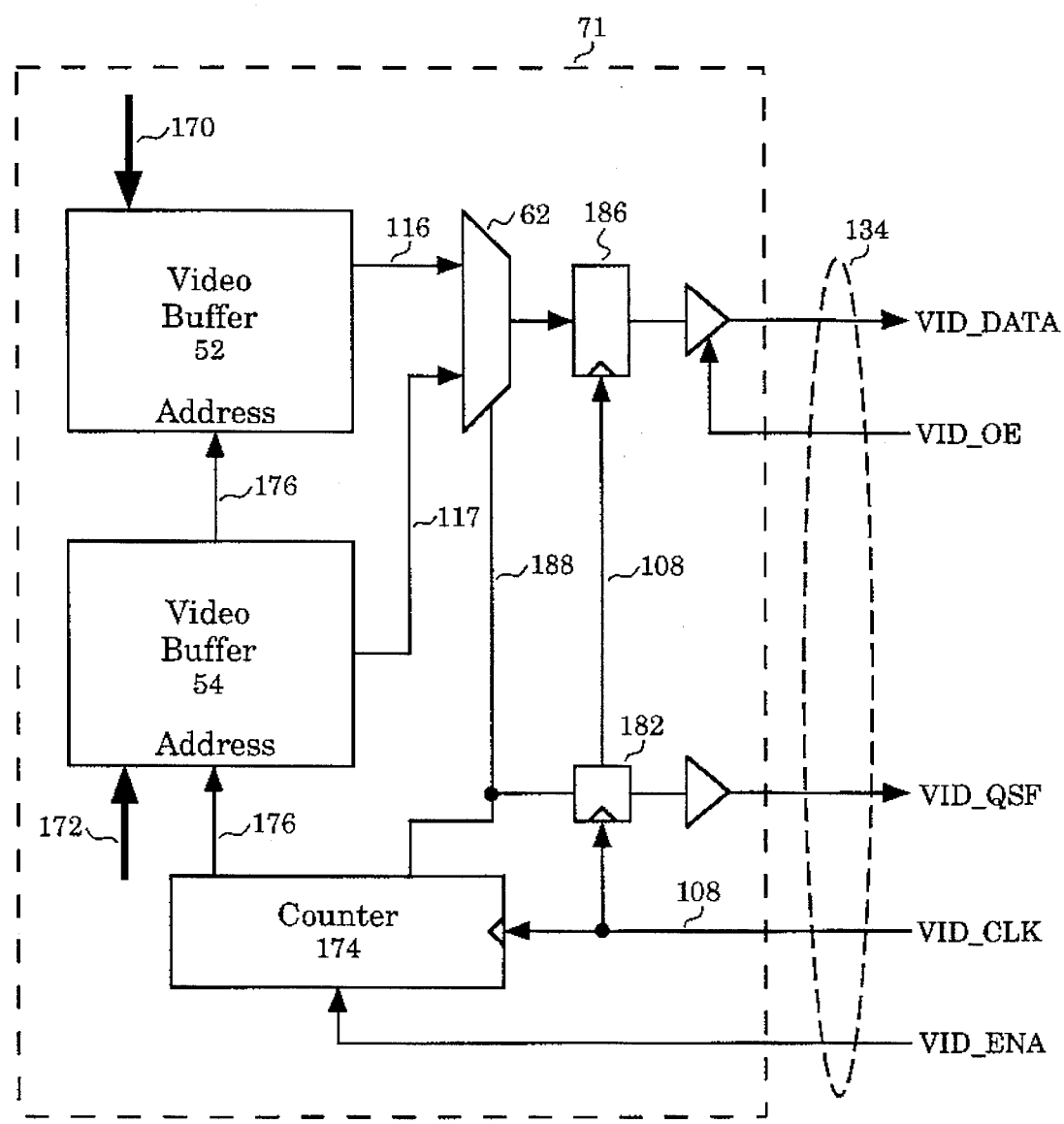
FIG. 6 illustrates the video buffers for one embodiment and shows circuitry for transferring video data over the video bus.

FIG. 6 illustrates the video buffers 52 and 54 for one embodiment. The video buffers 52 and 54 are arranged as double buffers for transferring video data over the video bus 134. The video data 116 from the video buffer 52 or the video data 117 from the video buffer 54 is selected by the multiplexer 62. The video data transferred over the video bus 134 is synchronized by a register 186. The register 186 is clocked by the VID_CLK signal from the video output circuit 84. The video data transfer operations over the video bus 134 are enabled and disable by the VID_OE signal.

The video buffer 52 receives a set of sense amp data 170 from the page buffers A or C. The video buffer 54 receives a set of sense amp data 172 from the page buffers B or D. A counter 174 generates a video address 176 according to the VID_CLK signal and the VID_ENA signal. The video address 176 causes the video buffers 52 and 54 to shift out the video data 116 and 117 to the multiplexer 62. The counter 174 is synchronized by the video clock 108 and is enabled or disabled by the VID_ENA signal.

For one embodiment, the video buffers 52 and 54 each buffer 640 bits of sense amp data. The sense amp data 170 and 172 each comprise 640 bits of sense amp data from one of the corresponding page buffers A–D. The video buffer 52 or 54 shifts 16 bits of data over the video bus 134 during each cycle of the VID_CLK signal according to the video address 176. The video buffers 52 and 54 each require 40 cycles of the VID_CLK signal to transfer an entire 640 bits of video data over the video bus 134. The counter 174 generates a select signal 188 that selects between the video data 116 and 117. The counter generates the select signal 188 by counting the VID_CLK signal module 40 and toggling the select signal 188 when the count wraps to 0. The select signal 188 is synchronized by the VID_CLK signal through a register 182 to drive the VID_QSF signal on the video bus 134.

The VID_DATA signals provide 16 bits of parallel video data to the video output circuit 84. The byte order of data on the VID_DATA signals is selected by a byte pair mode latch in the FBRAM chip 71. The byte pair mode latch is loaded via the DRAM_ADDR[7] signals if the DRAM_ADDR[8] signal is asserted. The byte pair mode latch selects either a normal video output mode or a reversed video output mode.

Figure 7:
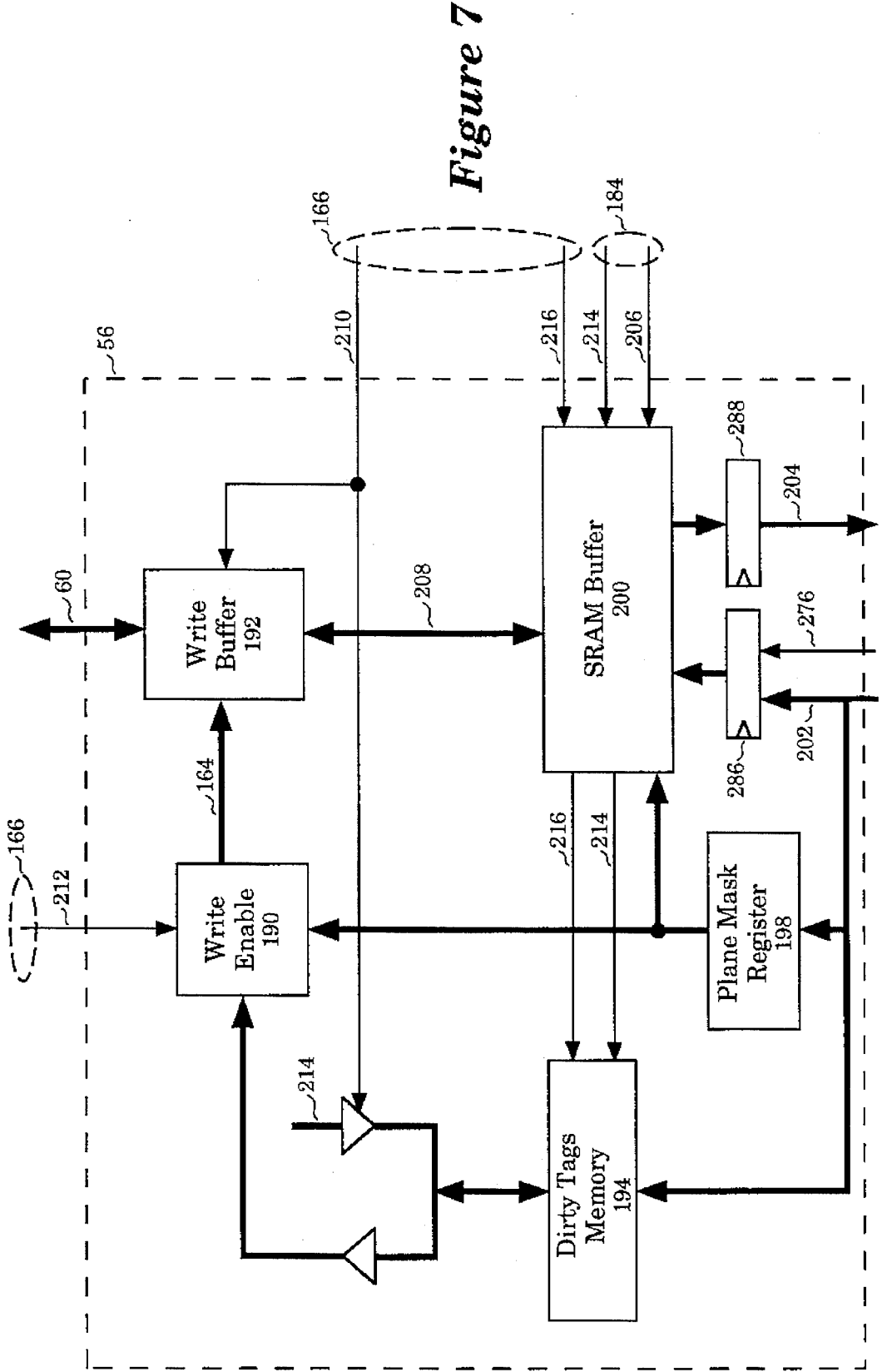
FIG. 7 illustrates the pixel buffer for one embodiment which comprises an SRAM buffer, along with a corresponding dirty tags memory.

FIG. 7 illustrates the pixel buffer 56 for one embodiment. The pixel buffer 56 comprises an SRAM buffer 200, a corresponding dirty tags memory 194, a plane mask register 198, a write enable circuit 190, a write buffer 192, a write port 286 and a read port 288. The SRAM buffer 200 comprises a 2048 bit SRAM array. The SRAM buffer 200 is organized into eight pixel cache blocks. Each pixel cache block of the SRAM buffer 200 comprises 256 bits.

Each pixel cache block in the SRAM buffer 200 stores eight words each comprising 32 bits. The dirty tags memory 194 contains eight sets of 32 bit dirty tags. Each pixel cache block in the SRAM buffer 200 corresponds to one of the sets of dirty tags of the dirty tags memory 194.

The pixel port control circuit 114 generates an ALU block address 214 and an ALU word address 206 to select pixel data in the SRAM buffer 200 and corresponding dirty tag bits in the dirty tags memory 194 for pixel access operations. The pixel buffer 56 receives the incoming write port data 202 for the SRAM buffer 200 through the write port 286. The write port 286 is enabled and disabled by a pixel buffer write enable signal 276 from the pixel ALU 58. The pixel buffer 56 transfers outgoing read port data 204 from the SRAM buffer 200 through the read port 288. The dirty tags in the dirty tags memory 194 are selected by the ALU block address 214.

The DRAM control circuit 112 generates a global block address 216 to select pixel cache blocks in the SRAM buffer 200 for block transfer operations over the global bus 60. The write buffer 192 interfaces the global bus 60 to the SRAM buffer 200 via a global read/write port bus 208.

Pixel cache block transfers from the DRAM banks A–D to the SRAM buffer 200 over the global bus 60 are controlled by a global bus read signal 210 from the DRAM control circuit 112. The global bus read signal 210 transfers a pixel cache block from the write buffer 192 to the SRAM buffer 200 over the global read/write port bus 208. The global bus read signal 210 loads a set of constant zeros 214 into the corresponding dirty tag bits in the dirty tags memory 194. The corresponding dirty tag bits in the dirty tags memory 194 are selected by the global block address 216.

Pixel cache block transfers from the SRAM buffer 200 to the DRAM banks A–D over the global bus 60 are controlled by a global bus write signal 212 from the DRAM control circuit 112. The global bus write signal 212 causes the write enable circuit 190 to generate a set of write enable signals 164. The write enable signals 164 control transfer of a pixel cache block from the write buffer 192 over the global bus 60 to the page buffers A–D. The write enable signals 164 are conditioned by the corresponding dirty tag bits in the dirty tags memory 194.

The write enable signals 164 are also conditioned by a plane mask value stored in the plane mask register 198. For one embodiment, the write enable signals 164 comprise a set of 256 write enable signals that correspond to the 256 bits of a pixel cache block transferred over the global bus 60.

Figure 8:
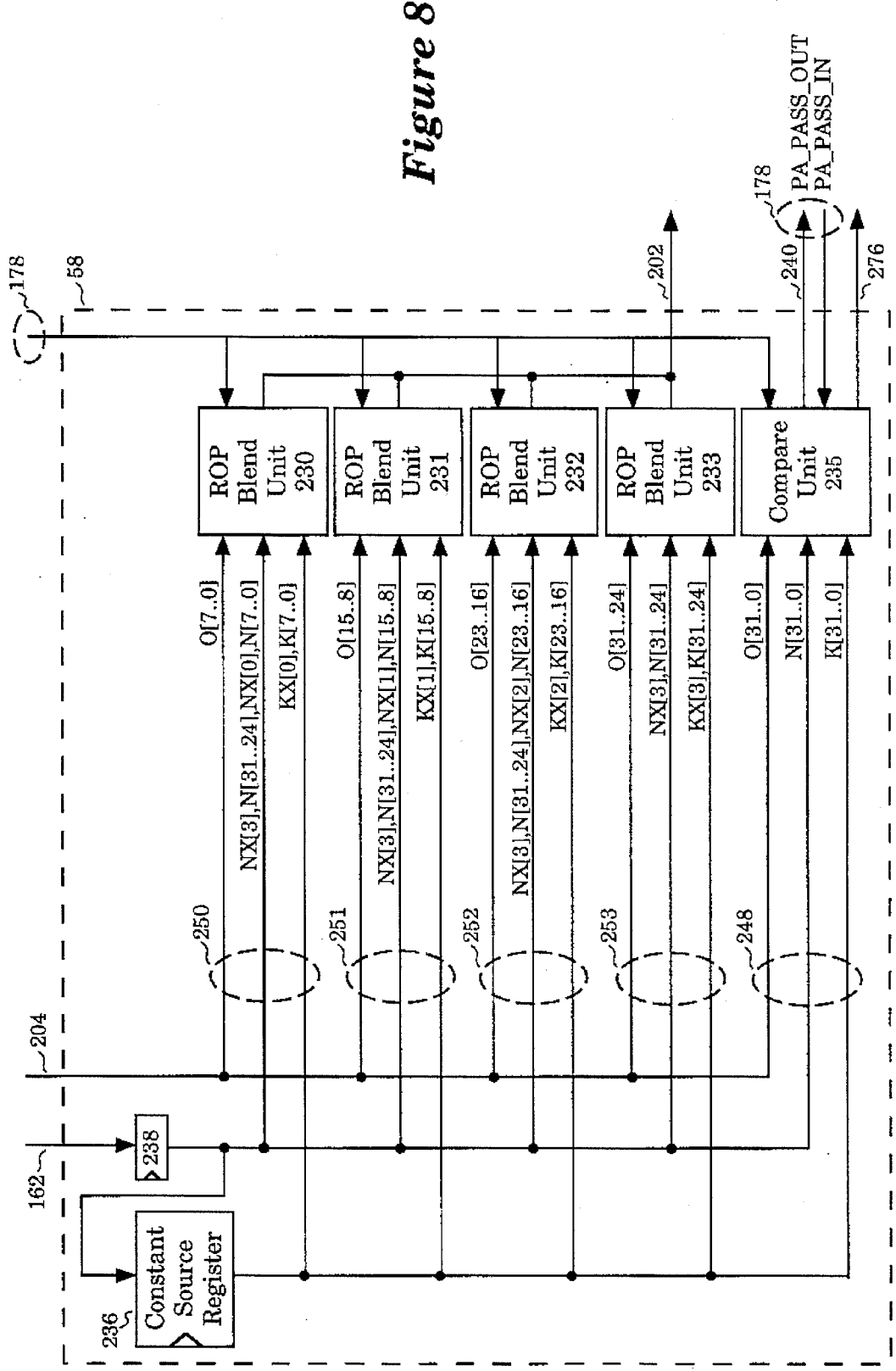
FIG. 8 illustrates the pixel ALU 58 for one embodiment which comprises a set of raster operation and blend (ROP/Blend) units, a constant source register, and a compare unit.

FIG. 8 illustrates the pixel ALU 58 for one embodiment. The pixel ALU 58 comprises a set of raster operation and blend (ROP/Blend) units 230–233, a constant register 236, and a compare unit 235. Source data for the pixel ALU 58 is provided by a constant value from the constant register 236, the input pixel data 162 from the input/output pins of the FBRAM chip 71, and the read port data 204 from the pixel buffer 56.

The input pixel data 162 comprises 32 bits supplied via the PA_DQ[31..0] signals and 4 bits supplied via the PA_DX[3..0] signals. The data supplied via the PA_DX [3..0] signals is employed during blending operations in the FBRAM chip 71. The constant register 236 latches the input pixel data 162 for subsequent use as source data.

The read port data 204 from the pixel buffer 56 provides old data (O[31..0]) for raster operations, blend operations and compare operations. The input pixel data 162 provides new data (N[31..0]) and extended new data (NX[3..0]) for raster operations, blend operations and compare operations. The constant register 236 provides constant source data (K[31..0]) and extended constant source data (KX[3..0]) for raster operations, blend operations and compare operations.

Each ROP/Blend unit 230–233 implements an 8 bit raster operation unit and an 8 bit blend unit. The ROP/Blend units 230–233 are each pipelined. Each ROP/Blend unit 230–233 operates on a corresponding 8 bits of old data from the pixel buffer 56, a 9 bit fraction, and 9 bits of new data. The ROP/Blend units 230–233 each employ a variety of sources for the corresponding fraction and the corresponding new data.

The old data O[31..0], the new data N[31..0] and NX[3..0], and the constant data K[31..0] and KX[3..0] are distributed as sources to the ROP/Blend units 230–233 and the compare unit 235. The old data O[31..0], the new data N[31..0] and NX[3..0], and the constant data K[31..0] and KX[3..0] provide a set of sources 250–253 to the ROP/Blend units 230–233. The old data O[31..0], the new data N[31..0], and the constant data K[31..0] provide a set of compare sources 248 to the compare unit 235.

The ROP/Blend results generated by the ROP/Blend units 230–233 are transferred to the pixel buffer 56 as the write port data 202. The ROP/Blend results generated by the ROP/Blend units 230–233 are conditionally written to the pixel buffer 56 via the write port data 202 according to the pixel buffer write enable signal 276 generated by the compare unit 235.

The compare unit 235 includes a 32 bit match compare unit and a 32 bit magnitude compare unit. A compare result 240 generated by the compare unit 235 may be combined with a compare result from another FBRAM chip via the PA_PASS_IN and the PA_PASS_OUT signals.

Figure 9:
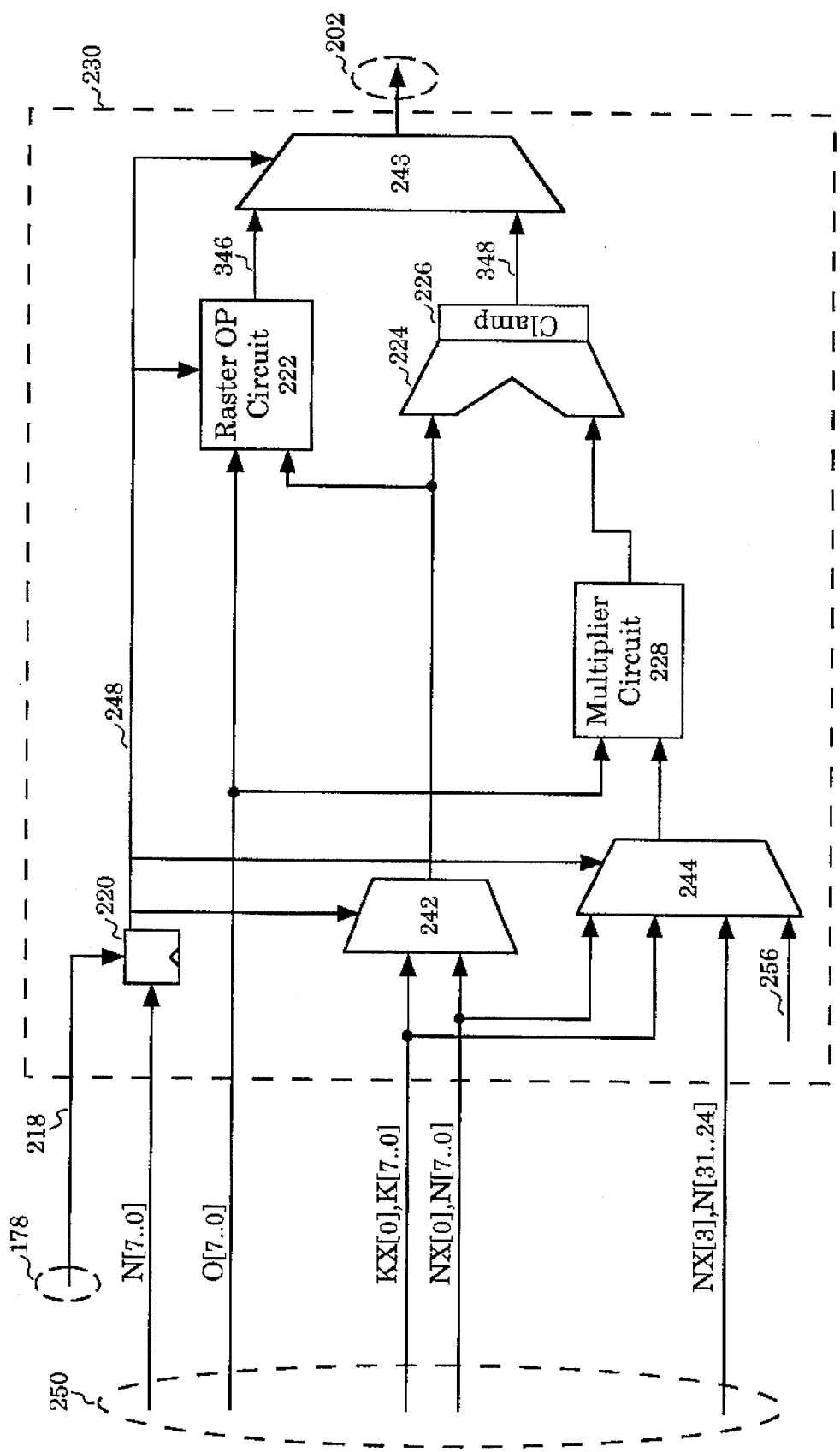
FIG. 9 illustrates a ROP/Blend unit for one embodiment which includes a raster op circuit, an adder, and a multiplier circuit.

FIG. 9 illustrates the ROP/Blend unit 230 for one embodiment. The ROP/Blend units 231–233 are substantially similar to the ROP/Blend unit 230. The ROP/Blend units 231–233 operate on differing fields of source data. The ROP/Blend unit 230 comprises a raster op circuit 222, an adder 224 and clamp circuit 226, and a multiplier circuit 228. The ROP/Blend unit 230 further comprises a set of multiplexers 242–244 that route source data for the ROP/Blend unit 230 and that deliver the results to the write port 202 of the pixel buffer 56. In addition, a constant data source 256 equal to 100 hex is available through the multiplexer 244.

The ROP/Blend unit 230 includes a control register 220 which is programmed via the input pixel data 162 with new data N[7..0]. The control register 220 is loaded by a load ROP/Blend signal 218 from the pixel port control circuit 114. The rendering controller 70 programs the control register 220 to configure the ROP/Blend unit 230 as either a ROP unit or a Blend unit. The control register 220 generates a set of control signals 248 to control the multiplexers 242–244 and the raster op circuit 222. The multiplexer 243 selects either the blend result 346 from the raster op circuit 222 or the blend result 348.

For one embodiment, the raster op circuit 222 performs one of 16 Boolean raster op functions according to the control signals 248. The raster op functions are performed with old data O[7..0] and either new data NX[0], N[7..0] or constant data KX[0], K[7..0] according to the contents of the control register 220.

The general pixel blending equation for the ROP/Blend unit 230 is BLEND RESULT=NEW DATA×NEW FRACTION+OLD DATA×OLD FRACTION. The multiplier circuit 228 and the adder 224 perform the OLD DATA×OLD FRACTION multiply and the addition in the general pixel blending equation. The NEW DATA×NEW FRACTION multiply result and the OLD FRACTION are supplied by the rendering controller 70.

The adder 224 generates an intermediate blend result. The intermediate blend result is clamped by the clamp circuit 226. The clamp circuit 226 clamps an adder underflow to 0 and clamps an adder overflow to 255. The clamped result 348 is transferred via the write port data 202 to the pixel buffer 56 through the multiplexer 243.

Figure 10:
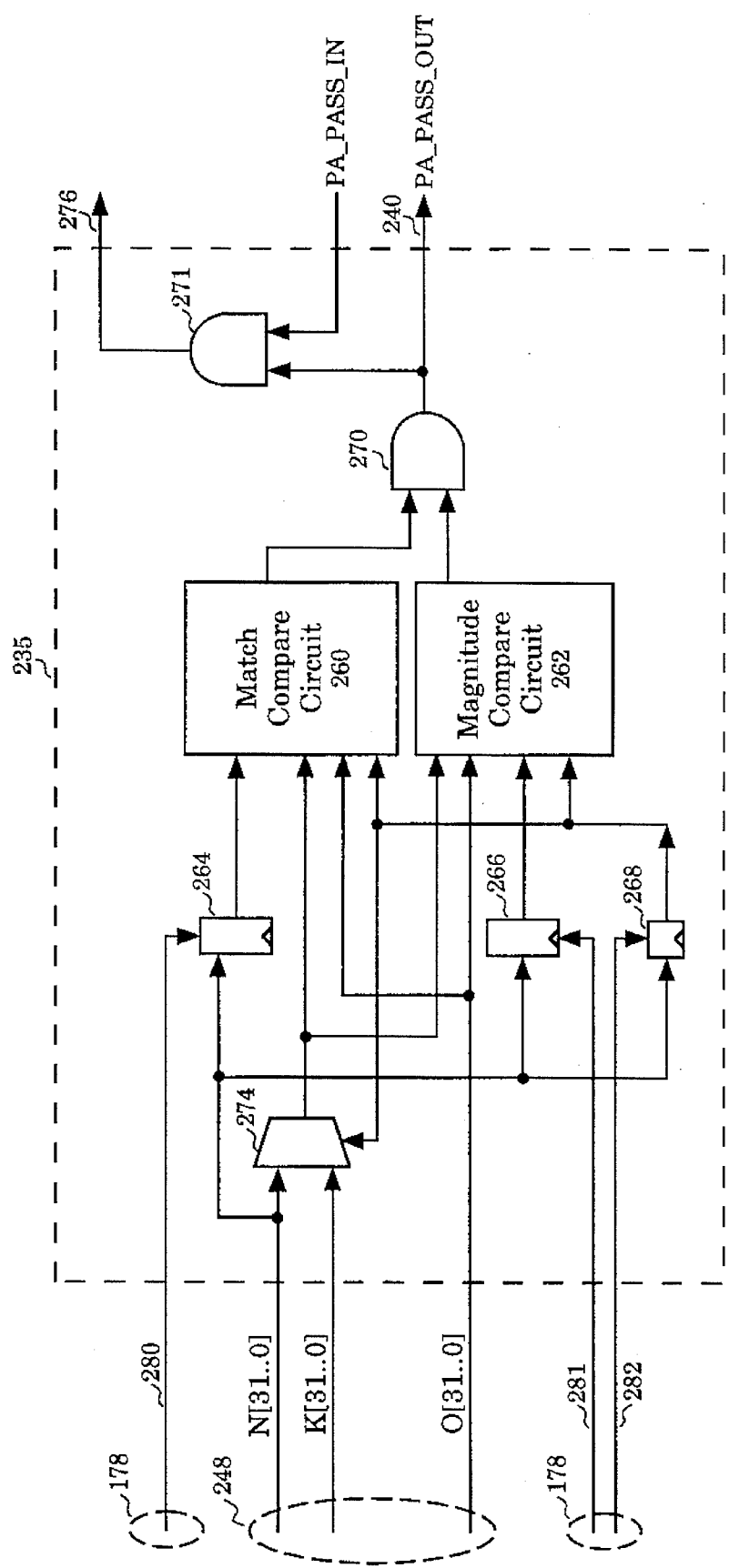
FIG. 10 illustrates a compare unit for one embodiment which comprises a match compare circuit, and a magnitude compare circuit.

FIG. 10 illustrates the compare unit 235 for one embodiment. The compare unit 235 comprises a match compare circuit 260, a magnitude compare circuit 262, a match mask register 264, a magnitude mask register 266, and a compare control register 268. The match compare circuit 260 and the magnitude compare circuit 262 perform the respective compare functions in parallel.

The contents of the compare control register 268 specify the match and magnitude compare functions. The match mask register 264 and the magnitude mask register 266 specify the source data bits that participate in the match and magnitude compare functions. The compare control register 268 is programmed via the input pixel data 162 with new data N[5..0]. The compare control register 268 is loaded by a load compare control signal 282 from the pixel port control circuit 114. The match mask register 264 and the magnitude mask register 266 are each programmed via the input pixel data 162 with new data N[31..0]. The match mask register 264 and the magnitude mask register 266 are loaded by a load match mask signal 280, and a load magnitude mask signal 281, respectively, from the pixel port control circuit 114.

The old data O[31..0] received from the pixel buffer 56 supplies one source data input for the match compare circuit 260 and the magnitude compare circuit 262. Another source data input for the match compare circuit 260 and the magnitude compare circuit 262 is supplied by either the new data N[31..0] from the PA_DQ pins of the FBRAM chip 71 or the constant data (K[31..0]) from the constant register 236.

The comparison results from the match compare circuit 260 and the magnitude compare circuit 262 are combined by an AND gate 270. The AND gate 270 provides the compare result 240 which is transferred over the interleaved rendering bus 64 as the PA_PASS_OUT signal. The compare result 240 is combined with the PA_PASS_IN by an AND gate 271. The output of the AND gate 271 provides the pixel buffer write enable signal 276. The pixel buffer write enable signal 276 enables writing of the write port data 202 into the pixel buffer 56.

Figure 11:
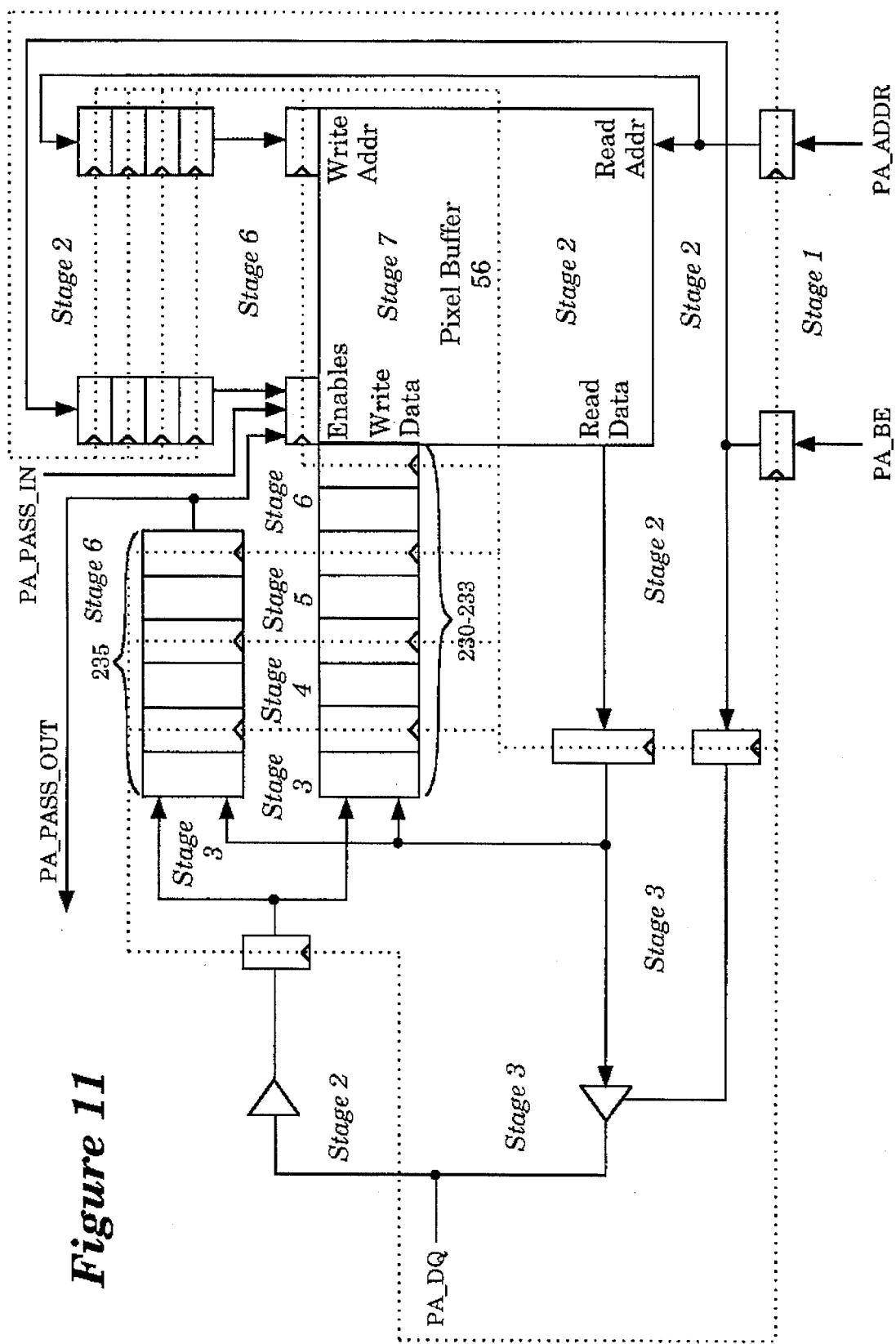
FIG. 11 illustrates the pipelined architecture of the pixel buffer and the pixel ALU for one embodiment.

FIG. 11 illustrates the pipelined architecture of the pixel buffer 56 and the pixel ALU 58 for one embodiment. The pixel buffer 56 and the pixel ALU 58 implement a seven stage pipeline (Stage 1 through Stage 7). The pipeline stages Stage 1 through Stage 7 minimize transition delay between pixel port read and write accesses to the FBRAM chip 71 over the interleaved rendering bus 64. The pipeline stages Stage 1 through Stage 7 enable the rendering controller 70 to issue consecutive write operations at a rate of one per clock over the interleaved rendering bus 64 without delay cycles. The pipelined architecture of the pixel buffer 56 and the pixel ALU 58 enables high throughput even though the ALU logic is implemented using standard DRAM processes which are not optimized for ALU logic.

For one embodiment, three pipeline stages are used to implement the compare unit pipeline 235 and four pipeline stages are used to implement the ROP/blend unit pipeline 230–233. The deep processing pipelines enable practical implementation of the required high speed logic and arithmetic functions in the slower and less expensive memory process used in manufacturing the FBRAM chip 71.

The rendering controller 70 issues register write operations over the interleaved rendering bus 64 to program the control registers of the FBRAM chip 71, including the control registers of the pixel buffer 56 and the pixel ALU 58. A register write operation does not affect pipelined operations issued during cycles of the interleaved rendering bus 64 preceding the register write operation. The register write operations affect operations issued in subsequent cycles over the interleaved rendering bus 64.

The pipeline stages Stage 1 through Stage 7 enable the rendering controller 70 to issue consecutive read operations over the interleaved rendering bus 64 without delay cycles. The read operations on the interleaved rendering bus 64 include multiple cycle data phases. The rendering controller 70 can issue a read operation over the interleaved rendering bus 64 immediately after issuing a write operation over the interleaved rendering bus 64 without delay cycles.

Table 4 describes the internal activities of the pixel buffer 56 and the pixel ALU 58 in relation to external activities at the input/output interface pins of the FBRAM chip 71 for the pipeline stages Stage 1 through Stage 7.

TABLE 4

| Stage | External Activities | Internal Activities |
|---|---|---|
| 1 | Operation specified on PA_ENA, PA_WE, PA_OP, PA_ADDR, and PA_BE pins | |
| 2 | Write data on PA_DQ and PA_DX pins if write or read-modify-write operation | Read SRAM Buffer in preparation for a possible read or read-modify-write operation Decode operation |
| 3 | Read data on PA_DQ pins if read operation | Write and read data enters first stage of ROP/Blend |

TABLE 4-continued

| Stage | External Activities | Internal Activities |
|---|---|---|
| 4 | | and Compare Units Second stage of ROP/Blend and Compare Units |
| 5 | | Third stage of ROP/Blend and Compare Units |
| 6 | Compare result transferred via PA_PASS_OUT pin to PA_PASS_IN pin | Fourth stage of ROP/Blend |
| 7 | | Write result to SRAM Buffer and Dirty Tags if allowed by pixel buffer write enable signal |

Figure 12:
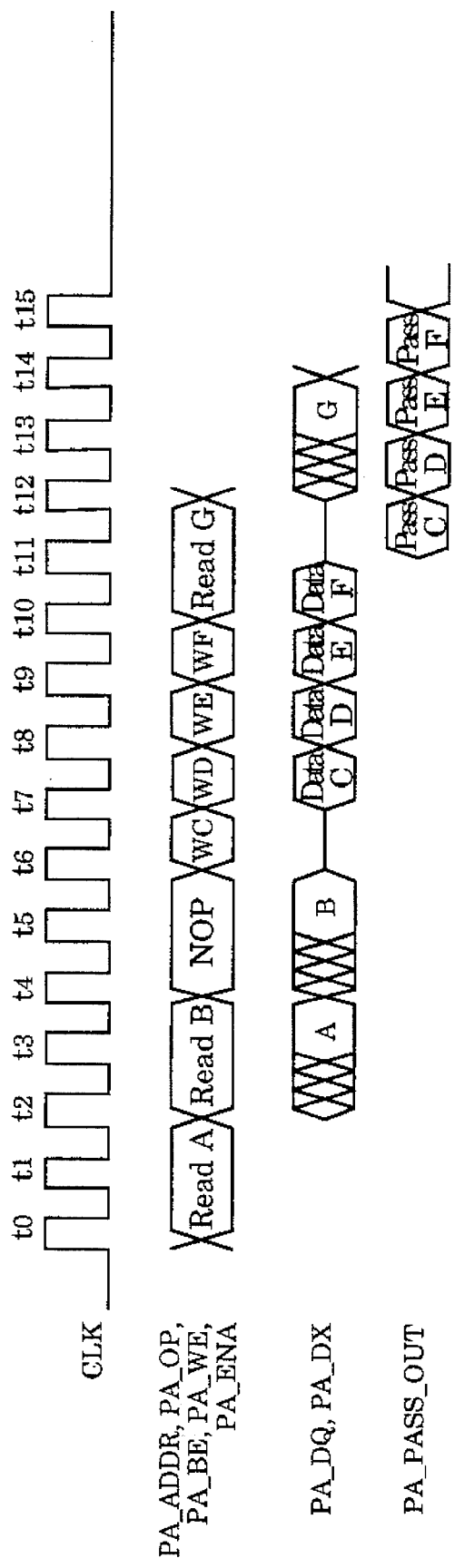
FIG. 12 is a timing diagram that illustrates pipelined read and write transfers through the pipeline stages of the pixel ALU and the pixel buffer for one embodiment.

FIG. 12 is a timing diagram that illustrates pipelined read and write transfers through the pipeline stages Stage 1 through Stage 7 for one embodiment. The rendering controller 70 issues a pair of read operations (Read A and Read B) over the interleaved rendering bus 64, then issues a series of write operations (WC, WD, WE, and WF) followed by a read operation (Read G). The diagram shows the timing at the pixel port input/output interface pins including the PA_ADDR signals, the PA_OP, PA_BE, PA_WE, AND PA_ENA signals, the PA_DQ and PA_DX signals, and the compare result PA_PASS_OUT signal. The master clock signal (CLK) synchronizes the read and write operations over the interleaved rendering bus 64.

The rendering controller 70 issues the read operation Read A over the interleaved rendering bus 64 during periods t0 and t1. The valid data Data A for to the read operation Read A is available during period t3. The Data A is sampled at the rising edge of the CLK signal during period t4. Between the read operation Read B and the write operation WC, a two cycle no-op (NOP) occurs on the interleaved rendering bus 64. The no-op periods provide an idle time during data turn around on the interleaved rendering bus 64.

The rendering controller 70 issues the read operation Read G immediately after issuing the write operation WF. The write operation WC reaches the pipeline stage Stage 1 at period t6. The PA_PASS_OUT signal corresponding to the write operation WC (Pass C) reaches the pipeline stage Stage 6 during period t11.

Figure 13:
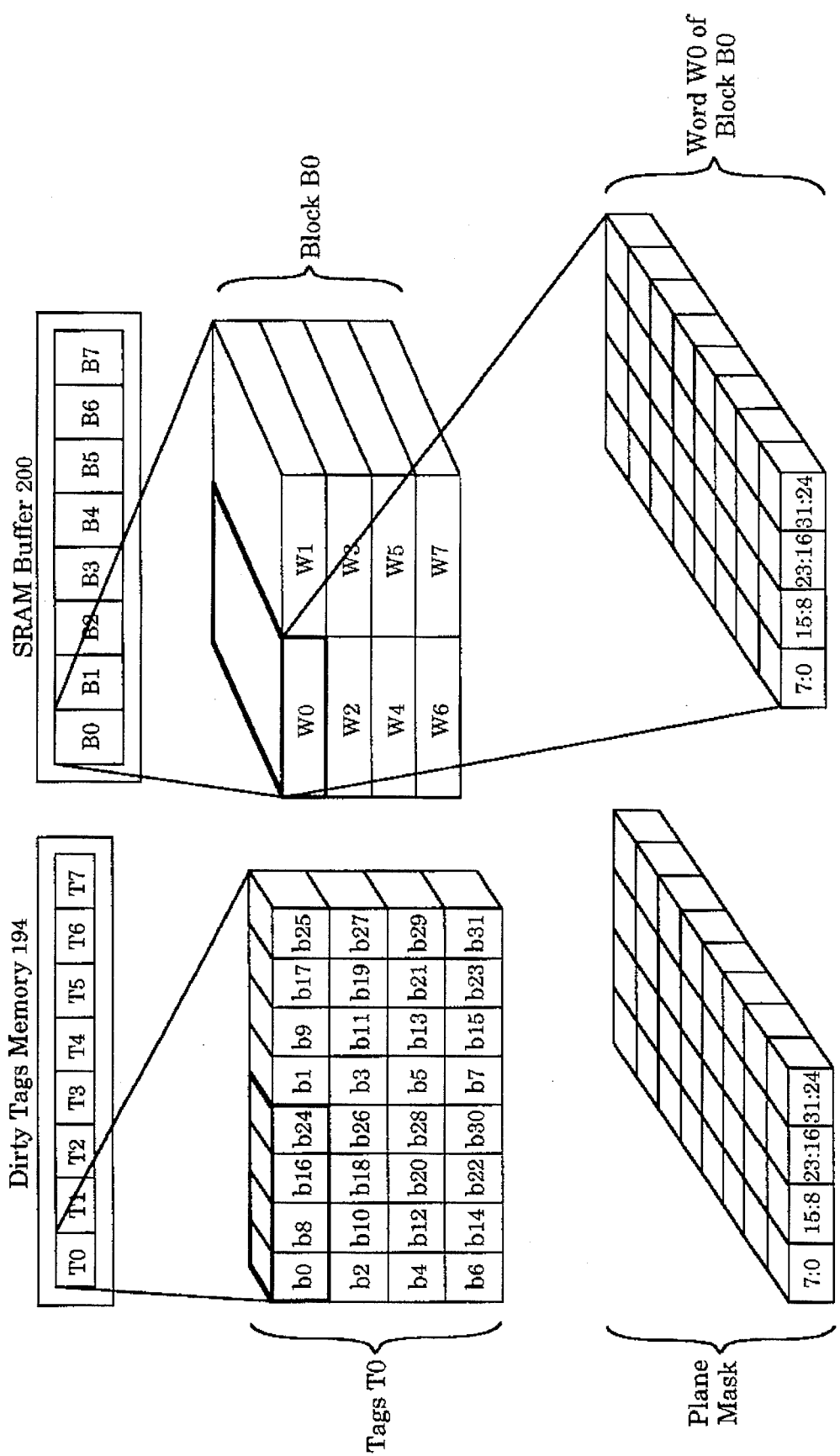
FIG. 13 illustrates the organization of the pixel buffer for one embodiment and shows the mapping of the dirty tags and the plane mask bits.

FIG. 13 illustrates the organization of the pixel buffer 56 for one embodiment. The SRAM buffer 200 is organized as eight 256 bit pixel cache blocks (blocks B0 through B7) which provides eight blocks with eight 32 bit pixels in each block. The blocks B0 through B7 are addressed by the DRAM_ADDR signals for block transfer operations over the global bus 60 and for accesses through the ALU read and write ports 286 and 288. A word address specified by the DRAM_ADDR signals identifies a 32 bit word in the SRAM buffer 200 for accesses through the ALU read and write ports 286 and 288.

Each block B0 through B7 comprises eight 32 bit words. For example, the block B0 comprises the words W0 through W7. Each word W0 through W7 is a one eighth slice of the block B0. The word W0 is mapped directly to PA_DQ [31..0] signals. The first byte of W0 is mapped to the PA_DQ[7:0] signals, the second byte of W0 is mapped to the PA_DQ[15:8] signals, the third byte of W0 is mapped to the PA_DQ[23:16] signals, and the remaining byte of W0 is mapped to the PA_DQ[31:24] signals.

Each data byte of each block B0 through B7 is associated with a dirty tag bit in the dirty tags memory 194. The dirty tags memory 194 contains eight sets of dirty tags T0 through T7 that correspond to the blocks B0 through B7. Each 32 bit set of dirty tags T0 through T7 controls the corresponding block B0 through B7. The mapping of the dirty tag bits b0–b31 of the dirty tags T0 to the block B0 is shown.

The dirty tags T0 through T7 are employed during block transfer operations over the global bus 60 between the SRAM buffer 200 and the DRAM banks A–D. The dirty tags T0 through T7 are also employed during write operations through the write port 286 into the pixel buffer 56. The rendering controller 70 also directly accesses the dirty tags T0 through T7 stored in the dirty tags memory 194 via the PA_DQ[31..0] signals.

During read block operations from one of the DRAM banks A–D to one of the blocks B0 through B7 of the SRAM buffer 200 over the global bus 60, the corresponding dirty tags T0 through T7 are cleared. During write block operations from one of the blocks B0 through B7 of the SRAM buffer 200 to one of the DRAM banks A–D over the global bus 60, the corresponding dirty tags T0 through T7 determine the data bytes written to the specified DRAM bank A–D in conjunction with the contents of the plane mask register 198. If a dirty tag bit b0–b3 is 0, then the corresponding data byte of the specified DRAM bank A–D is not written.

The mapping of the plane mask bits in the plane mask register 198 to the PA_DQ signals is shown in FIG. 13. The plane mask bits in the plane mask register 198 qualify writes to the SRAM buffer 200 and to the DRAM banks A–D. The rendering controller 70 writes the plane mask bits to the plane mask register 198. The plane mask bits are effective for stateful writes issued by the rendering controller 70 during cycles after the write operation to the plane mask register 198.

The plane mask bits in the plane mask register 198 function as per bit write enables for data entering the SRAM buffer 200 during stateful writes through the write port 286. The plane mask bits in the plane mask register 198 also function as per bit write enables for masked write blocks transferred over the global bus 60 from the SRAM buffer 200. The plane mask bits apply to each word of the masked write block transferred over the global bus 60 to one of the DRAM banks A–D.

Table 5 describes the pixel port operations that affect the dirty tags T0 through T7. The pixel port write operations that affect the dirty tags T0 through T7 include a stateful initial data write, a stateless initial data write, a stateful normal data write, and a stateless normal data write. The dirty tags T0 through T7 do not affect outgoing read data transferred over the interleaved rendering bus 64 and are unmodified during word read operations through the read port 288 of the pixel buffer 56.

TABLE 5

| Pixel Operation | Pixel Data | New Dirty Tag Contents |
| --- | --- | --- |
| Normal Data Write | Write 0–3 bytes from PA_DQ pins (per PA_BE pins) | The four addressed Dirty Tag bits ored with byte enable pins; the other 28 tags are unchanged |
| Initial Data Write | Write 0–3 bytes from PA_DQ pins (per PA_BE pins) | PA_BE signals transferred to the 4 addressed Dirty Tag bits; "0" to the 28 unaddressed Dirty Tag bits |
| Replace Dirty Tags | Unchanged | PA_DQ signals replace 32 Dirty Tag bits |
| Or Dirty Tags | Unchanged | All 32 Dirty Tag bits ored |

TABLE 5-continued

| Pixel Operation | Pixel Data | New Dirty Tag Contents |
| --- | --- | --- |
| | | with PA_DQ signals |

The PA_BE[3..0] signals are propagated through the pipeline stages Stage 1 through Stage 7 while the corresponding pixel port operations are propagated through the pipeline stages Stage 1 through Stage 7. At the end of the pipeline stages Stage 1 through Stage 7, pixel data is conditionally written into a word of the SRAM buffer 200 while the pipelined PA_BE[3..0] signals modify the four corresponding dirty tag bits of the dirty tags memory 194.

For the initial data writes, the four addressed dirty tag bits of the dirty tags memory 194 are replaced with the pipelined PA_BE[3..0] signals. The remaining twenty-eight dirty tag bits for the addressed block of the SRAM buffer 200 are cleared to zero during the initial data write. For the normal data writes, the four addressed dirty tag bits of the dirty tags memory 194 are each set to one if the corresponding pipelined PA_BE[3..0] signal is one. The four addressed dirty tag bits each remain unchanged if the corresponding pipelined PA_BE[3..0] signal is zero. The remaining twenty-eight dirty tag bits for the addressed block of the SRAM buffer 200 are unchanged during the normal data write.

In addition, the dirty tag bits are directly accessible by the rendering controller 70. The rendering controller 70 issues a replace dirty tag operation to replace the dirty tag bits for a specified block B0 through B7 with tag data provided via the PA_DQ signals. The rendering controller 70 issues an "OR" dirty tag operation to replace the dirty tag bits for a specified block B0 through B7 with the "OR" function result between the original dirty tag bits from the dirty tags memory 194 and new tag data via the PA_DQ[31..0] signals.

The bit mapping between the dirty tag bits b0–b31 of the selected dirty tags T0 through T7 and data words transferred via the PA_DQ signals is illustrated in FIG. 13. For example, the rendering controller 70 transfers new dirty tag data via the PA_DQ[0], PA_DQ[8], PA_DQ[16], and PA_DQ[24] signals to change the dirty tag bits for the word W0 of the selected block B0 through B7. The rendering controller 70 transfers new dirty tag data via the PA_DQ[5], PA_DQ[13], PA_DQ[21], and PA_DQ[29] signals to change the dirty tag bits for word W5 of the selected block B0 through B7.

The dirty tag bits T0 through T7 associated with pixel cache blocks B0 through B7 are employed in a color expansion mechanism for common color rendering operations by the rendering controller 70. The color expansion mechanism enables the rendering controller 70 to specify individual pixels with a single bit. The color expansion mechanism then expands the bit to an entire pixel. The rendering controller 70 employs the color expansion mechanism during two dimensional rendering operations such as text drawing which require that the rendering controller 70 write a common color value to many pixels in the DRAM banks A–D.

The rendering controller 70 selects a color expansion block from among the pixel cache blocks B0 through B7. The rendering controller 70 then writes a common color value eight times to all pixels in the color expansion block. The rendering controller 70 then writes a 32 bit color expansion word to the dirty tag bits in the dirty tags memory 194 that correspond to the color expansion block.

The rendering controller 70 then initiates a write block transfer operation of the color expansion block to one of the DRAM banks A–D over the global bus 60. The pixels of the color expansion block containing the common color value and having a corresponding dirty tag bit set are written to the selected DRAM bank A–D with common color value. The pixels of the color expansion block not having a corresponding dirty tag bit set are not written to the selected DRAM bank A–D.

Thereafter, the rendering controller 70 writes a new color expansion word to the dirty tag bits of the color expansion block, and then initiates a write block transfer operation of the color expansion block to a different portion of the DRAM banks A–D. The rendering controller 70 employs the color expansion block to hold a foreground color which is repeatedly used to write text to into the DRAM banks A–D.

Figure 14:
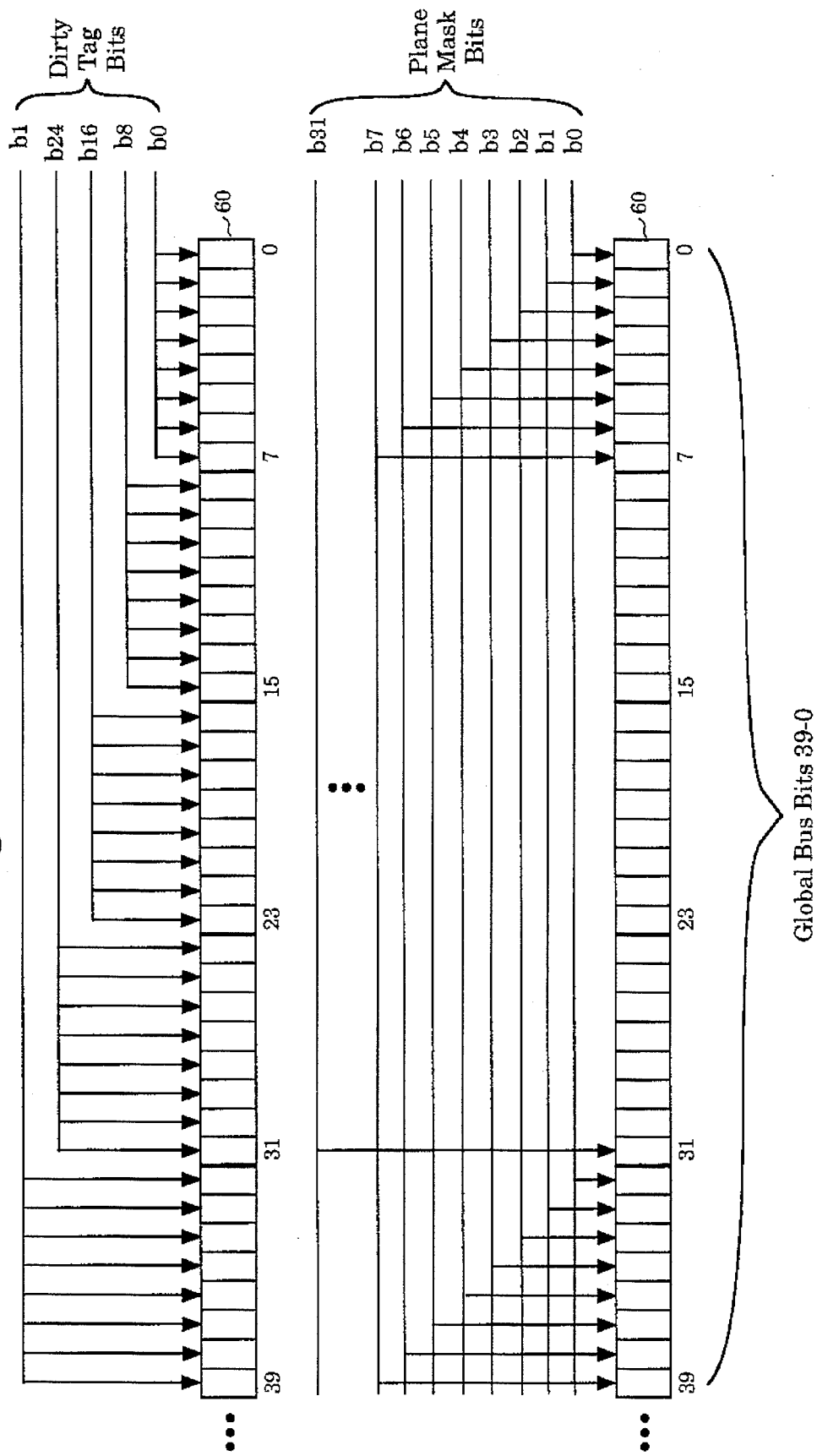
FIG. 14 illustrates the mapping of the plane mask bits in the plane mask register and the dirty tag bits in the dirty tag memory to masked write blocks transferred over the global bus.

FIG. 14 illustrates the mapping of the plane mask bits in the plane mask register 198 and the dirty tag bits in the dirty tag memory 194 for a pixel cache block to masked write block operations on the global bus 60. For one embodiment, a masked write block transferred over the global bus 60 comprises 256 bits. The interaction between the dirty tag bits and the plane mask bits for the lowest 40 bits on the global bus 60 is shown.

During a masked write block operation over the global bus 60, if the dirty tag bit and the plane bit corresponding a bit of the masked write block are both equal to one, then that bit of the masked write block is written into the selected sense amplifier in the DRAM banks A–D. The 32 plane mask bits repeatedly apply to each 32 bit portion of the masked write block on the global bus 60. Each dirty tag bit applies to an 8 bit portion of the masked write block on the global bus 60.

Table 6 describes the pixel port operations of the FBRAM chip 71 for one embodiment. The pixel port operations include operations for reading data from the pixel buffer 56, operations for writing data to the pixel buffer 56 in four different modes, operations for replacing and modifying dirty tag bits in the dirty tags memory 194, and an operation for writing to the control registers of the FBRAM chip 71.

TABLE 6

| PA_ENA | PA_WE | PA_OP | PA_ADDR | Operation |
| --- | --- | --- | --- | --- |
| 00 | — | — | — | NOP |
| 11 | 0 | 000 | Block:Word | Read data from Pixel Buffer |
| 11 | 1 | 000 | Block:Word | Stateless initial data write |
| 11 | 1 | 001 | Block:Word | Stateless normal data write |
| 11 | 1 | 010 | Block:Word | Stateful initial data write |
| 11 | 1 | 011 | Block:Word | Stateful normal data write |
| 11 | 1 | 100 | Block:xxx | Replace Dirty Tag |
| 11 | 1 | 101 | Block:xxx | Or Dirty Tag |
| 11 | 1 | 111 | Register | Write control registers |

The rendering controller 70 specifies block and word addresses for pixel port operations via the PA_ADDR[5..0] signals. The rendering controller 70 specifies block addresses for the pixel ALU operations via the PA_ADDR[5..3] signals. The rendering controller 70 specifies word addresses for the pixel ALU operations via the PA_ADDR[2..0] signals. The rendering controller 70 specifies the control registers during control register write operations via the PA_ADDR[5..0] signals.

The rendering controller 70 issues the read pixel port operation to read 32 bits of data from the pixel buffer 56. The block and word addresses in the SRAM buffer 200 are specified by the PA_ADDR[5..0] signals.

The rendering controller 70 issues the stateless initial data write operation to write 32 bits of data to the block and word in the SRAM buffer 200 specified by the PA_ADDR[5..0] signals. FIG. 12 shows that the rendering controller 70 transfers the write data via the PA_DQ[31..0] signals one clock after the PA_ADDR signals specify the write address. The stateless initial data write operation is unaffected by the contents of the control registers in the FBRAM chip 71. The ROP/Blend units 231–233 pass the write data received from the rendering controller 70 without modification. FIG. 11 shows that the six states of address pipeline delay and the five stages of data pipeline delay cause the write data and address to reach the pixel buffer 56 write port at the same time.

During a stateless initial data write operation, the compare result 240 from the compare unit 235 does not affect the writing of data to the SRAM buffer 200. The pixel port control circuit 114 causes the compare unit 235 to enable the pixel buffer write via the pixel buffer write enable signal 276. The PA_PASS_OUT signal is forced high to indicate pass, and the PA_PASS_IN signal is ignored. The four corresponding dirty tag bits for the addressed block and word are set according to the PA_BE[3..0] signals for the 32 bit write data received from the rendering controller 70 over the interleaved rendering bus 64 via the PA_DQ signals. The remaining dirty tag bits for the addressed block are cleared.

The stateless normal data write operation is also unaffected by the contents of the control registers in the FBRAM chip 71. The rendering controller 70 issues the stateless normal data write operation to write 32 bits of data provided by the PA_DQ[31..0] signals to the block and word in the SRAM buffer 200 specified by the PA_ADDR[5..0] signals. During a stateless normal data write operation, the four dirty tag bits for the addressed block and word are inclusive OR'ed with the PA_BE[3..0] signals corresponding to the PA_DQ[31..0] write data. The ROP/Blend units 231–233 pass the write data through without modification, and the compare result 240 does affect data writing to the SRAM buffer 200. The PA_PASS_OUT signal is forced high to indicate pass, and the PA_PASS_IN signal is ignored.

The rendering controller 70 issues a stateful initial data write operation to write 32 bits of data to the SRAM buffer 200 according to the contents of the control registers in the FBRAM chip 71. FIG. 12 shows that the rendering controller 70 specifies the block and word in the SRAM buffer 200 via the PA_ADDR[5..0] signals one clock before providing new data via the PA_DQ[31..0] signals. FIG. 11 shows that the PA_ADDR is used to read the old pixel buffer data at the same time that the rendering controller 70 supplies the new data via the PA_DQ pins (Stage 2 of the pipeline). The new data may be combined with the existing data from the addressed block and word according to the contents of the registers in the FBRAM chip 71 that control pixel ALU operations. FIG. 11 shows that the combined data (Stage 2 pixel buffer read port data and Stage 2 PA_DQ write data) is delayed by five pipeline states and that the address is delayed by six pipeline stages, which causes the combined data and the address to reach the pixel buffer 56 write port at the same time.

During a stateful initial data write operation, the compare result 240 from the compare unit 235 and the PA_PASS_IN signal determine whether the SRAM buffer 200 is written according to the pixel buffer write enable signal 276. The four dirty tag bits for the addressed block and word are set to the PA_BE[3..0] signals received with the new data over the interleaved rendering bus 64. The remaining dirty tag bits for the addressed block are cleared. The writes to the SRAM buffer 200 and the dirty tags memory 194 are conditioned by the pixel buffer write enable 276. A compare test failure if either the PA_PASS_IN signal or the PA_PASS_OUT signal is low disables the write to the SRAM buffer 200.

The rendering controller 70 issues the stateful normal data write operation to write 32 bits of data to the SRAM buffer 200 according to the contents of the control registers in the FBRAM chip 71. The rendering controller 70 specifies the block and word in the SRAM buffer 200 via the PA_ADDR [5..0] signals, and provides new data via the PA_DQ[31..0] signals. The new data may be combined with the existing data in the addressed block and word according to the contents of the registers in the FBRAM chip 71 that control pixel ALU operations. The compare result 240 from the compare unit 235 and the PA_PASS_IN signal determine whether the SRAM buffer 200 is written according to the pixel buffer write enable signal 276. The four dirty tag bits for the addressed block and word are inclusive OR'ed with the PA_BE[3..0] signals received with the new data over the interleaved rendering bus 64. The writes to the SRAM buffer 200 and the dirty tags memory 194 are inhibited by the pixel buffer write enable 276 if either the PA_PASS_IN signal or the PA_PASS_OUT signal indicates a compare test failure. FIG. 11 shows that the compare operation pipeline 235 and the enables pipeline are the same depth as the write data pipeline 230-233, so that the compare decision and write enable conditions reach the pixel buffer 56 write port at the same time as the write data.

The rendering controller 70 issues the replace dirty tag operation to transfer dirty tag data via the PA_DQ[31..0] signals to the dirty tags memory 194. The rendering controller 70 specifies a block in the pixel buffer 56 for the new tag data bits via the PA_ADDR[5..3] signals. The PA_BE [3..0] signals select a byte from the PA_DQ[31..0] signals that provides the new tag data. The new tag data passes through the raster op circuits of the ROP/Blend units 231-233 unmodified.

The rendering controller 70 issues the OR dirty tag operation to perform an inclusive OR function on new tag data and existing tag data in the dirty tags memory. The rendering controller 70 provides the new tag data via the PA_DQ[31..0] signals, and specifies a block in the pixel buffer 56 for the OR function via the PA_ADDR[5..3] signals. The PA_BE[3..0] signals select a byte from the PA_DQ[31..0] signals for the inclusive OR function with the existing dirty tag bits. The new tag data passes through the raster op circuits of the ROP/Blend units 231-233 to perform the inclusive OR function.

The rendering controller 70 issues the write control register operation to transfer new data into an internal control register of the FBRAM chip 71. The rendering controller 70 transfers new data via the PA_DQ[31..0] signals, and specifies the control register via the PA_ADDR signals. The PA_BE[0] signal enables writes to bits 7:0, the PA_BE[1] signal enables writes to bits 15:8, the PA_BE[2] signal enables writes to bits 23:16, and the PA_BE[3] signal enables writes to bits 31:24 of the specified control register.

The internal control registers of the FBRAM chip 71 comprise the plane mask register 198, the constant source register 236, the match mask register 264, the magnitude mask register 266, the ROP/Blend control register 220, the compare control register 268, and the write address control register. The contents of the control registers in the FBRAM chip 71 are ignored during stateless data write operations. The new data loaded into a control register during a write control register operation does not affect operations launched by the rendering controller 70 during previous cycles.

The contents of the plane mask register 198 affect stateful data write pixel port operations and masked write block operations over the global bus 60. During masked write block operations, each bit in the plane mask register 198 provides a write enable for one of 32 bit planes in the DRAM banks A-D.

The constant source register 236 is a 36 bit register that provides constant source data for ROP/Blend and compare operations in the pixel ALU 58. The rendering controller 70 loads the constant source register 236 via the PA_DQ signals and the PA_DX signals over the interleaved rendering bus 64. The ROP/Blend units 231-233 and the compare unit 235 can each select the constant source register 236 to provide source data.

The rendering controller 70 writes to the match mask register 264 to specify the bits that participate in a match test by the match compare circuit 260. The magnitude mask register 266 specifies the bits that participate in a magnitude test by the magnitude compare circuit 262. The rendering controller 70 transfer data to the match mask register 264 and the magnitude mask register 266 via the PA_DQ signals over the interleaved rendering bus 64.

The rendering controller 70 writes to the ROP/Blend control register 220 to control the functions performed by each of the ROP/Blend units 231-233. Each ROP/Blend unit 231-233 is independently controlled by an 8 bit field of the 32 bit ROP/Blend control register 220. For example, bits 0-3 of the ROP/Blend control register 220 select one of the 16 possible raster ops for the ROP/Blend unit 230, and bits 8-11 of the ROP/Blend control register 220 select one of the 16 possible raster ops for the ROP/Blend unit 231.

Table 7 lists the raster ops performed by each ROP/Blend unit 231-233 for one embodiment. The raster ops are selected by bits 0-3 of the corresponding portion of the ROP/Blend control register 220. NEW represents either the new data supplied by the rendering controller 70 via the PA_DQ[31..0] signals or the contents of the constant source register 236. OLD represents the old data stored in the pixel buffer 56.

TABLE 7

| Encoding | Raster Operation |
|---|---|
| 0000 | all bits zero |
| 0001 | NEW and OLD |
| 0010 | NEW and ⁻OLD |
| 0011 | NEW |
| 0100 | ⁻NEW and OLD |
| 0101 | OLD |
| 0110 | NEW xor OLD |
| 0111 | NEW or OLD |
| 1000 | ⁻NEW and ⁻OLD |
| 1001 | ⁻NEW xor OLD |
| 1010 | ⁻OLD |
| 1011 | NEW or ⁻OLD |
| 1100 | ⁻NEW |
| 1101 | ⁻NEW or OLD |
| 1110 | ⁻NEW or ⁻OLD |

TABLE 7-continued

| Encoding | Raster Operation |
|---|---|
| 1111 | all bits one |

Bit 4 of the ROP/Blend control register 220 selects either a raster op function or a blend function for the ROP/Blend unit 230. Bit 5 of the ROP/Blend control register 220 selects a source for the raster op circuit 222 and the adder 224 from either the PA_DQ[31..0] signals or the constant source register 236. Analogous bits of the ROP/Blend control register 220 correspond to the ROP/Blend units 231–233.

Table 8 lists the source fractions for the multiplier circuit 228. The ROP/Blend units 0–n listed comprise the ROP/Blend units 230–233. The source fractions for the multiplier circuit 228 of the ROP/Blend unit 230 are selected by bits 7–6 the ROP/Blend control register 220.

TABLE 8

| Encoding | Fraction Source for ROP/Blend Unit #n |
|---|---|
| 00 | 100H (1.00) |
| 01 | Constant Source register |
| 10 | PA_DX[n],PA_DQ[8n + 7 ..8n] |
| 11 | PA_DX[3],PA_DQ[31 ..24] |

The rendering controller 70 writes to the compare control register 268 to control the functions of the compare unit 235. Bit 16 of the compare control register 268 selects the source for the compare unit 235 from either data received from the rendering controller 70 via the PA_DQ signals or data from the constant source register 236. Bits 27–24 of the compare control register 268 control the picking logic of the FBRAM chip 71. Bits 25–24 clear/set the HIT flag and bits 27–26 enable/disable the picking logic.

Table 9 lists the magnitude compare tests of the compare unit 235. The magnitude compare tests of the compare unit 235 are selected by bits 2–0 of the compare control register 268. Bits 2–0 of the compare control register 268 select one of eight tests for the magnitude compare circuit 262.

TABLE 9

| Encoding | Test Condition |
|---|---|
| 000 | Pass always |
| 001 | Pass if NEW > OLD |
| 010 | Pass if NEW == OLD |
| 011 | Pass if NEW >= OLD |
| 100 | Pass never |
| 101 | Pass if NEW <= OLD |
| 110 | Pass if NM != OLD |
| 111 | Pass if NEW < OLD |

Table 10 lists the match compare tests of the compare unit 235. The match compare tests of the compare unit 235 are selected by bits 9–8 of the compare control register 268. Bits 9–8 of the compare control register 268 select one of four comparison tests for the match compare circuit 260.

TABLE 10

| Encoding | Test Condition |
|---|---|
| 00 | Pass always |
| 01 | Pass never |
| 10 | Pass if NEW == OLD |

TABLE 10-continued

| Encoding | Test Condition |
|---|---|
| 11 | Pass if NEW != OLD |

A stateful write operation writes to the pixel buffer 56 only if the magnitude test by the magnitude compare circuit 262 and the match test by the match compare circuit 260 and the PA_PASS_IN signal each indicate pass. The PA_PASS_OUT signal indicates pass if the magnitude test and match test both pass.

The HIT flag of the compare control register 268 is set if a stateful write operation passes the magnitude and match tests while the picking logic of the FBRAM chip 71 is enabled and the PA_PASS_IN also indicates pass. The HIT flag then remains set until a write to the compare control register 268 clears bit 24. The HIT flag of the compare control register 268 is reflected on a HIT input/output interface pin of the FBRAM chip 71.

The write address control register in the pixel port control circuit 114 selects a write address source for the SRAM buffer 200 during pixel port write operations. The write address source for the SRAM buffer 200 is either the PA_ADDR[5..0] signals or the PA_DQ[29..24] signals. The rendering controller 70 normally programs the write address control register to select the PA_ADDR[5..0] signals for the write address source during pixel port writes. The rendering controller 70 programs the write address control register to select the PA_DQ[29..24] signals as the write address source for pixel port writes during vertical scroll and other internal copy operations.

Figure 15:
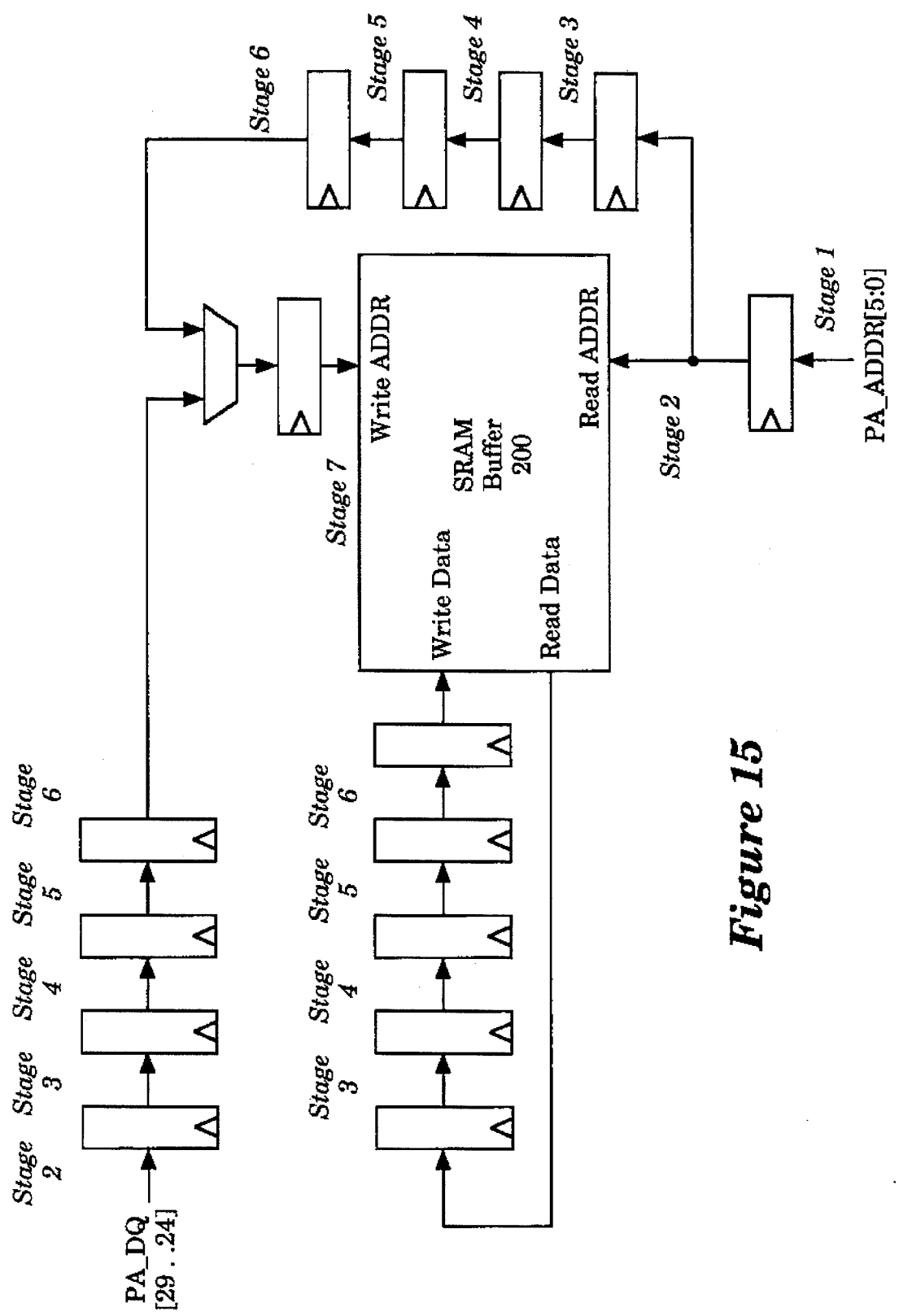
FIG. 15 illustrates the pipelined data flow into the pixel buffer for write address sources selected by the write address control register and the input/output pins of an FBRAM chip.

FIG. 15 illustrates the pipelined data flow to the pixel buffer 56 from both write address sources selected by the write address control register. The pipeline flow for the write address source in combination with the write address selection function provided by the write address control register when the write address source is the PA_DQ [29..24] signals enables fast vertical scroll and internal operations copy. The pipelined architecture of the pixel ALU 58 enables the rendering controller 70 to copy read data from one location of the SRAM buffer 200 specified by PA_ADDR [5.0] and write the data into another location of the SRAM buffer 200 specified by PA_DQ [29..24] with one stateful data write operation at a rate of 32 bits per FBRAM per clock during vertical scroll and internal copy operations.

Figure 16:
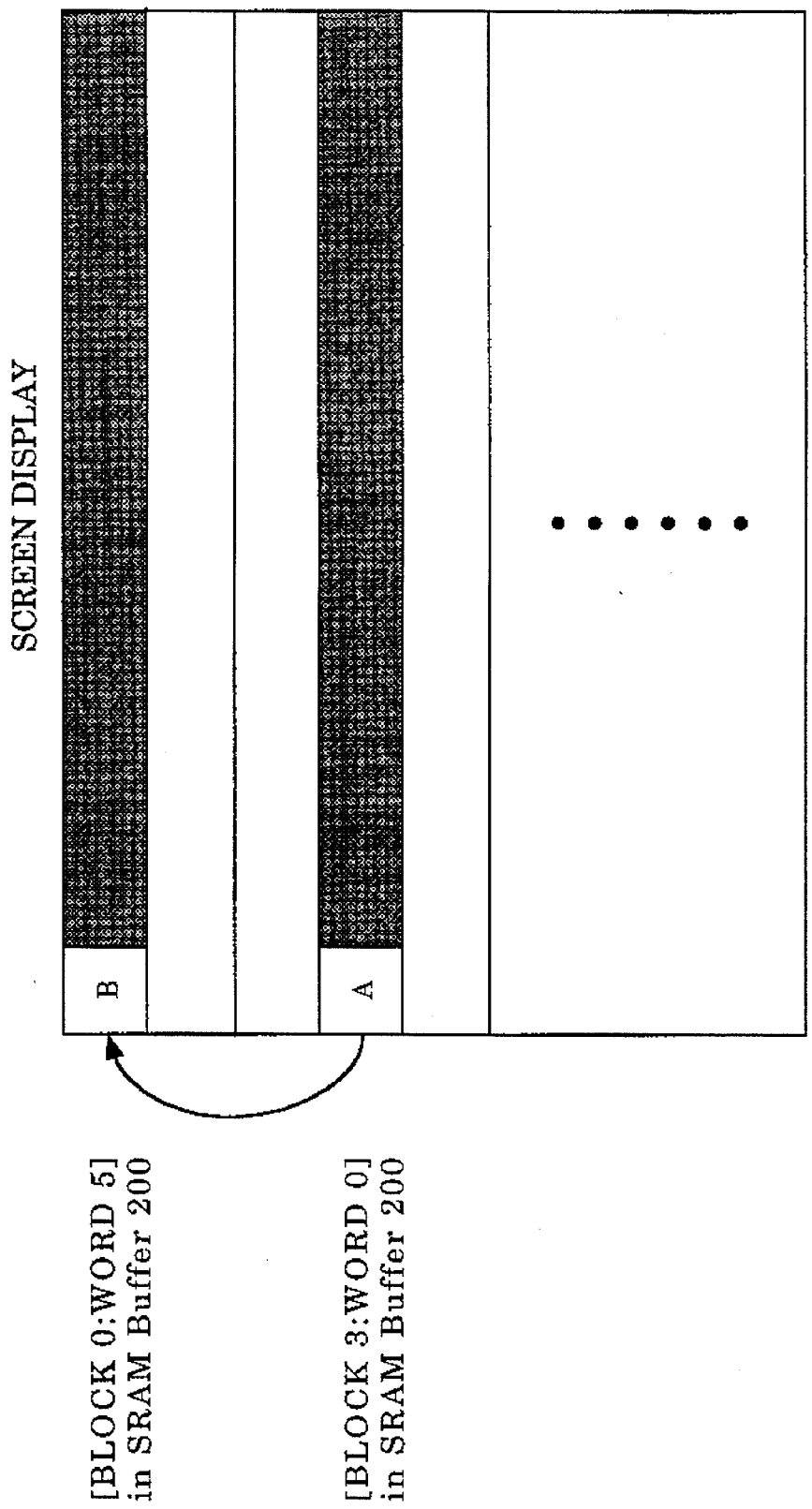
FIG. 16 illustrates a vertical scroll operation, wherein the pixel data for pixel A is moved to pixel B of the screen display.

FIG. 16 illustrates a vertical scroll operation, wherein the pixel data for Pixel A is moved to Pixel B. The pixel data for the pixel A is stored in Block 3: Word 0 of the SRAM buffer 200. The pixel data for the Pixel B is stored in Block 0: Word 5 of the SRAM buffer 200.

Figure 17:
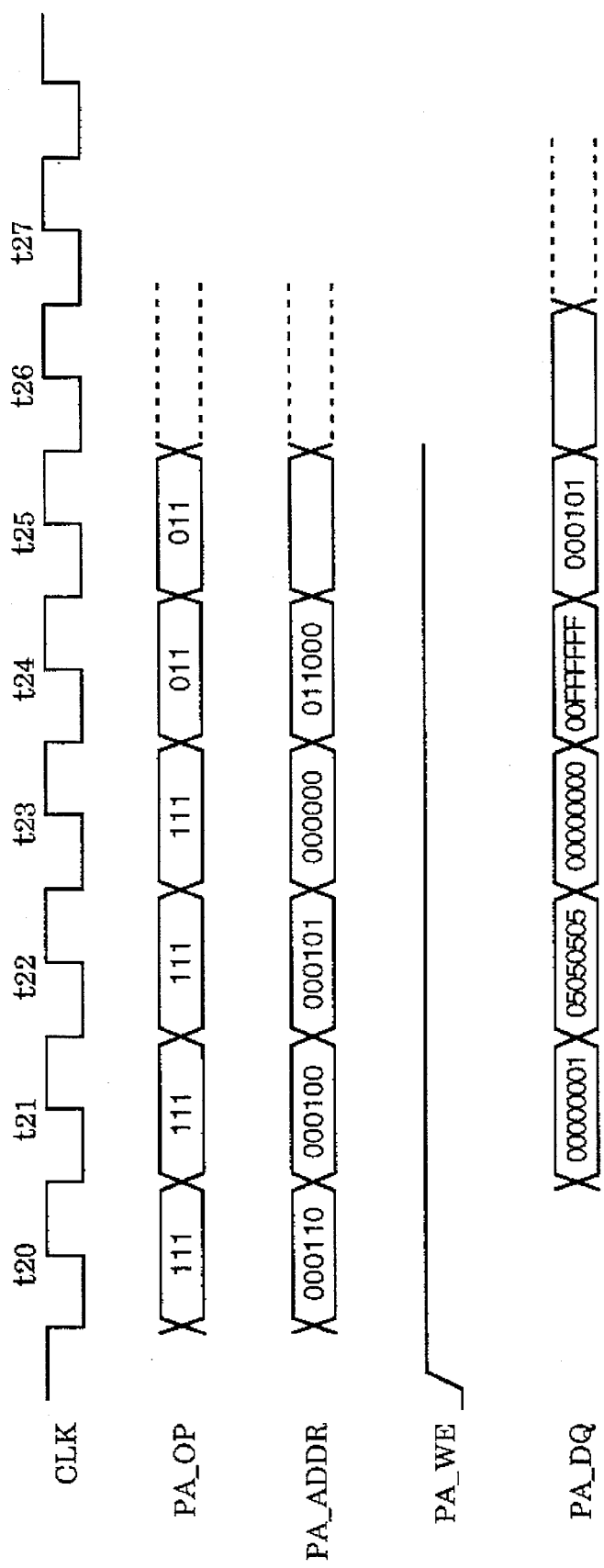
FIG. 17 illustrates the pipelined transfer of the pixel data during a vertical scroll or other internal copy operation that employs the write address selection function with a stateful data write operation.

FIG. 17 illustrates the pipelined transfer of the pixel data from the Pixel A to the Pixel B during a vertical scroll or other internal copy operation that employs the write address selection function with a stateful data write operation. The rendering controller 70 writes the control registers in the FBRAM chip 71 to set up the vertical scroll operation before launching the stateful write operation to move the Pixel A to the Pixel B.

The rendering controller 70 programs the write address control register to select the PA_DQ[29..24] signals for the write address to the SRAM buffer 200. The rendering controller 70 programs the ROP/Blend control register 220 to select old data for the ROP/Blend units 230–233. The rendering controller 70 programs the compare control register 268 to always pass. The rendering controller 70 programs the plane mask register 198 to pass the desired bits into the SRAM buffer 200 during the stateful data write operation.

The rendering controller 70 writes to the write address control register during time t20. During time t20, the write address control register is selected via the PA__ADDR signals. During time t21, the rendering controller 70 transfers the data targeted for the write address control register via the PA__DQ signals.

During successive address cycles on the interleaved rendering bus 64 between times t21–t23, and data cycles between times t22–t24, the rendering controller 70 programs the ROP/Blend control register 220 to select old data for each of the ROP/Blend units 231–233, and programs the compare control register 268 to indicate pass always, and programs the plane mask register 198 to enable the desired bits into the SRAM buffer 200 during the stateful write operation.

The rendering controller 70 transfers the address for the Pixel A via the PA__ADDR[5..0] signals during time t24, and then transfers the address for the Pixel B via the PA__DQ[29..24] signals during time t25. Seven pipeline cycles later, the Pixel A data is written into the Pixel B location.

Table 11 lists the DRAM access operations provided by the FBRAM chip 71 for one embodiment. The DRAM access operations include page access operations, block access operations, and video buffer load operations. The page access operations include an access page operation, a precharge operation, and a duplicate page operation. The block access operations include read block operations, unmasked write block operations, and masked write block operations. The rendering controller 70 can launch a DRAM access operation each cycle of the interleaved rendering bus 64 via the DRAM__ signals.

TABLE 11

| Operation | DRAM_OP | DRAM_BANK | DRAM_ADDR |
| --- | --- | --- | --- |
| Unmasked Write Block (UWB) | 000 | Bank | SRAM Block (3 pins), DRAM Block (6 pins) |
| Masked Write Block (MWB) | 001 | Bank | SRAM Block (3 pins), DRAM Block (6 pins) |
| Precharge Bank (PRE) | 010 | Bank | — |
| Video Transfer (VDX) | 011 | Bank | Ctrl (2 pins), Line (4 pins) |
| Duplicate Page (DUP) | 100 | Bank | Page (9 pins) |
| Read Block (RDB) | 101 | Bank | SRAM Block (3 pins), DRAM Block (6 pins) |
| Access Page (ACP) | 110 | Bank | Page (9 pins) |
| No Operation (NOP) | 111 | — | — |

The rendering controller 70 launches page access operations to select pages of the DRAM banks A–D. The rendering controller 70 specifies the DRAM bank A–D via the DRAM__BANK signals and specifies the accessed page via the DRAM__ADDR[8..0] signals.

The rendering controller 70 launches block access operations to transfer blocks of data between the page buffers A–D and the pixel buffer 56. The rendering controller 70 specifies the DRAM bank A–D and the page buffer A–D via the DRAM__BANK signals. The rendering controller 70 specifies the pixel cache block in the pixel buffer 56 via the DRAM__ADDR[8..6] signals, and selects a block of the specified page buffer A–D via the DRAM__ADDR[5..0] signals.

The rendering controller 70 issues an unmasked write block operation to transfers a block of data from the specified block of the pixel buffer 56 to the specified block of the specified page buffer A–D over the global bus 60. The plane mask bits in the plane mask register 198 do not affect unmasked write block operations. The dirty tag bits in the dirty tags memory 194 that correspond to the specified block of the pixel buffer 56 control byte wise writes to the specified page buffer A–D.

The rendering controller 70 issues a masked write block operation to transfer a block of data from the specified pixel cache block of the pixel buffer 56 to the specified block of the specified page buffer A–D over the global bus 60. The plane mask register 198 and the dirty tag bits for the specified pixel cache block of the pixel buffer 56 control bitwise writes to the page buffer A–D of the specified DRAM bank A–D.

The rendering controller 70 issues a precharge bank operation to precharge the sense amplifiers in the specified DRAM Bank A–D. The rendering controller 70 issues a precharge bank operation in preparation for a subsequent access page operation.

The rendering controller 70 issues a video transfer operation to transfer a 640 bit line of sense amp data from the specified page buffer A–D to the corresponding video buffer 52 or 54. The rendering controller 70 uses the DRAM__ADDR[3..0] signals to specify the line from the page buffer A–D.

The rendering controller 70 issues a duplicate page operation to transfer sense amp data in the specified page buffer A–D to the specified page in the corresponding DRAM bank A–D. The plane mask bits in the plane mask register 198 do not affect duplicate page operations.

The rendering controller 70 issues a read block operation to transfer a block of data from the specified block of the specified page buffer A–D to the specified pixel cache block of the pixel buffer 56 over the global bus 60. The read block operation clears the dirty tag bits for the specified pixel cache block of the pixel buffer 56.

The rendering controller 70 issues an access page operation to transfer data from the specified page in the specified DRAM bank A–D to the corresponding sense amps in the page buffers A–D. The rendering controller 70 precedes an access page operation to a particular DRAM bank A–D by a precharge operation to that DRAM bank.

Figure 18:
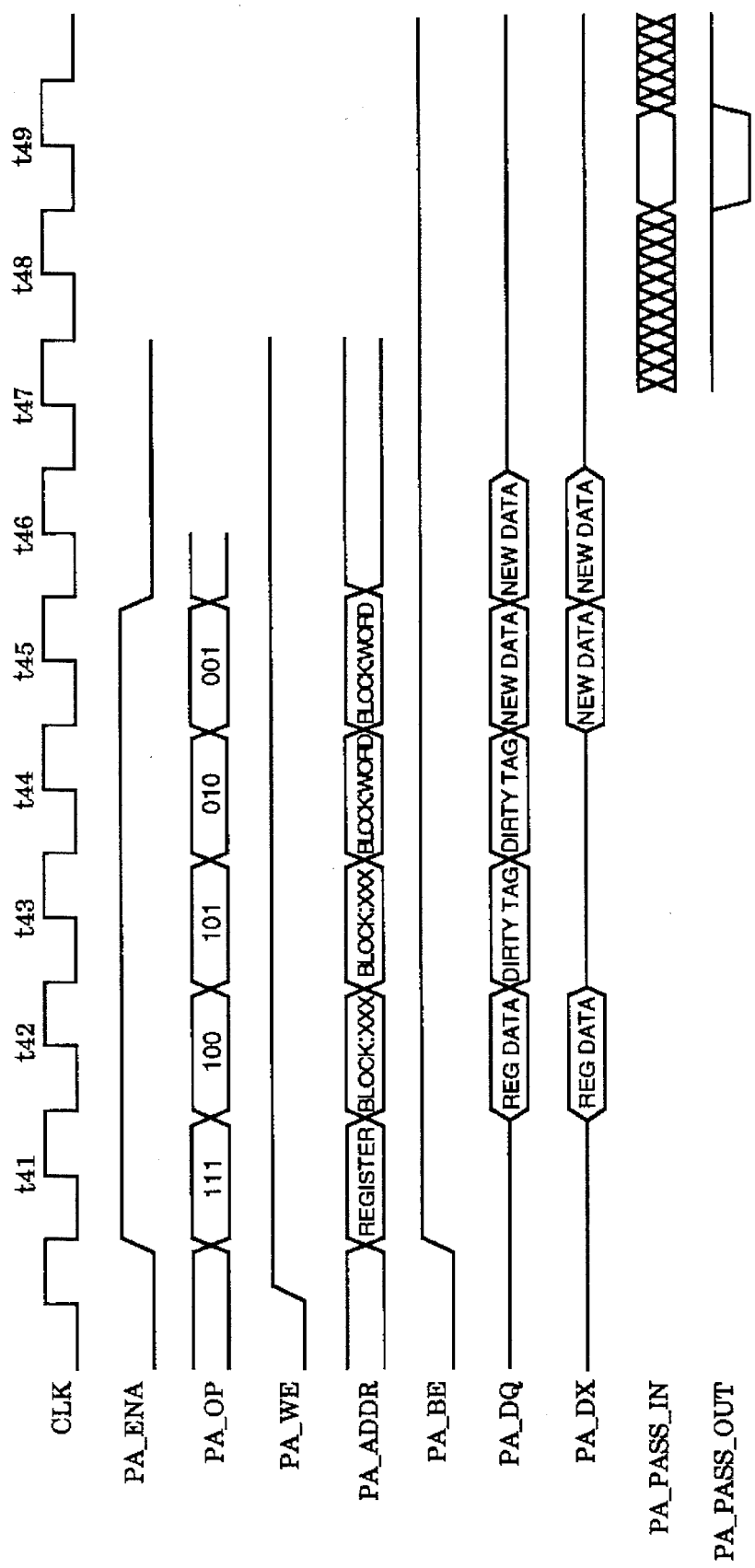
FIG. 18 illustrates pixel port write timing to an FBRAM chip for one embodiment.

FIG. 18 illustrates pixel port write timing to the FBRAM chip 71 for one embodiment. The pixel port control signals shown are synchronized by a master clock signal (CLK) on the interleaved rendering bus 64. The master clock signal CLK also synchronizes data transfer over the interleaved rendering bus 64 via the PA__DQ signals and the PA__DX signals.

At time t41, the rendering controller 70 issues a write control register operation over the interleaved rendering bus 64. The PA__OP signals indicate the write control register operation and the PA__ADDR signals to specify the internal register of the FBRAM chip 71.

At time t42, the rendering controller 70 issues a replace dirty tag operation via the PA_OP signals. The rendering controller 70 specifies the block for the replace dirty tag operation via the PA_ADDR signals. Also at time t42, the rendering controller 70 transfers the register data via the PA_DQ and the PA_DX pins for the write control register operation launched at time t41.

At time t43, the rendering controller 70 launches an OR dirty tag operation via the PA_OP signals and uses the PA_ADDR signals to indicate the block for the OR dirty tag operation. Also at time t43, the dirty tag bits for the replace dirty tag operation launched at time t42 are transferred by the rendering controller 70 via the PA_DQ signals.

At time t44, the PA_OP signals indicate a stateful initial write operation launched by the rendering controller 70 and the PA_ADDR signals indicate the block and the word for the statefull operation. Also at time t44, the dirty tags for the OR dirty tag operation launched at time t43 are transferred via the PA_DQ signals by the rendering controller 70.

At time t45, the PA_OP signals indicate a stateless initial write operation issued by the rendering controller 70. Also at time t45, the rendering controller 70 transfers the new data via the PA_DQ and the PA_DX signals for the statefull initial write operation launched at t44.

At time t46, the new data for the stateless initial data write operation launched at t45 is transferred by the rendering controller 70 via the PA_DQ and the PA_DX signals. At time t49, the FBRAM chip 71 receives the valid PA_PASS_IN signal and transfers the resulting PA_PASS_OUT signal for the statefull initial write operation launched at t44.

Figure 19:
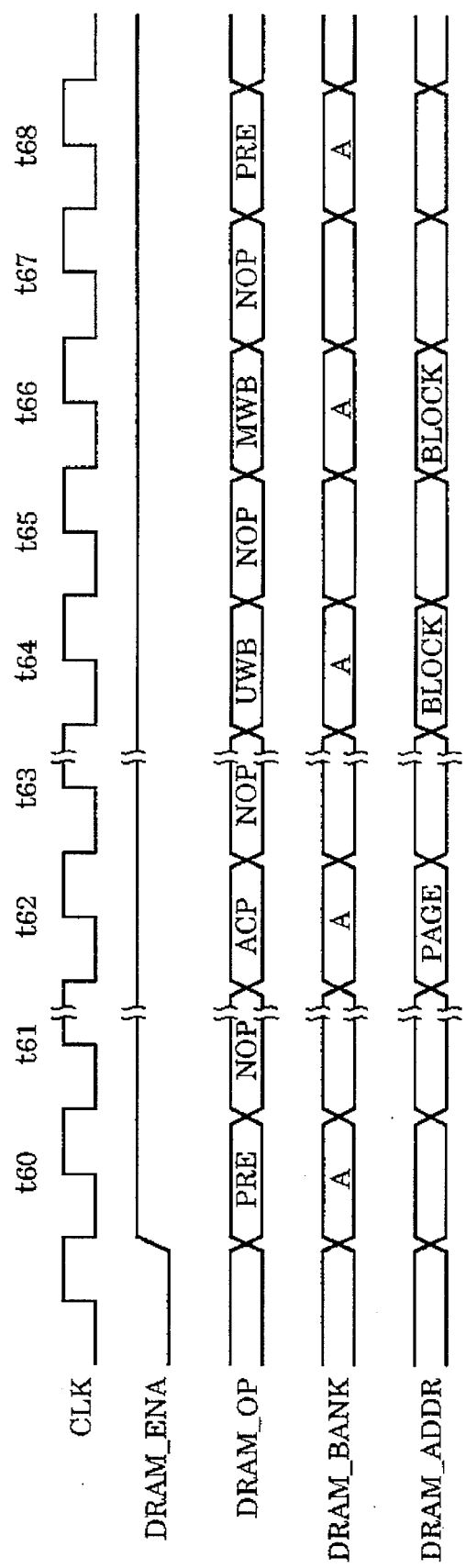
FIG. 19 illustrates a series of DRAM operations to the DRAM bank A of an FBRAM chip launched by the rendering controller.

FIG. 19 illustrates a series of DRAM operations to the DRAM bank A of the FBRAM chip 71 for one embodiment. At time t60, the rendering controller 70 launches a precharge operation (PRE) via the DRAM_OP signals. The rendering controller 70 indicates the DRAM bank A via the DRAM_BANK signals and indicates the page of the DRAM bank A for the precharge operation via the DRAM_ADDR signals. At time t61, the rendering controller 70 indicates no op (NOP) cycle on the interleaved rendering bus 64.

At time t62, the rendering controller 70 launches an access page operation (ACP) via the DRAM_OP signals and indicates the DRAM bank A via the DRAM_BANK signals. The rendering controller 70 uses the DRAM_ADDR signals to indicate the page of the DRAM bank A for the access page operation.

At time t64, the rendering controller 70 issues an unmasked write block operation (UWB) via the DRAM_OP signals and indicates the DRAM bank A via the DRAM_BANK signals. The rendering controller 70 transfers the block address for the unmasked write block operation via the DRAM_ADDR signals.

At time t66, the rendering controller 70 issues a masked write block operation (MWB) targeted for the DRAM bank A. At time t66, the rendering controller 70 transfers the block address for the masked write block operation via the DRAM_ADDR signals. At time t68 the rendering controller 70 launches a precharge operation to the DRAM bank A and transfers the DRAM page identifier for the precharge operation via the DRAM_ADDR signals.

Figure 20:
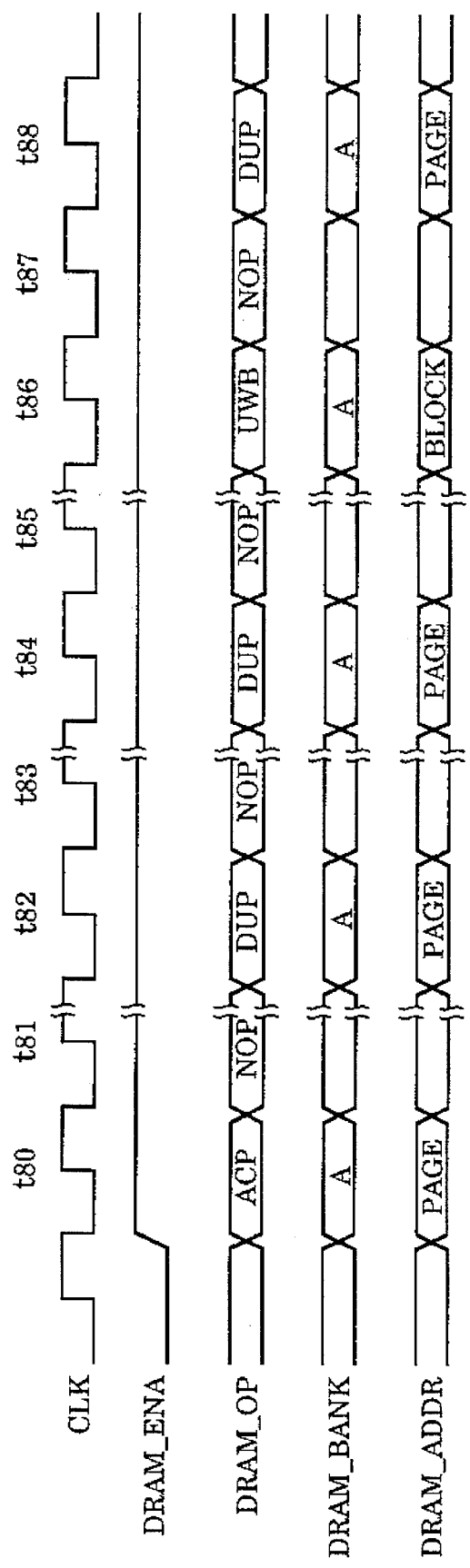
FIG. 20 illustrates another series of DRAM operations on the DRAM bank A on an FBRAM chip launched by the rendering controller.

FIG. 20 illustrates a series of DRAM operations on the DRAM bank A on the FBRAM chip 71. At time t80, the rendering controller 70 indicates an access page operation via the DRAM_OP signals and specifies the DRAM bank A via the DRAM_BANK signals and specifies the page for the access page operation via the DRAM_ADDR signals.

At time t82, the rendering controller 70 indicates a duplicate page operation (DUP) via the DRAM_OP signals. The rendering controller 70 indicates the DRAM bank A via the DRAM_BANK signals and the page for the duplicate page operation via the DRAM_ADDR signals.

At time t84 the rendering controller 70 launches a duplicate page operation to the DRAM bank A and specifies the page for the duplicate page operation via the DRAM_ADDR signals. At time t86, the rendering controller 70 issues an unmasked write block operation to the DRAM bank A and specifies the block via the DRAM_ADDR signals. At time t88, the rendering controller 70 launches a duplicate page operation on the DRAM bank A and indicates the page for the duplicate page operation via the DRAM_ADDR signals.

Figure 21:
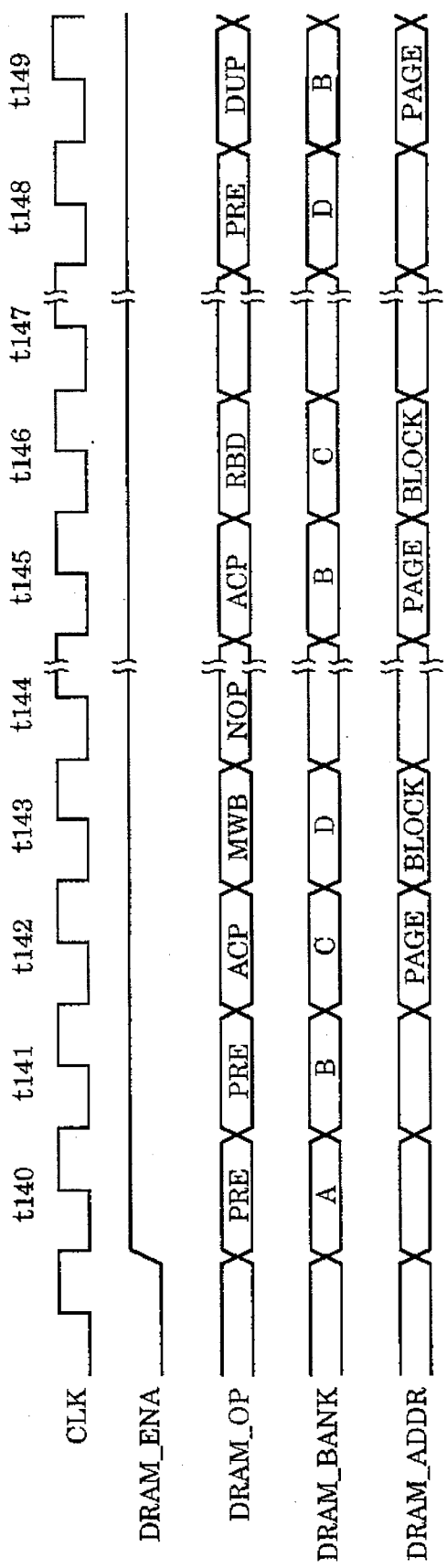
FIG. 21 illustrates a series of DRAM operations issued by the rendering controller to the DRAM banks A–D of an FBRAM chip.

FIG. 21 illustrates a series of DRAM operations issued by the rendering controller 70 to the DRAM banks A–D of the FBRAM chip 71. At time t140, the rendering controller 70 launches a precharge operation on the DRAM bank A and indicates the page for the precharge operation on the DRAM_ADDR signals.

At time t141, the rendering controller 70 launches a precharge operation on a page of the DRAM bank B. At time t142, the rendering controller 70 launches an access page operation on a page of the DRAM bank C. At time t143, the rendering controller 70 launches a masked write block operation on the DRAM bank D and indicates the block via the DRAM_ADDR signals.

At time t145, the rendering controller 70 launches an access page operation to the DRAM bank B. At time t146, the rendering controller 70 launches a read block operation to the DRAM bank C. At time t148, the rendering controller 70 launches a precharge operation to the DRAM bank D. At time t149, the rendering controller 70 launches a duplicate page operation to the DRAM bank B.

Figure 22:
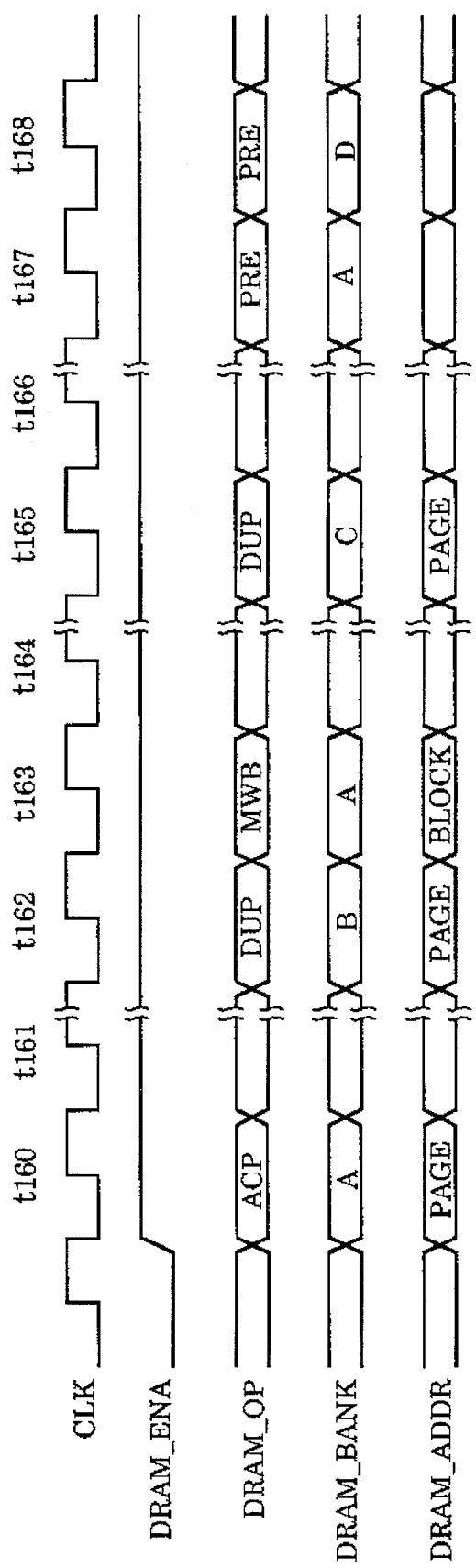
FIG. 22 illustrates another series of DRAM operations launched by the rendering controller to an FBRAM chip.

FIG. 22 illustrates a series of DRAM operations launched by the rendering controller 70 to the FBRAM chip 71. At time t160, the rendering controller 70 launches an access page operation to the DRAM bank A. At time t162, the rendering controller 70 launches a duplicate page operation to the DRAM bank B. At time t163, the rendering controller 70 launches a masked write block operation on the DRAM bank A at the block specified via the DRAM_ADDR signals.

At time t165, the rendering controller 70 launches a duplicate page operation on a page of the DRAM bank C. At time t167, the rendering controller 70 launches a precharge operation on the DRAM bank A. At time t168, the rendering controller 70 launches an access page operation on the DRAM bank D.

Figure 23:
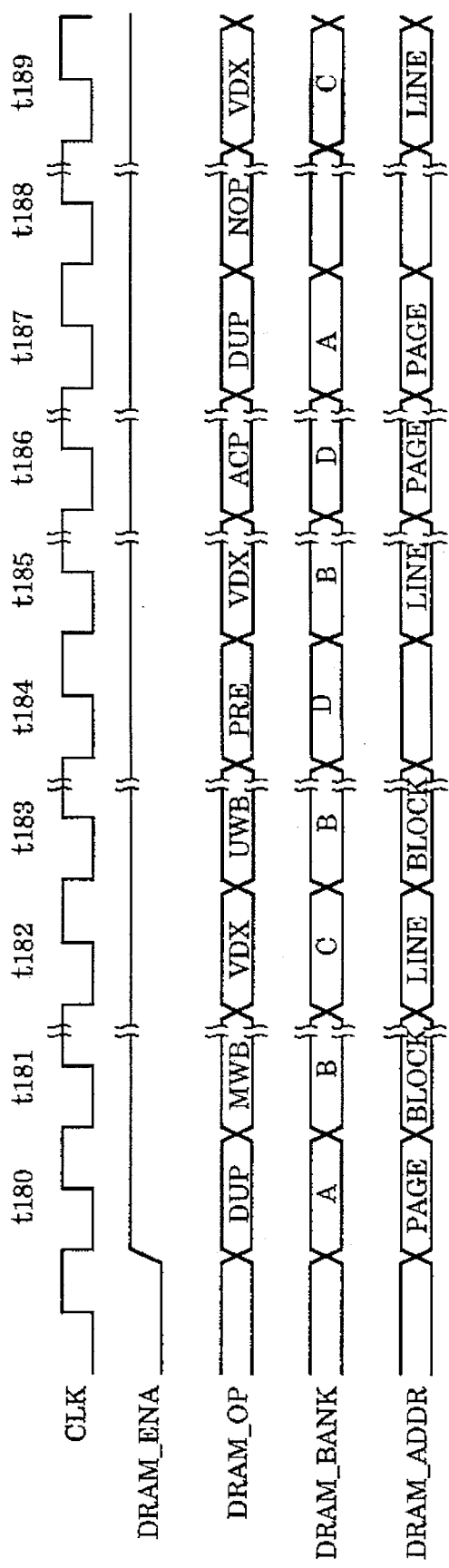
FIG. 23 illustrates another series of DRAM operations launched by the rendering controller to an FBRAM chip.

FIG. 23 illustrates a series of DRAM operations launched by the DRAM controller 70 on the FBRAM chip 71. At time t180, the rendering controller 70 launches a duplicate page operation on the DRAM bank A and at time t181 the rendering controller 70 launches a masked write block operation on the DRAM bank B.

At time t182, the rendering controller 70 launches a video transfer operation on the DRAM bank C at a line indicated on the DRAM_ADDR signals. At time t183, the rendering controller 70 launches an unmasked write block operation to the DRAM bank B.

At time t184, the rendering controller 70 launches a precharge operation to the DRAM bank D and at time t185 launches a video transfer operation to the DRAM bank B. At time t186, the rendering controller 70 launches an access page operation to the DRAM bank D and at time t187 launches a duplicate page operation to the DRAM bank A. At time t189, the rendering controller 70 launches a video transfer operation to the DRAM bank C.

Figure 24:
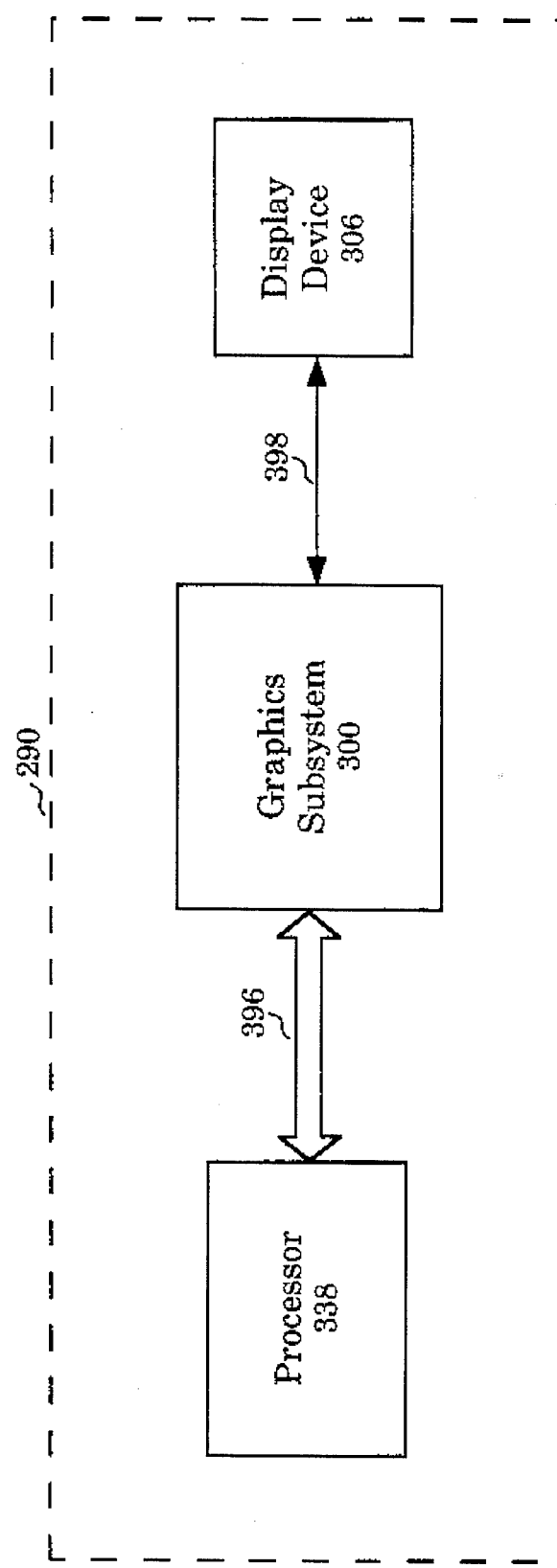
FIG. 24 illustrates a computer graphics system comprising a graphics subsystem, and display device and a processor.

FIG. 24 illustrates a computer graphics system 290. The computer graphics system 290 comprises a processor 338, a graphics subsystem 300, and display device 306. The processor 338 communicates with the graphics subsystem 300 over a system bus 396.

The processor 338 executes computer graphics application programs. The computer graphics application programs generate graphics data that define graphical elements for display. The processor 338 transfers graphics data to the graphics subsystem 300 over the system bus 396. The processor 338 also accesses graphics data from the graphics subsystem 300 over the system bus 396 for interactive computer graphics application programs.

The graphics subsystem 300 processes the graphics data received from the processor 338 and renders the corresponding graphical elements onto the display device 306. The graphics subsystem 300 communicates with the display device 306 over a set of interface lines 398. The interface lines 398 transfer the red, green and blue video signals and video sync signals for generating images on the display device 306.

Figure 25:
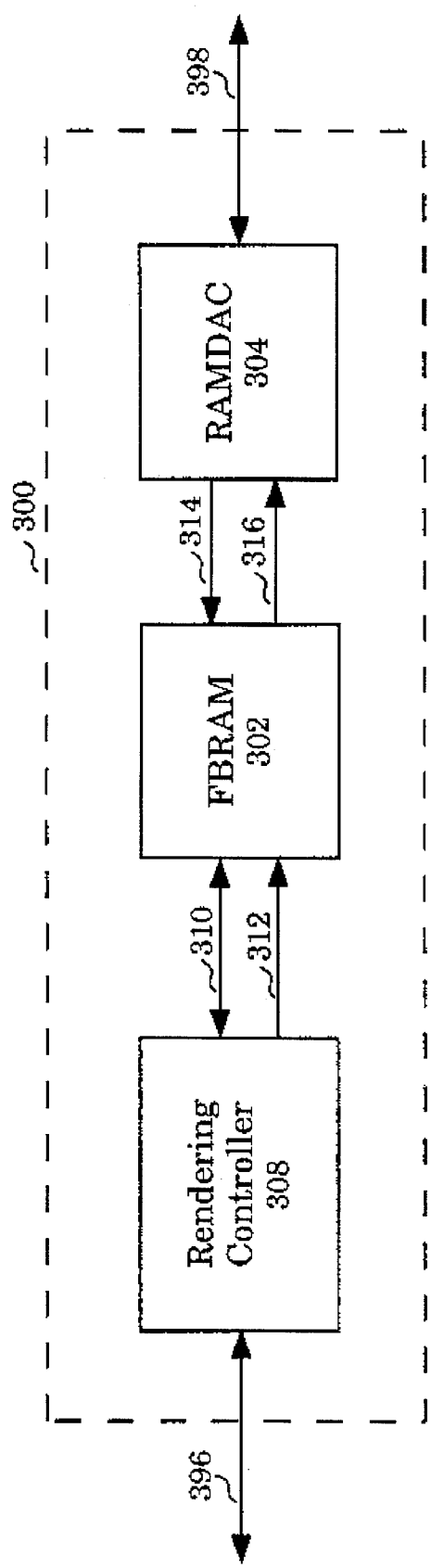
FIG. 25 illustrates a graphics subsystem comprising an FBRAM chip, a rendering controller, and a random access memory digital-to-analog converter.

FIG. 25 illustrates the graphics subsystem 300. The graphics subsystem 300 comprises one or more FBRAM chips 302, a rendering controller 308, and a random access memory digital-to-analog converter (RAMDAC) 304.

The rendering controller 308 accesses the FBRAM chips 302 over a rendering bus 310. The rendering controller 308 controls the functions of the FBRAM chips 302 over a control bus 312. The rendering controller 308 controls the operations of the FBRAM chips 302 including the pixel port operations, the DRAM operations, and other FBRAM operations.

The rendering controller 308 transfers pixel data for the FBRAM chips 302 over the rendering bus 310. The rendering controller 308 transfers address and control signals for the FBRAM chips 302 over the control bus 312. The FBRAM chips 302 transfer video data to the RAMDAC 304 over a video bus 316. The RAMDAC 304 generates a video clock 314 that synchronizes the transfer of video data over the video bus 316. The RAMDAC 304 transfers video signals over the interface lines 398 to render images on the display device 306.

For one embodiment, a single FBRAM chip 302 is arranged as a single buffer 1280×1024 frame buffer for the display device 306. Each pixel for the display device 306 comprises 8 bits. A display frame on the display device 306 comprises an 8 wide by 32 high array of page groups in the FBRAM chip 302. Each page group is 160 pixels wide by 32 pixels high. Each page group comprises one page from each DRAM banks A–D.

The four independent DRAM banks A–D in the FBRAM chip 302 are interleaved. The interleaved DRAM banks A–D enable the rendering controller 308 to launch page prefetch operations on one the DRAM banks A–D while rendering images into another DRAM bank A–D.

Each DRAM page within a page group of the FBRAM chip 302 is 80 pixels wide by 16 pixels high. The DRAM pages are subdivided into 16 scanlines each 80 pixel wide for transfer to the corresponding video buffers for the DRAM banks A–D. The DRAM pages are subdivided into a 10 wide by 4 high array of 256 bit blocks for transfer over the global bus in the FBRAM chip 302. Two pixels are shifted out of the video buffers of the FBRAM chip 302 over the video bus 316 during each cycle of the video clock 314.

Pixel blocks transferred between the pixel buffer and the DRAM banks A–D over the global bus of the FBRAM chip 302 are 8 pixels wide by 4 pixels high. The rendering controller 308 accesses sets of four pixels from the specified pixel cache block of the pixel buffer in the FBRAM chip 302 over the rendering bus 310. The pixel ALU in the FBRAM chip 302 internally accesses sets of four pixels from the pixel cache blocks of the pixel buffer. The rendering controller 308 writes the dirty tag bits for a pixel cache block of the pixel buffer in the FBRAM chip 302 in one cycle over the rendering bus 310.

The following equations determine the DRAM bank A–D, the DRAM page, the scanline in a page, the block within a page, the word within a block, and the pixel within a word for each pixel of the single buffer 1280×1024×8 bit frame buffer provided by the FBRAM chip 302.

DRAM bank=2*((y % 32)/16)+(x % 160)/80 page=8*(y/32)+x/160 scanline=y % 16 block=(y % 16)/4+4*((x % 80)/8)

word=2*(y % 4)+(x % 8)/4 pixel=x % 4 wherein x and y are the display coordinates of the pixel, and wherein "%" indicates an integer modulus operation and "/" indicates an integer divide operation in C programming syntax, and wherein DRAM bank=0 specifies DRAM bank A, DRAM bank=1 specifies DRAM bank B, DRAM bank=2 specifies DRAM bank C, DRAM bank=3 specifies DRAM bank D.

For another embodiment, a single FBRAM chip 302 is arranged as a double buffered 640×512×8 bit frame buffer with a 16 bit Z buffer for the display device 306. The Z compare functions and ROP/Blend functions are performed within the FBRAM chip 302.

Figure 26:
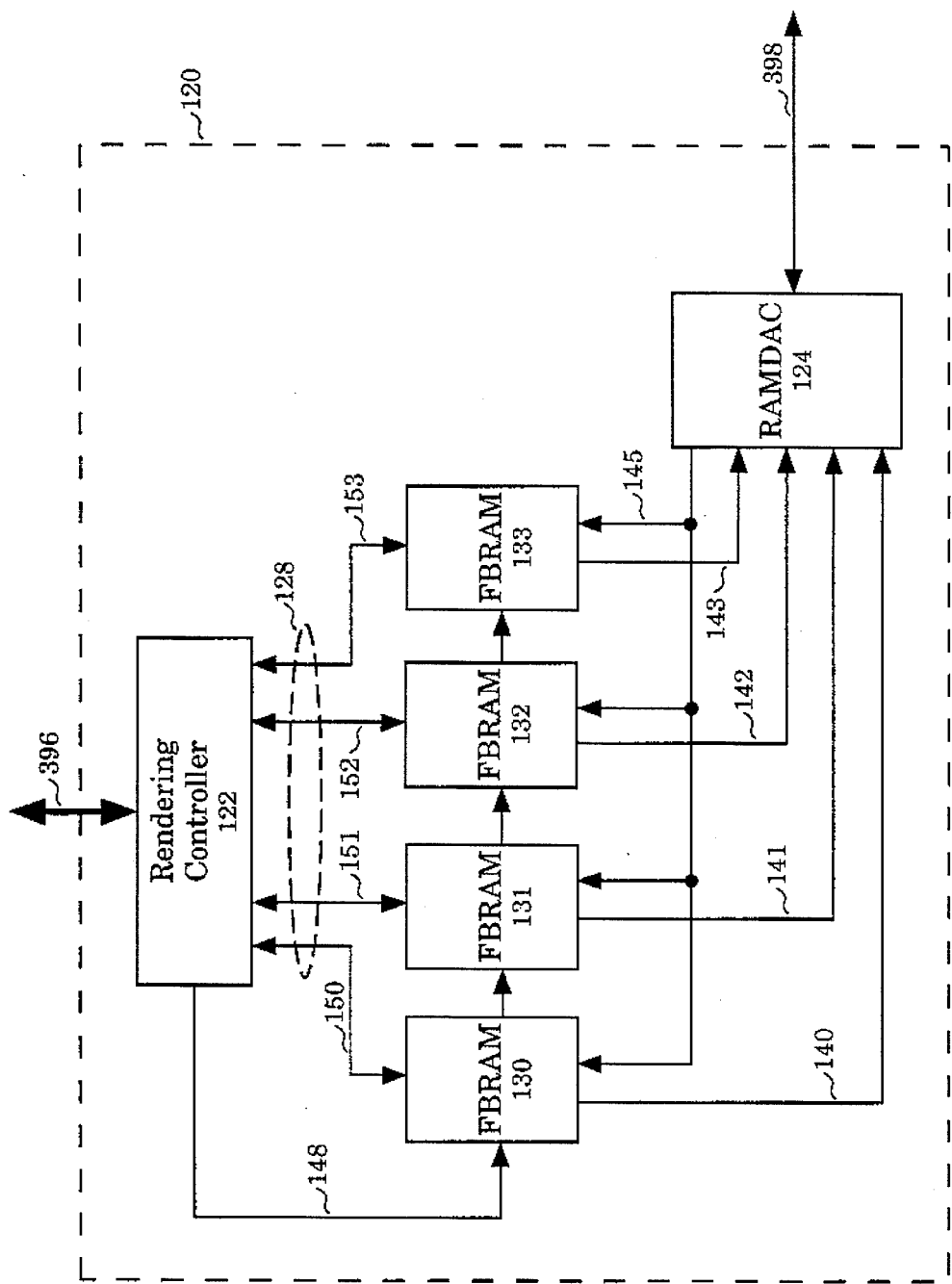
FIG. 26 illustrates a graphics subsystem comprising a set of FBRAM chips which provide a single buffered 1280×1024×32 bit frame buffer for a display device, and further comprising a rendering controller and a RAMDAC.

FIG. 26 illustrates a graphics subsystem 120. The graphics subsystem 120 comprises a set of FBRAM chips 130–133. The FBRAM chips 130–133 provide a single buffered 1280×1024×32 bit frame buffer for the display device 306. The graphics subsystem 120 further comprises a rendering controller 122, and a RAMDAC 124.

The rendering controller 122 transfers pixel data for the FBRAM chips 130–133 over a rendering bus 128. The rendering controller 122 controls the operations of the FBRAM chips 130–133 over a control bus 148, including the pixel port access operations, the video access operations, and DRAM access operations.

The RAMDAC 124 generates a video clock 145 that synchronizes the transfer of video data from the FBRAM chips 130–133 over a set of video buses 140–143. The rendering controller 122 accesses pixel data in each FBRAM chip 130–133 over a set of rendering buses 150–153. The rendering controller 122 transfers address and control signals to the FBRAM chips 130–133 over the control bus 148.

The FBRAM chips 130–133 are arranged as a single buffered 1280×1024 frame buffer for the display device 126, wherein each pixel comprises 32 bits. Each 32 bit pixel comprises an 8 bit red value, an 8 bit green value, an 8 bit blue value, and an 8 bit X value used for blending, overlays, window attribute controls or window clipping codes such as window I.D.

For one embodiment, each FBRAM chip 130–133 provides a 1280×1024×8 bit pixel buffer for one of the 8 bit components of the pixels. The FBRAM chip 130 provides a 1280×1024×8 bit red buffer, the FBRAM chip 131 provides a 1280×1024×8 bit green buffer, the FBRAM chip 132 provides a 1280×1024×8 bit blue buffer, and the FBRAM chip 133 provides a 1280×1024×8 bit X buffer. The equations that determine the bank, page, scanline, block, word, and pixel within each FBRAM chip 130–133 is that given above for the single buffered 1280×1024×8 bit frame buffer of the computer subsystem 300.

For another embodiment, each FBRAM chip 130–133 provides a 320×1024×32 bit frame buffer that accommodates the red, green, blue, and X components of each pixel. The FBRAM chips 130–133 are interleaved on a pixel by pixel basis in the horizontal direction, and together provide an interleaved 1280×1024×32 bit frame buffer. A display frame comprises an 8 wide by 32 high array of page groups in the FBRAM chips 130–133. Each page group is 160 pixels wide by 32 pixels high.

Each DRAM page within a page group of the FBRAM chips 130–133 is 80 pixels wide by 16 pixels high. The DRAM pages are subdivided into 16 scanlines each 80 pixels wide for transfer to the corresponding video buffers for the DRAM banks A–D. One 32 bit pixel is shifted out of the video buffers of each of the four FBRAM chips 130–133 over the video buses 140–143 during two cycles of the video clock 145.

Pixel blocks transferred between the pixel buffer and the DRAM banks A–D over the global bus in each FBRAM chip 130–133 are 2 pixels wide by 4 pixels high. The rendering controller 122 accesses one pixel from a pixel cache block of the pixel buffer in each FBRAM chip 130–133 over each rendering bus 150–153. The pixel ALU in each FBRAM chip 130–133 internally accesses one pixel from a pixel cache block of the corresponding pixel buffer.

The following equations determine the bank, page, scanline, block, word, and pixel for each pixel in each FBRAM chip 130–133.

DRAM bank=2*((y % 32)/16)+(x % 40)/20 page=8*(y/32)+x/40 scanline=y % 16 block=(y % 16)/4+4*((x % 20)/8)

pixel=2*(y % 4)+(x % 2)

Figure 27:
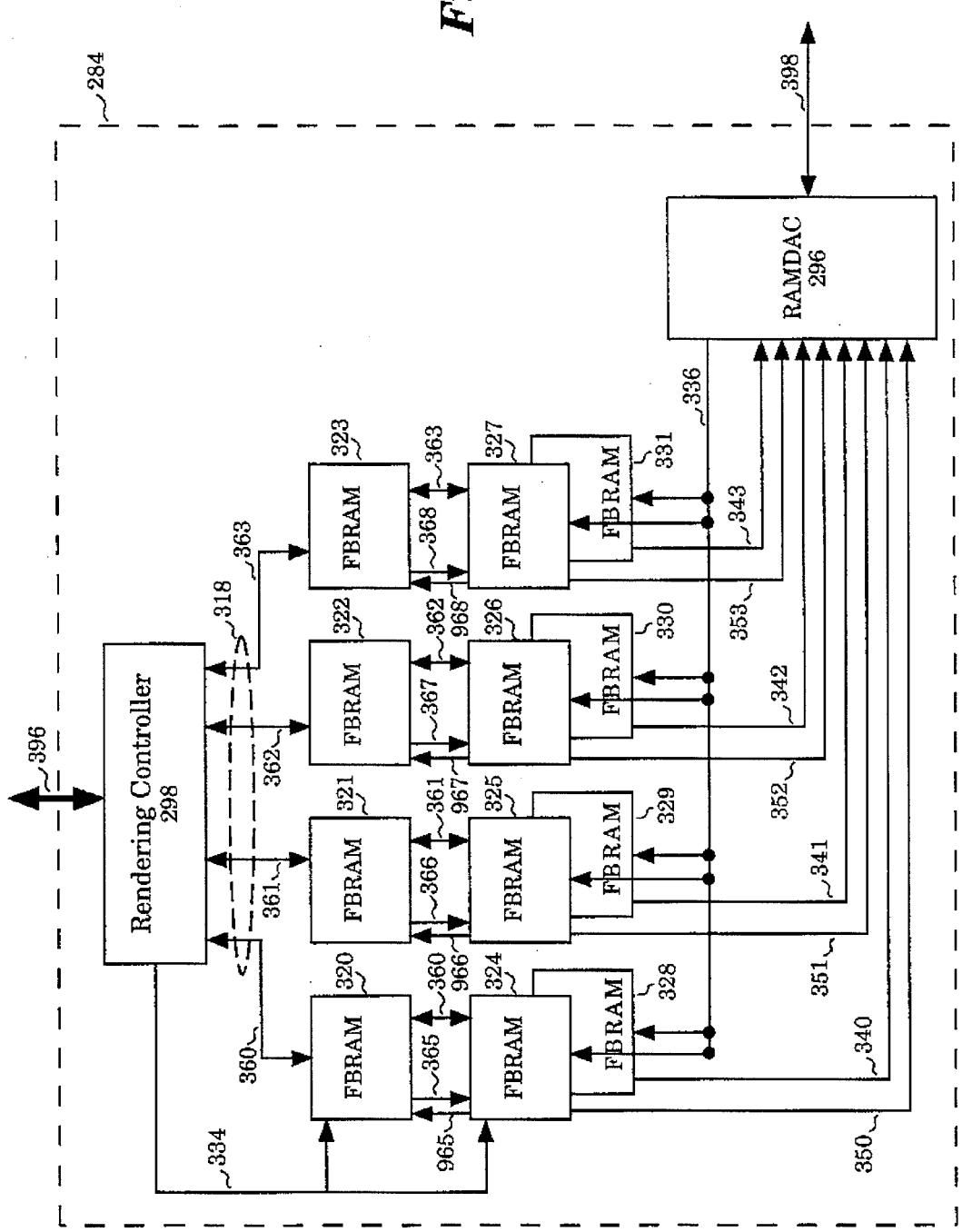
FIG. 27 illustrates a graphics subsystem comprising a rendering controller, a double buffered with a Z buffer frame buffer comprising a set of FBRAM chips, a RAMDAC, and a display device.

FIG. 27 illustrates a graphics subsystem 284. The graphics subsystem 284 comprises a rendering controller 298, a set of FBRAM chips 320–331, and a RAMDAC 296. The FBRAM chips 320–331 are arranged in a 1280×1024×96 bits per pixel frame buffer for the display device 306 including double 32 bit R, G, B, X buffers plus a single 32 bit Z buffer.

The frame buffer provided by the FBRAM chips 320–331 is interleaved in the horizontal direction. The FBRAM chips 320, 324, and 328 comprise a first interleaved portion. The FBRAM chips 321, 325, and 329 provide a second interleaved portion. The FBRAM chips 322, 326, and 330 provide a third interleaved portion, and the FBRAM chips 323, 327, and 331 provide a fourth interleaved portion of the frame buffer. Each interleaved portion of the frame buffer encompasses a 320×1024 portion of the 1280×1024 display image for the display device 306.

Pixel data for the graphics subsystem 284 is double buffered by the FBRAM chips 324–331. The FBRAM chips 324–327 provide a Buffer A and the FBRAM chips 328–331 provide a Buffer B. The FBRAM chips 320–323 provide a Z buffer.

The Buffer A, the Buffer B and the Z buffer each have a depth of 32 bits. The 32 bit depth accommodates an 8 bit red value, an 8 bit green value, an 8 bit blue value and 8 bits of control for overlays, color palette selection, window clipping or blending. The 32 bit depth of the Z buffer provides 28 bits of depth control and 4 bits for additional clipping or stenciling functions.

The rendering controller 298 accesses the FBRAM chips 320–331 over a rendering bus 318. The rendering controller 298 accesses the pixel port control interface, the DRAM control interface, and the video port control interface for the FBRAM chips 320–331 over a control bus 334 coupled to each FBRAM chip 320–331.

For one embodiment, the rendering bus 318 comprises 128 bits including 32 bits for each interleaved portion of the frame buffer. The rendering bus 318 comprises a set of interleaved rendering 360–363. Each interleaved portion of the frame buffer shares 32 bits of pixel data. For example, the FBRAM chips 320, 324, and 328 of the first interleaved portion of the frame buffer share the interleaved rendering bus 360.

For an alternative embodiment, the rendering bus 318 comprises 256 bits including 32 bits for each interleaved portion of the Buffer A and the Buffer B and 32 bits for each of the interleaved Z buffer portions.

The FBRAM chips 320–323 transfer compare results to the corresponding Buffers A and B over a set of compare result signal lines 365–368. For example, the FBRAM chip 320 transfers the compare result through the PA_PASS_OUT pin into the PA_PASS_IN pin of the FBRAM chip 324 and the PA_PASS_IN pin of the FBRAM chip 328 via the compare result signal 365. The PA_PASS_OUT pin of FBRAM chip 324 can also condition the PA_PASS_IN pin of FBRAM chip 320, allowing Buffer A to also condition writes in Buffer C by means of a second compare result signal 965.

The compare units inside the FBRAM chips 320–323 perform depth check functions and additional clipping or stenciling functions and transfer the results to the corresponding Buffers A and B via the compare result signals 365–368. The compare result signals 365–368 in combination with the internal compare results in the Buffer A and the Buffer B of the FBRAM chips 324–331 control the internal writes to the corresponding internal pixel buffers in chips 324–331. The compare unit in Buffer A chips 324–327 can also perform window clipping functions and transfer the results to the corresponding Z buffer chips 320–323 via the compare result signals 965–968. The compare result signals 965–968 in combination with the internal compare results in the Z buffer chips 320–323 control the internal writes in the corresponding internal pixel buffers in chips 320–323.

The FBRAM chips 324–327 transfer video data to the RAMDAC 296 over a set of video busses 350–353 for Buffer A of the frame buffer. The FBRAM chips 328–331 transfer video data to the RAMDAC 296 over a set of video busses 340–343 for the Buffer B of the frame buffer.

The video busses 350–353 and 340–343 comprise 128 bits. The RAMDAC 296 generates a set of video control signals 336 for selecting either video data from the Buffer A or video data from the Buffer B. The Buffer A or the Buffer B is selected on a pixel by pixel basis for window operations.

Figure 28:
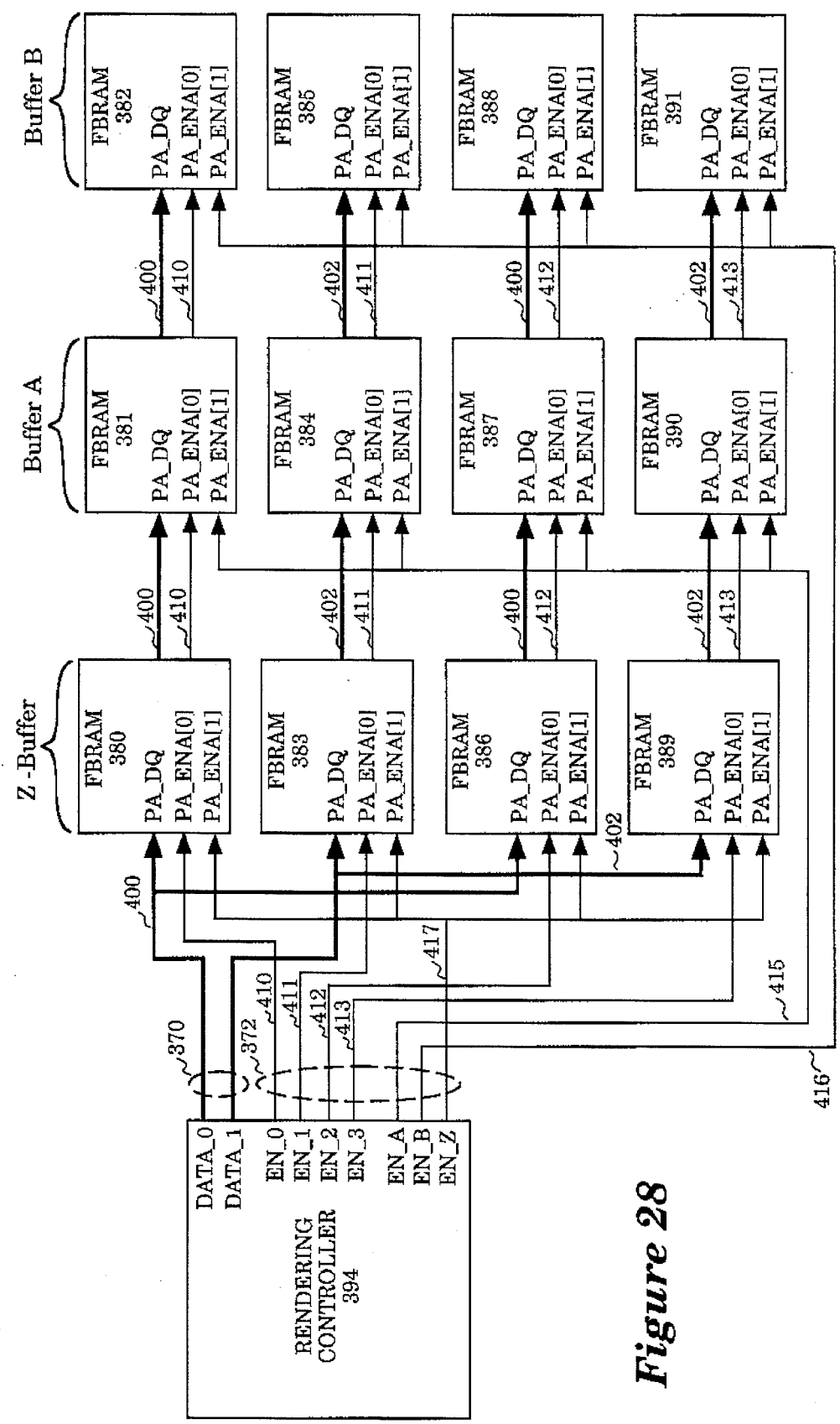
FIG. 28 illustrates pixel port control interconnections for a 32 bit double buffered frame buffer including a Z buffer, wherein the frame buffer comprises a set of FBRAM chips coupled to a rendering controller.

FIG. 28 illustrates pixel port interconnections for a 32 bit double buffered frame buffer including a Z buffer. The frame buffer comprises a set of FBRAM chips 380–391 coupled to a rendering controller 394. The rendering controller 394 accesses pixel data in the FBRAM chips 380–391 over a rendering bus 370. The rendering controller 394 controls the pixel port operations of the FBRAM chips 380–391 over a control bus 372.

The FBRAM chips 380–391 are arranged in a 4-way horizontal interleaved frame buffer. The FBRAM chips 380–382 comprise a first interleave portion of the frame buffer. The FBRAM chips 383–385 comprise a second interleave portion. The FBRAM chips 386–388 comprise a third interleave portion, and the FBRAM chips 389–391 comprise a fourth interleave portion of the frame buffer.

The Buffer A portion of the frame buffer comprises the FBRAM chips 381, 384, 387, and 390. The Buffer B portion of the frame buffer comprises the FBRAM chips 382, 385, 388, and 391. The Z buffer portion of the frame buffer comprises the FBRAM chips 380, 383, 386, and 389.

The rendering bus 370 comprises an interleaved rendering bus 400 and an interleaved rendering bus 402. The interleaved rendering bus 400 and the interleaved rendering bus 402 each comprise 36 bits. The pixel data paths (the PA_DQ signals) of the FBRAM chips 380–382 and 386–388 share the interleaved rendering bus 400. The pixel data paths for the FBRAM chips 383–385 and 389–391 share the interleaved rendering bus 402.

Each FBRAM chip 380–391 is enabled and disabled during data transfers over the rendering bus 370 by the corresponding PA_ENA[0:1] signals. The rendering controller 394 generates a set of interleave enable signals (EN_0 through EN_3). The enable signals EN_0 through EN_3 are coupled to the FBRAM chips 380–391 over a set of enable signal lines 410–413. The enable signals EN_0 through EN_3 from the rendering controller 394 provide the PA_ENA[0] signals for the FBRAM chips 380–391.

The rendering controller 394 generates a set of buffer enable signals EN_A, EN_B and EN_Z. The enable signal EN_A enables and disables the Buffer A, the enable signal EN_B enables and disables the Buffer B, and the enable signal EN_Z enables and disables the Z buffer. An enable signal line 415 couples the EN_A signal to the PA_ENA[1] of the FBRAM chips 381, 384, 387, and 390. An enable signal line 416 couples the EN_B signal to the PA_ENA[1] of the FBRAM chips 382, 385, 388, and 391. An enable signal line 417 couples the EN_Z signal to the PA_ENA[1] of each FBRAM chip 380, 383, 386, and 389.

For any one chip, both PA_ENA[0] and PA_ENA[1] must be activated in order to write or read the chip. Only the chips in the desired interleaves and in the desired buffers will be accessed, as specified by the matrix of signals 410–417.

During Z buffer operations, the enable signals EN_A, EN_B and EN_Z multiplex pixel and Z buffer data over the rendering bus 370. In Z buffer mode, pixel data and Z buffer data for two pixels is transferred over the rendering bus 370 in two clock cycles. In the first clock cycle EN_Z is valid and two 32 bit Z buffer values can be transferred over the interleaved rendering bus 400 and the interleaved rendering bus 402 to the FBRAM chips 380, 383, 386, and 389. During the next clock cycle, EN_A or EN_B or both are valid and two 32 bit color pixel values can be transferred over each of the interleaved rendering busses 400 and 402 to the FBRAM chips 381, 384, 387, and 390 or the FBRAM chips 382, 385, 388, and 391 according to the enable signals EN_A and EN_B.

Figure 29:
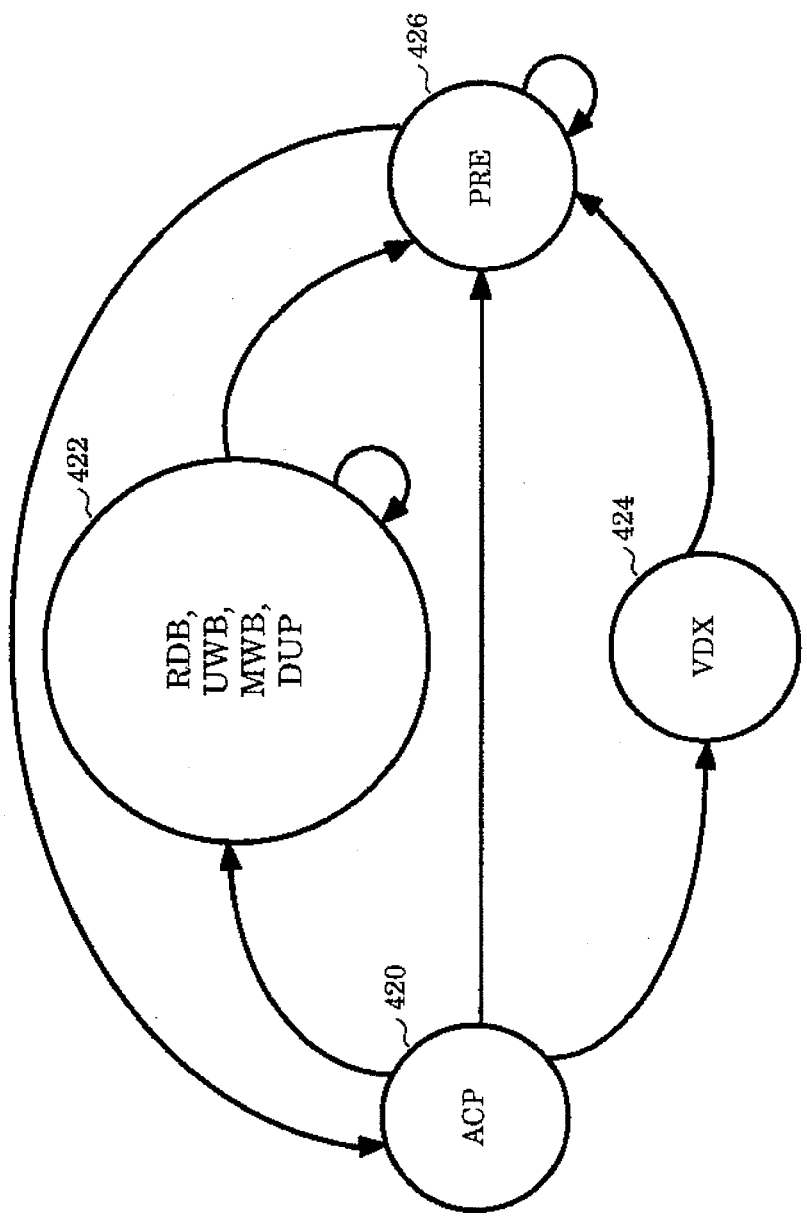
FIG. 29 is a state diagram for DRAM access operations including the access page operation, the video transfer operation, the precharge bank operation, the read block operation, the unmasked write block operation, the masked write block operation, and the duplicate page operation.

FIG. 29 is a state diagram for DRAM access operations issued by the rendering controller 70 to the FBRAM chip 71. The rendering controller 70 implements a set of states 420–426. The DRAM access operations to the FBRAM chip 71 include the access page (ACP) operation, the video transfer (VDX) operation, the precharge (PRE) bank operation, the read block (RDB) operation, the unmasked write block (UWB) operation, the masked write block (MWB) operation, and the duplicate page (DUP) operation. The rendering controller 70 begins each control transaction to a particular page of the DRAM banks A–D with an access page operation to that page.

The rendering controller 70 refreshes a page of one of the DRAM banks A–D by performing an access page operation to that page at state 420, followed by a precharge operation to that page at state 426. The access page operation at state 420 specifies one of the pages of one of the DRAM banks A–D for the refresh page operation. After the precharge operation at state 426 the rendering controller 70 returns to the state 420 in preparation for another control transaction to the DRAM banks A–D.

The rendering controller 70 transfers data from the DRAM banks A–D to the video buffers 52 and 54 by initially performing an access page operation at state 420 to transfer the specified page to the specified page buffers A–D. Thereafter, at state 424 the rendering controller 70 performs a video transfer operation to transfer the accessed data from the specified page buffer A–D to one of the video buffers 52 and 54. The rendering controller 70 then performs a precharge operation at state 426 in preparation for another control transaction to the DRAM banks A–D.

During rendering operations, the rendering controller 70 performs control sequences to the DRAM banks A–D that begin with an access page operation at state 420 and that end with a precharge operation at state 426. Each rendering control sequence includes either a read block operation, a masked or unmasked write block operation, or a duplicate page operation. The rendering controller 70 transitions between the states 420, 422, and 426 back to state 422 during each rendering sequence.

Figure 30:
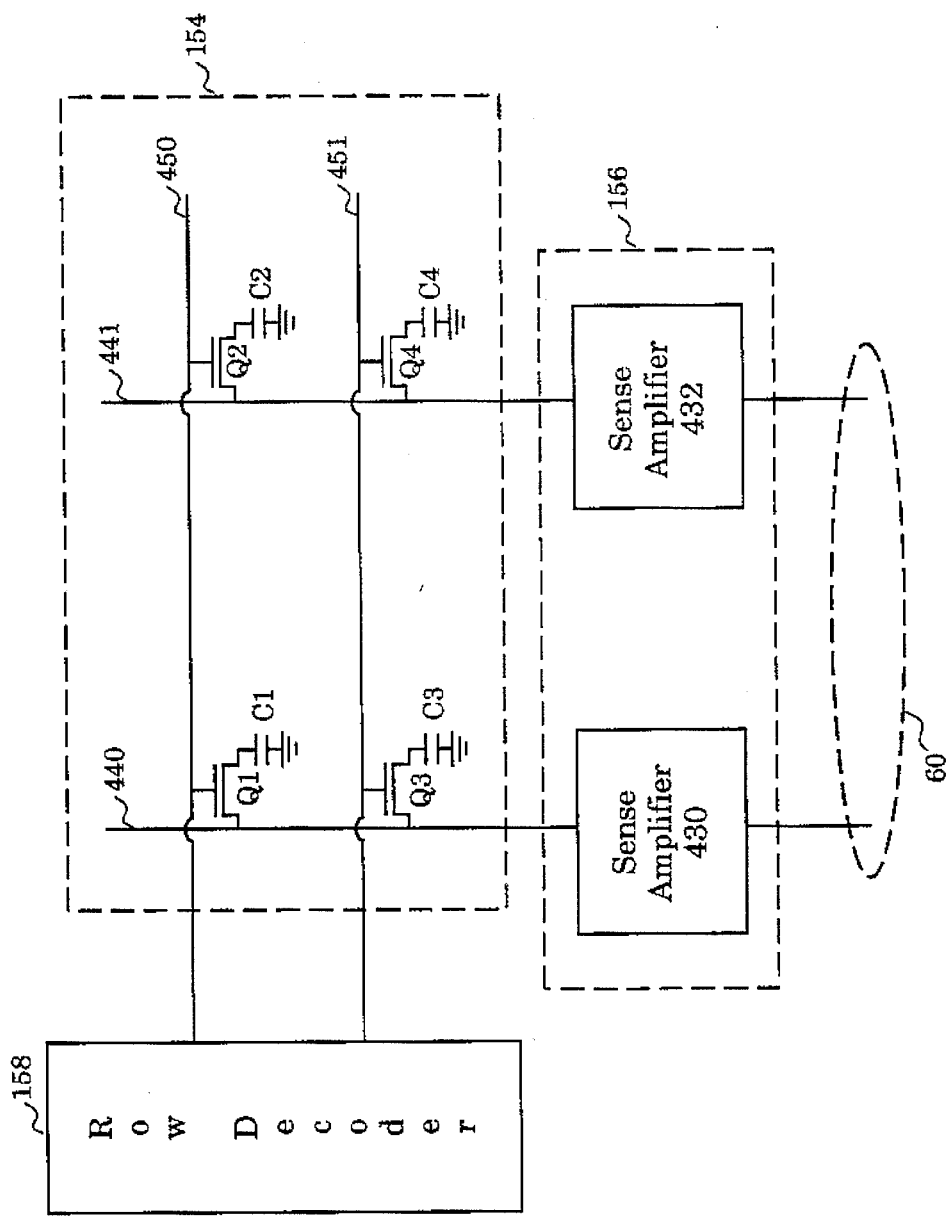
FIG. 30 illustrates interconnections between the DRAM bank A, the page buffer A, and an array of four DRAM cells for one embodiment.

FIG. 30 illustrates interconnections between the DRAM bank A and the page buffer A in the FBRAM chip 71 for one embodiment. An array of four DRAM cells are shown including a DRAM cell comprising a transistor Q1 and a capacitor C1, a DRAM cell comprising a transistor Q2 and a capacitor C2, a DRAM cell comprising a transistor Q3 and a capacitor C3 and a DRAM cell comprising a transistor Q4 and a capacitor C4.

Electrical charge is transferred to and from the DRAM cells of the DRAM array 154 via a set of bit lines 440 and 441. The bit lines 440 transfer charge along a column of the DRAM array 154 to the capacitors C1 and C3. The bit lines 441 transfer charge along another column of the DRAM array 154 to the capacitors C2 and C4. The bit lines 440 comprise a positive bit line and a negative bit line. Similarly, the bit lines 441 comprise a positive bit line and a negative bit line.

A set of sense amplifies 430 and 432 are coupled to the bit lines 440 and 441 respectively. The sense amplifier 430 differentially senses and amplifies the voltage signal on the bit lines 440. The sense amplifier 432 differentially senses and amplifies the voltage signal on the bit lines 441.

The row decoder circuit 158 is coupled to drive a word line for each row of DRAM cells of the DRAM array 154 including a word line 450 and a word line 451. The word line 440 is coupled to the gates of the transistors Q1 and Q2, and the word line 441 is coupled to the gates of the transistors Q3 and Q4.

The row decoder circuit 158 activates each word line 450 and 451 to access the DRAM cells of the corresponding rows. The row decoder circuit 158 activates the word line 450 to switch on the transistors Q1 and Q2. The switched on transistors Q1 and Q2 couples the capacitor C1 to the bit lines 440 and couples the capacitor C2 to the bit lines 441. The activated word line 450 transfers charge between the bit lines 440 and the capacitor C1 and between the bit lines 441 and the capacitor C2. Similarly, the row decoder circuit 158 activates the word line 451 to couple charge between the capacitors C3 and C4 and the bit lines 440 and 441, respectively.

During a precharge operation on the DRAM array 154, the sense amplifier 430 drives the bit lines 440 to a reference voltage level, and the sense amplifier 432 drives the bit lines 441 to the reference voltage level.

During an access page operation, the row decoder circuit 158 deactivates the word lines 450 and 451. The deactivated word lines 450 and 451 decouple the bit lines 440 and 441 from the capacitors C1–C4. As a consequence, the bit lines 440 and 441 are initially floating during an access page operation. Thereafter, the row decoder circuit 158 activates one of the word lines 450 or 451 according to the page specified by the access page operation.

For example, if the row decoder circuit 158 activates the word line 450, the transistors Q1 and Q2 switch on and transfer charge from the capacitors C1 and C2 onto the bit lines 440 and 441, respectively. The sense amplifier 430 differentially senses and amplifies the voltages on the bit lines 440. The sense amplifier 432 differentially senses and amplifies the voltages on the bit lines 441. The sense amplifiers 430 and 432 drive the bit lines 440 and 441 to the full rail voltage levels. The full rail voltage levels on the bit lines 440 and 441 are driven back into the capacitors C1 and C2 through the transistors Q1 and Q2 to refresh the corresponding DRAM cells.

Figure 31:
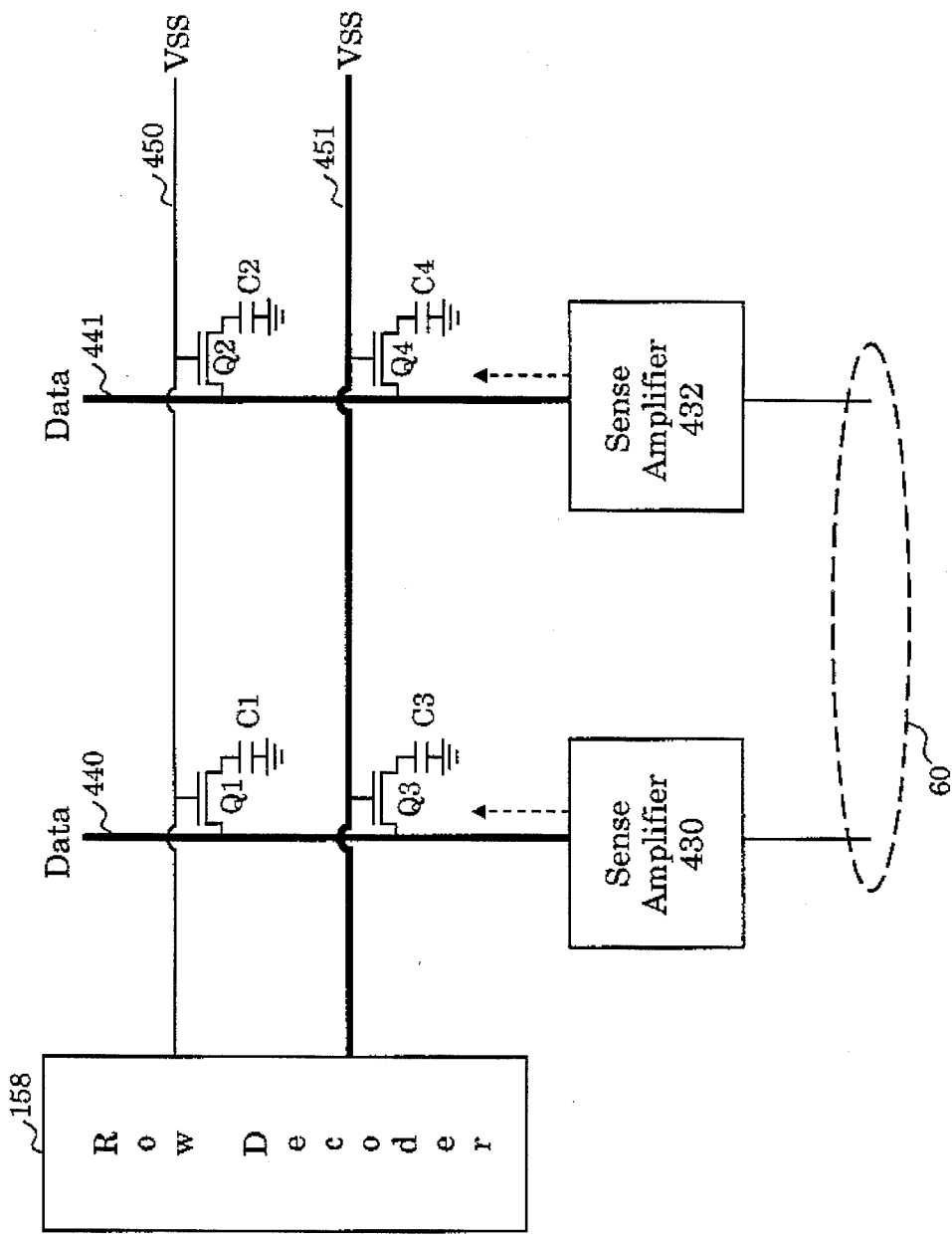
FIG. 31 illustrates the start of a duplicate page operation for one embodiment.
Figure 32:
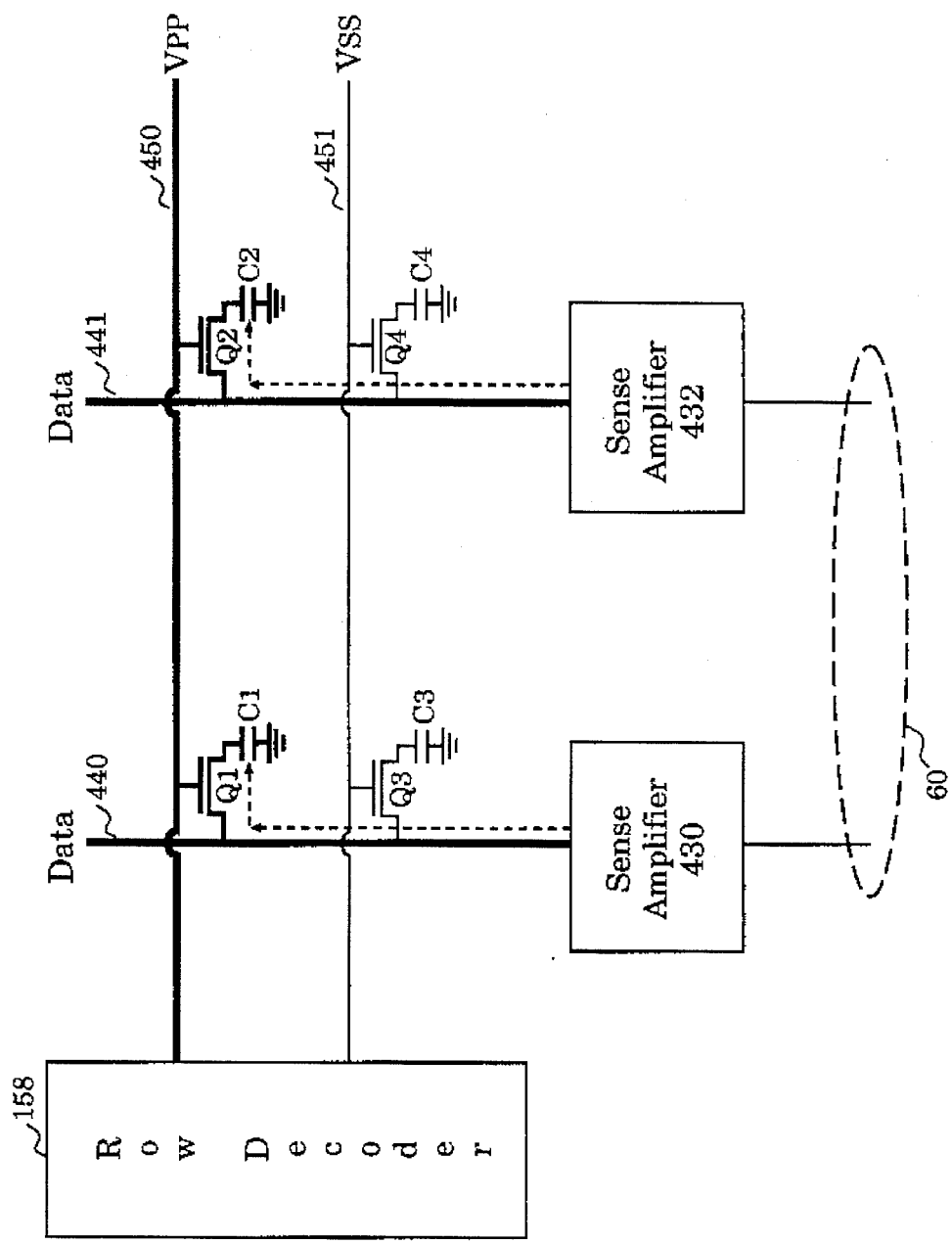
FIG. 32 illustrates the completion of the duplicate page operation for one embodiment.

FIGS. 31 and 32 illustrate a duplicate page operation for the DRAM bank A and the page buffer A in the FBRAM chip 71 for one embodiment. The rendering controller 70 initiates a duplicate page operation after an access page operation or after a prior duplicate page operation. At the start of a duplicate page operation, one of the word lines 450 or 451 is driven by the row decoder circuit 158 according to the preceding access page operation or duplicate page operation.

FIG. 31 illustrates the start of a duplicate page operation. The row decoder circuit 158 drives the word line 451 at the start of the duplication page operation. The activated word line 451 couples the capacitors C3 and C4 to the bit lines 440 and 441, respectively. The sense amplifiers 430 and 432 drive the full rail voltage of the data for the preceding access page or duplicate page operation onto each of the bit lines 440 and 441. The data on the bit lines 440 and 441 is transferred on to the capacitors C3 and C4 respectively.

FIG. 32 illustrates the completion of the duplicate page operation. The row decoder circuit 158 deactivates the word line 451 and activates the word line 450 to complete the duplicate page operation. The row decoder circuit 158 activates the word line 450 while data for the preceding access page or duplicate page operation is driven on the bit lines 440 and 441 by the sense amplifiers 430 and 432. The activated word line 450 switches on the transistors Q1 and Q2 and transfers the data on the bit lines 440 and 441 onto the capacitors C1 and C2.

Figure 33:
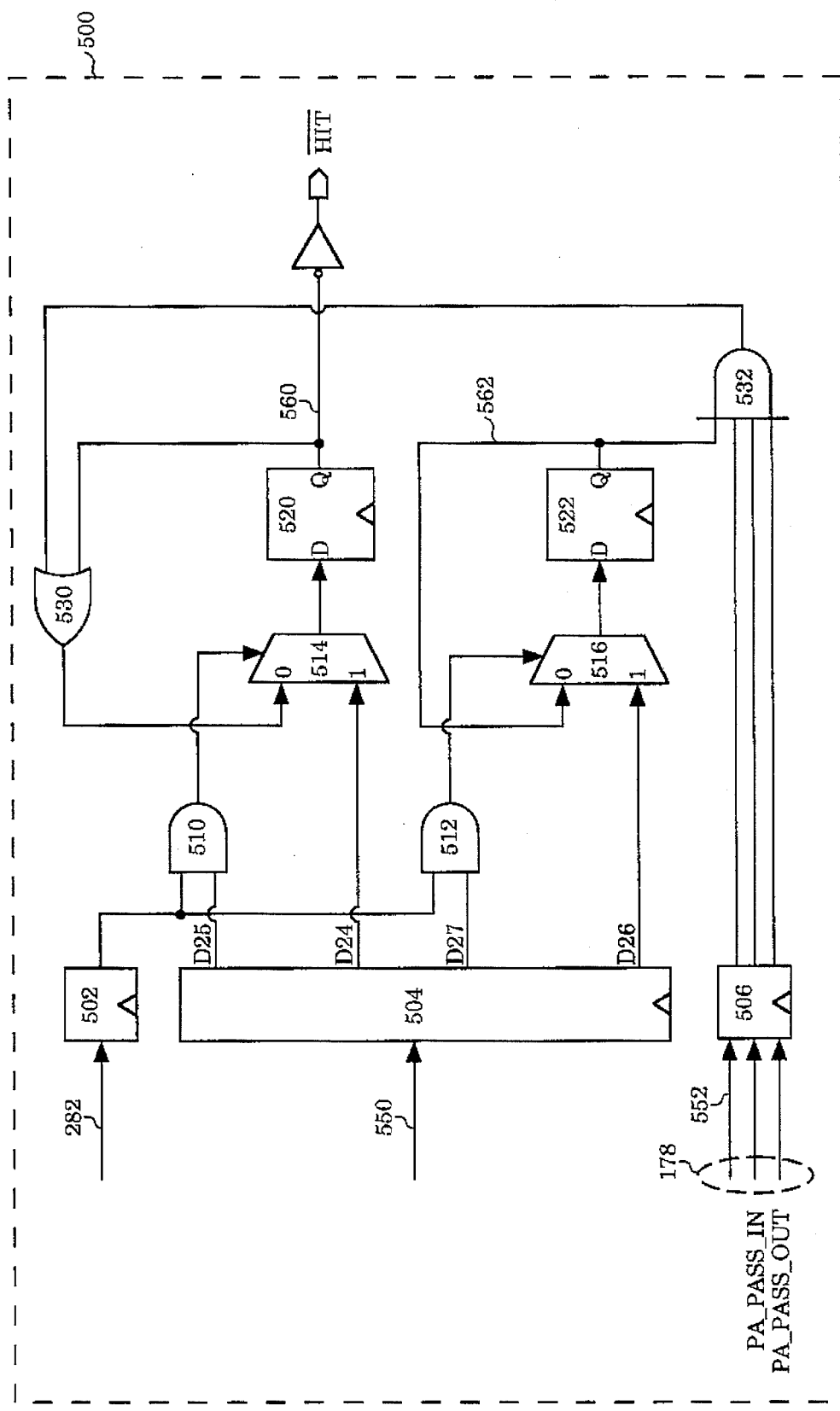
FIG. 33 illustrates the picking logic in an FBRAM chip which comprises a set of Stage 7 pipeline registers, a HIT flag latch, a pick enable latch, of multiplexers, and a set of logic gates.

FIG. 33 illustrates the picking logic 500 in the FBRAM chip 71. The picking logic 500 comprise a set of Stage 7 pipeline registers 502–506, a HIT flag latch 520, a pick enable latch 522, a pair of multiplexers 514 and 516, and a set of logic gates 510, 512, 530, and 532.

The register 502 buffers the load compare control signal 282 from the pixel port control circuit 114. The register 504 buffers bits 27..24 of the compare control register 268 via the signals 550. The register 506 buffers the PA_PASS_IN and the PA_PASS_OUT signals and a statefull write enable signal 552 from the pixel port control circuit 114.

The HIT flag register 520 provides a HIT flag 560. The pick enable register 522 provides a pick enable signal 562. The HIT flag signal 560 drives an output pin of the FBRAM chip 71 $\overline{\text{HIT}}$. Bits 27..24 of the compare control register 268 control the picking logic 500. Bits 24 and 25 of the compare control register 268 set/clear the HIT flag 560. Bits 26 and 27 of the compare control register 268 enable/disable the picking logic 500. The rendering controller 70 writes a 10 to bits 25..24 to clear the HIT flag 560. The rendering controller 70 writes a 11 to bits 25..24 to set the HIT flag 560. The rendering controller writes a 0 to bit 25 to allow the HIT flag to remain unchanged except by pick hits. The rendering controller 70 writes a 10 to bits 27..26 to disable the picking logic 500, and writes a 11 to bits 27..26 to enable the picking logic 500. The rendering controller writes a 0 to bit 27 to allow the pick enable state to remain unchanged.

The $\overline{\text{HIT}}$ output pin of the FBRAM chip 71 is an open drain low active output signal that reflects the result of the picking function of the FBRAM chip 71. The rendering controller 70 initially enables the picking logic 500 and clears the HIT flag 560. The $\overline{\text{HIT}}$ output pin of the FBRAM chip 71 is valid seven cycles later during pipeline Stage 8. A statefull write operation issued by the rendering controller 70 after a write compare control register operation to clear the HIT flag 560 asserts the output pin of the FBRAM chip 71 low if the PA_PASS_IN signal and the PA_PASS_OUT signals both indicate pass at pipeline Stage 6.

Figure 34:
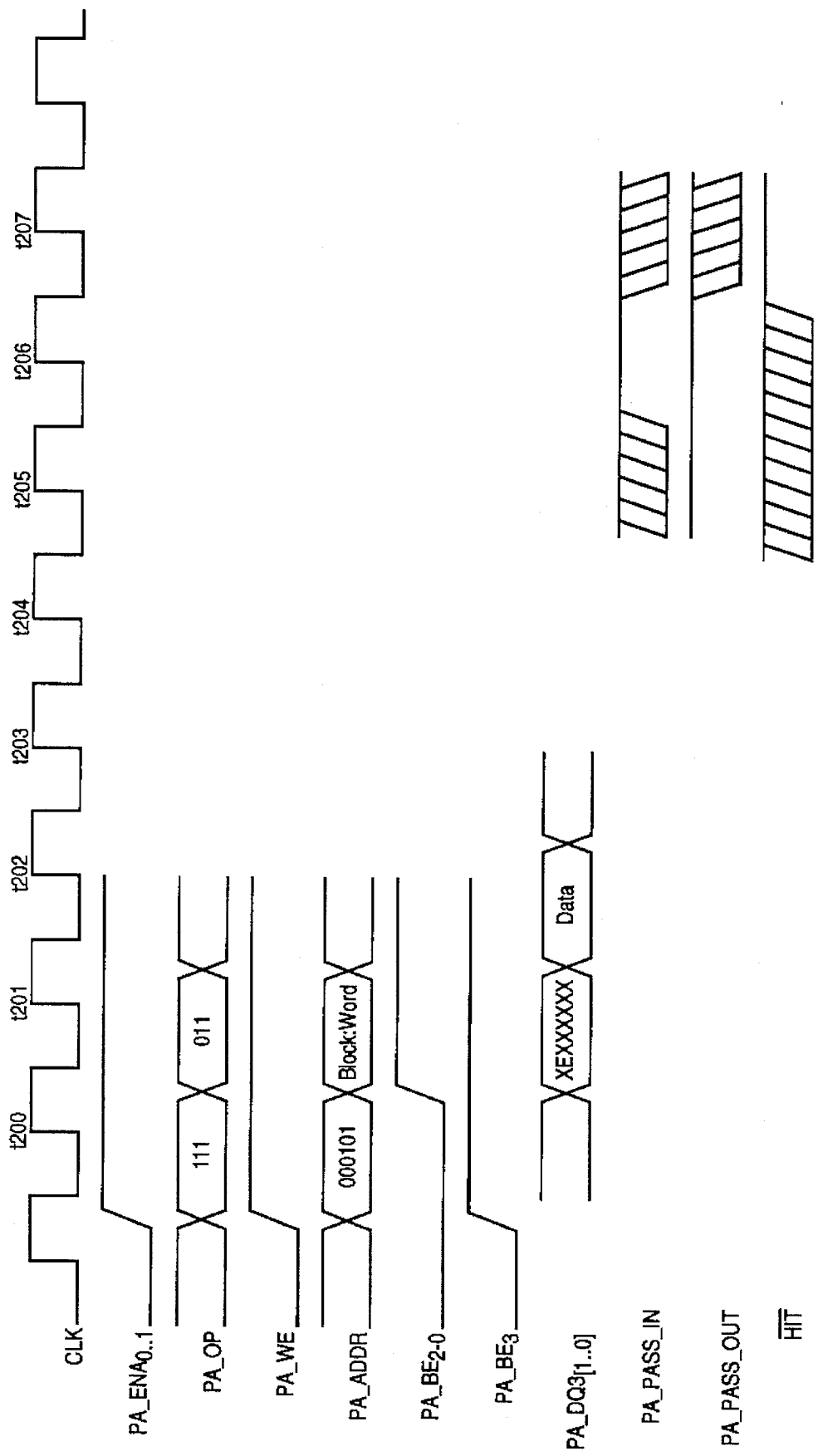
FIG. 34 illustrates the timing of the picking logic in relation to rendering bus activity and shows the timing of the HIT output pin.

FIG. 34 illustrates the timing of the picking logic 500. At time t200, the rendering controller 70 issues a write control register operation over the interleaved rendering bus 64 targeted for the compare control register 268. At time t201, the rendering controller 70 issues a statefull normal data write operation to the block and word indicated via the PA_ADDR signals. Also at time t201, the rendering controller 70 transfers register data via the PA_DQ signals for the write compare control register operation launched at time t200.

The register data transferred via the PA_DQ signals at time t201 enables the picking logic 500 and clears the HIT flag 560. Thereafter, at time t202 the rendering controller 70 transfers the data for the statefull normal data write operation (launched during the previous cycle) via the PA_DQ signals. At time t206, the PA_PASS_IN and the PA_PASS_OUT signals both indicate a pass condition, and at time t207 the $\overline{\text{HIT}}$ output pin of the FBRAM chip 71 provides a valid HIT flag.

The picking logic 500 is used to determine the rendered objects that are visible in a defined region of a display screen. The picking function is often used to select objects for highlighting or editing after a pointing device is positioned to point to a particular spot on the display. The location of the spot is used to define the center of a small area called the pick aperture.

A rendering controller is programmed to redraw the display frame and clip away all objects that do not fall within the pick aperture. Only those objects which contribute pixels in the pick aperture, and having pixels that pass the internal compare tests cause statefull writes to the pixel buffer and set the HIT flag. If the pick HIT flag is cleared before each object is drawn, and if the rendering controller tests the HIT flag after each object is drawn, then the HIT flag is set only for objects which have visible pixels in the pick aperture. The HIT output pin of an FBRAM chip is an open drain output in one embodiment that enables the HIT results from multiple FBRAM chips to be wire-ORed using a single signal.

Bits 27 and 26 of the compare control register in the FBRAM chip provide enable/disable control of the picking logic. The enable/disable function is useful to eliminate certain objects from the picking test, and to allow multiple processes to share the picking logic in a multitasking system.

Bits 25 and 24 of the compare control register provide the ability to preset or clear the HIT flag. The preset/clear function combined with the HIT status via the HIT pin, provides a mechanism for saving and restoring the state of the HIT status of swapped processes that share the picking logic in a multitasking system.

In the foregoing specification the invention has been described with reference to specific exemplary embodiments thereof it will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A frame buffer memory, comprising:

memory array for buffering a set of pixel data that defines an image for display on a display device, the memory array arranged as a set of memory banks, each memory bank comprising a set of memory cells and a set of sense amplifiers coupled to access the memory cells;

pixel cache coupled to access the sense amplifiers of each memory bank, the pixel cache comprising a plurality of pixel cache blocks and a set of dirty tag bits corresponding to each pixel cache block;

pixel ALU coupled to the pixel cache and coupled to a rendering bus;

memory access circuit coupled to the memory array and to the pixel cache, the memory access circuit coupled to receive a memory access request that specifies a memory access function and one of the memory banks, the memory access circuit having circuitry for initiating the memory access function according to the memory access request;

pixel access circuit coupled to the pixel cache and coupled to receive a pixel access request that specifies one of the pixel cache blocks, the pixel access circuit having circuitry for initiating a pixel access over the rendering bus to the pixel cache according to the pixel access request.

2. The frame buffer memory of claim 1, wherein the memory access circuit initiates the memory access function while the pixel access circuit initiates the pixel access.

3. The frame buffer memory of claim 2, wherein the memory access function is a precharge bank operation that precharges the sense amplifiers of the memory bank specified by the memory access request.

4. The frame buffer memory of claim 2, wherein the memory access function is a duplicate page operation that transfers data from the sense amplifiers to the memory cells of a page of the memory bank specified by the memory access request.

5. The frame buffer memory of claim 2, wherein the memory access function is an access page operation that transfers data from the memory cells of a page of the memory bank specified by the memory access request to the sense amplifiers for the memory bank specified by the memory access request.

6. The frame buffer memory of claim 2, wherein the memory access function is an unmasked write block operation that transfers data from a pixel cache block specified by the memory access request to the sense amplifiers for the memory bank specified by the memory access request.

7. The frame buffer memory of claim 2, wherein the memory access function is a read block operation that transfers data from the sense amplifiers for the memory bank specified by the memory access request to a pixel cache block specified by the memory access request.

8. The frame buffer memory of claim 2, further comprising a plane mask register coupled to receive and store a set of plane mask bits.

9. The frame buffer memory of claim 8, wherein the memory access function is a masked write block operation that transfers data from a pixel cache block specified by the memory access request to the sense amplifiers for the memory bank specified by the memory access request such that the plane mask bits determine a bitwise write mask into the sense amplifiers.

10. The frame buffer memory of claim 9, wherein the memory access function is a video transfer operation that transfers a portion of a raster display scan line from the sense amplifiers for the memory bank specified by the memory access request to a serial video buffer that shifts the portion of the raster display scan line to a raster display device.

11. The frame buffer memory of claim 9, wherein the serial video buffer comprises a pair of serial video buffers each coupled to receive the portion of the raster display scan line from different memory banks.

12. The frame buffer memory of claim 8, further comprising a dirty tags memory for storing a set of dirty tag bits corresponding to each pixel cache block.

13. The frame buffer memory of claim 10, wherein the pixel access function merges a set of new dirty tag bits with a set of old dirty tag bits in the pixel cache.

14. The frame buffer memory of claim 10, wherein the memory access function is an unmasked write block operation that transfers data from a pixel cache block specified by the memory access request to the sense amplifiers for the memory bank specified by the memory access request such that the dirty tag bits determine a bitwise write mask into the sense amplifiers.

15. The frame buffer memory of claim 10, wherein the memory access function is a masked write block operation that transfers data from a pixel cache block specified by the memory access request to the sense amplifiers for the memory bank specified by the memory access request such that the plane mask bits and the dirty tag bits determine a bitwise write mask into the sense amplifiers.

16. The frame buffer memory of claim 10, wherein the pixel access is a read operation that reads a data value from the pixel cache block specified by the pixel access request and transfers the data value over the rendering bus.

17. The frame buffer memory of claim 10, wherein the pixel access is a stateless initial data write operation that writes a data value received over the rendering bus into the pixel cache block specified by the pixel access request and that sets the dirty tag bits specified by an address of the pixel access request and by a set of write enable signals received with the data value and that clears a set of remaining dirty tag bits in the pixel cache block specified by the pixel access request.

18. The frame buffer memory of claim 10, wherein the pixel access is a stateless normal data write operation that writes a data value received over the rendering bus into the pixel cache block specified by the pixel access request and that sets the dirty tag bits corresponding to the pixel cache block specified by the pixel access request according to a set of write enable signals received with the data value.

19. The frame buffer memory of claim 10, wherein the pixel access is a statefull initial data write operation that generates a new pixel data value by combining a data value received over the rendering bus with an old pixel data value from the pixel cache block specified by the pixel access request and that writes the new pixel value into the pixel cache block specified by the pixel access request and that sets the dirty tag bits specified by an address of the pixel access request and by a set of write enable signals received with the data value and that clears a set of remaining dirty tag bits in the pixel cache block specified by the pixel access request.

20. The frame buffer memory of claim 10, wherein the pixel access is a statefull normal data write operation that generates a new pixel data value by combining a data value received over the rendering bus with an old pixel data value from the pixel cache block specified by the pixel access request and that writes the new pixel value into the pixel cache block specified by the pixel access request and that sets the dirty tag bits corresponding to the pixel cache block specified by the pixel access request according to set of write enable signals received with the data value.

21. A method for accessing pixel data in a frame buffer random access memory device including, comprising the steps of:

receiving a memory access request that specifies a memory access function and one of a set of memory banks of a memory array, each memory bank comprising a set of memory cells for buffering a set of pixel data that defines an image for display on a display device;

receiving a pixel access request that specifies one of a plurality of pixel cache blocks in a pixel cache;

performing the memory access function according to the memory access request while performing a pixel access to the pixel cache according to the pixel access request.

22. The method of claim 21, wherein the memory access function is a precharge bank operation that precharges a set of sense amplifiers for the memory bank specified by the memory access request.

23. The method of claim 21, wherein the step of performing the memory access function according to the memory access request comprises the step of performing a duplicate page operation by transferring data from a set of sense amplifiers to the memory cells of a page of the memory bank specified by the memory access request.

24. The method of claim 21, wherein the step of performing the memory access function according to the memory access request comprises the step of performing an access page operation by transferring data from the memory cells of a page of the memory bank specified by the memory access request to a set of sense amplifiers for the memory bank specified by the memory access request.

25. The method of claim 21, wherein the step of performing the memory access function according to the memory access request comprises the step of performing an unmasked write block operation by transferring data from a pixel cache block specified by the memory access request to a set of sense amplifiers for the memory bank specified by the memory access request.

26. The method of claim 21, wherein the step of performing the memory access function according to the memory access request comprises the step of performing a read block operation by transferring data from a set of sense amplifiers for the memory bank specified by the memory access request to a pixel cache block specified by the memory access request.

27. The method of claim 21, wherein the step of performing the memory access function according to the memory access request comprises the step of performing a masked write block operation by transferring data from a pixel cache block specified by the memory access request to a set of sense amplifiers for the memory bank specified by the memory access request such that a set of plane mask bits determine a bitwise write mask into the sense amplifiers.

28. The method of claim 21, wherein the step of performing the memory access function according to the memory access request comprises the step of performing an unmasked write block operation by transferring data from a pixel cache block specified by the memory access request to a set of sense amplifiers for the memory bank specified by the memory access request such that a set of dirty tag bits determine a bitwise write mask into the sense amplifiers.

29. The method of claim 21, wherein the step of performing the memory access function according to the memory access request comprises the step of performing a masked write block operation by transferring data from a pixel cache block specified by the memory access request to a set of sense amplifiers for the memory bank specified by the memory access request such that a set of plane mask bits and a set of dirty tag bits determine a bitwise write mask into the sense amplifiers.

30. The method of claim 21, wherein the step of performing a pixel access to the pixel cache according to the pixel access request comprises the step of performing a read operation by reading a data value from the pixel cache block specified by the pixel access request.

31. The method of claim 21, wherein the step of performing a pixel access to the pixel cache according to the pixel access request comprises the step of performing a stateless initial data write operation by writing a data value into the pixel cache block specified by the pixel access request and setting the dirty tag bits specified by an address of the pixel access request and by a set of write enable signals received with the data value and clearing a set of remaining dirty tag bits in the pixel cache block specified by the pixel access request.

32. The method of claim 21, wherein the step of performing a pixel access to the pixel cache according to the pixel access request comprises the step of performing a stateless normal data write operation by receiving a data value and a set of write enables signals for the data value, and by Writing the data value into the pixel cache block specified by the pixel access request and setting a set of dirty tag bits corresponding to the pixel cache block specified by the pixel access request according to the write enable signals.

33. The method of claim 21, wherein the step of performing a pixel access to the pixel cache according to the pixel access request comprises the step of performing a statefull initial data write operation by receiving a data value and generating a new pixel value by combining the data value with an old pixel data value from the pixel cache block specified by the pixel access request, and then writing the new pixel value into the pixel cache block specified by the pixel access request and setting the dirty tag bits specified by an address of the pixel access request and by a set of write enable signals received with the data value and clearing a set of remaining dirty tag bits in the pixel cache block specified by the pixel access request.

34. The method of claim 21, wherein the step of performing a pixel access to the pixel cache according to the pixel access request comprises the step of performing a statefull normal data write operation by receiving a data value and generating a new pixel value by combining the data value with an old pixel data value from the pixel cache block specified by the pixel access request and then writing the new pixel value into the pixel cache block specified by the pixel access request and setting the dirty tag bits corresponding to the pixel cache block specified by the pixel access request according to a set of write enable signals received with the data value.

35. A computer system, comprising:

processor coupled to transfer a set of graphics data over a system bus, the graphics data corresponding to an image for display on a display device;

rendering controller coupled to receive the graphics data over the system bus, the rendering controller coupled to transfer a memory access request, a pixel access request, and a pixel value over a rendering bus;

frame buffer memory device comprising a memory array arranged as a set of memory banks, and a pixel cache comprising a plurality of pixel cache blocks, the frame buffer memory device coupled to receive the memory access request that specifies one of the memory banks, and coupled to receive the pixel access request that specifies one of the pixel cache blocks, the frame buffer memory device having circuitry for performing a memory access function according to the memory access request, and circuitry for performing a pixel access over the rendering bus to the pixel cache according to the pixel access request.

36. The computer system of claim 35, wherein each memory bank comprises a set of memory cells and a set of sense amplifiers coupled to access the memory cells, and wherein the pixel cache further comprises a set of dirty tag bits corresponding to each pixel cache block.

37. The computer system of claim 36, wherein the frame buffer memory device performs the memory access function while performing the pixel access.

38. The computer system of claim 36, wherein the memory access function is a precharge bank operation that causes the frame buffer memory device to precharge the sense amplifiers of the memory bank specified by the memory access request.

39. The computer system of claim 36, wherein the memory access function is a duplicate page operation that causes the frame buffer memory device to transfer data from the sense amplifiers to the memory cells of a page of the memory bank specified by the memory access request.

40. The computer system of claim 36, wherein the memory access function is an access page operation that causes the frame buffer memory device to transfer data from the memory cells of a page of the memory bank specified by the memory access request to the sense amplifiers for the memory bank specified by the memory access request.

41. The computer system of claim 36, wherein the memory access function is an unmasked write block operation that causes the frame buffer memory device to transfer data from a pixel cache block specified by the memory access request to the sense amplifiers for the memory bank specified by the memory access request.

42. The computer system of claim 36 wherein the memory access function is a read block operation that causes the frame buffer memory device to transfer data from the sense amplifiers for the memory bank specified by the memory access request to a pixel cache block specified by the memory access request.

43. The computer system of claim 36, wherein the frame buffer memory device further comprises a plane mask register coupled to receive and store a set of plane mask bits from the rendering controller over the rendering bus.

44. The computer system of claim 43, wherein the memory access function is a masked write block operation that causes the frame buffer memory device to transfer data from a pixel cache block specified by the memory access request to the sense amplifiers for the memory bank specified by the memory access request such that the plane mask bits determine a bitwise write mask into the sense amplifiers.

45. The computer system of claim 43, wherein the frame buffer memory device further comprises a dirty tags memory for storing a set of dirty tag bits corresponding to each pixel cache block.

46. The computer system of claim 45, wherein the memory access function is an unmasked write block operation that causes the frame buffer memory device to transfer data from a pixel cache block specified by the memory access request to the sense amplifiers for the memory bank specified by the memory access request such that the dirty tag bits determine a bitwise write mask into the sense amplifiers.

47. The computer system of claim 45, wherein the memory access function is a masked write block operation that causes the frame buffer memory device to transfer data from a pixel cache block specified by the memory access request to the sense amplifiers for the memory bank specified by the memory access request such that the plane mask bits and the dirty tag bits determine a bitwise write mask into the sense amplifiers.

48. The computer system of claim 45, wherein the pixel access is a read operation that causes the frame buffer memory device to read a data value from the pixel cache block specified by the pixel access request and transfer the data value over the rendering bus.

49. The computer system of claim 45, wherein the pixel access is a stateless initial data write operation that causes the frame buffer memory device to write a data value received over the rendering bus into the pixel cache block specified by the pixel access request and clear the dirty tag bits corresponding to the pixel cache block specified by the pixel access request.

50. The computer system of claim 45, wherein the pixel access is a stateless normal data write operation that causes the frame buffer memory device to write a data value received over the rendering bus into the pixel cache block specified by the pixel access request and set the dirty tag bits corresponding to the pixel cache block specified by the pixel access request according to a set of write enable signals received with the data value over the rendering bus.

51. The computer system of claim 45, wherein the pixel access is a statefull initial data write operation that causes the frame buffer memory device to generate a new pixel data value by combining a data value received over the rendering bus with an old pixel data value from the pixel cache block specified by the pixel access request and by writing the new pixel value into the pixel cache block specified by the pixel access request and by clearing the dirty tag bits corresponding to the pixel cache block specified by the pixel access request.

52. The computer system of claim 45, wherein the pixel access is a statefull normal data write operation that causes the frame buffer memory device to generate a new pixel data value by combining a data value received over the rendering bus with an old pixel data value from the pixel cache block specified by the pixel access request and by writing the new pixel value into the pixel cache block specified by the pixel access request and by setting the dirty tag bits corresponding to the pixel cache block specified by the pixel access request according to set of write enable signals received with the data value over the rendering bus.

53. A frame buffer memory device, comprising:

dynamic random access memory (DRAM) array comprising a plurality of DRAM cells for buffering a set of pixel data that defines an image for display on a display device;

sense amplifiers coupled to the DRAM cells of the DRAM array circuitry for transferring the pixel data from a first page of the DRAM array to the sense amplifiers according to an access page command received over a rendering bus;

circuitry for transferring the pixel data from the sense amplifiers to a second page of the DRAM array according to a duplicate page command received over the rendering bus.

54. The frame buffer memory device of claim 53, wherein the first and second pages are specified by a set of pixel address signals received by the frame buffer memory device over the rendering bus.

55. The frame buffer memory device of claim 53, wherein the DRAM array is arranged as a set of DRAM banks.

56. The frame buffer memory device of claim 55, wherein the first and second pages are located in the DRAM banks that are specified by the pixel address signals.

57. A method for performing block fill operations in a frame buffer, comprising the steps of:

receiving an access page command over a rendering bus, the access page command specifying a first page of a dynamic random access memory (DRAM) array;

transferring a set of pixel data from the first page of the DRAM array to a set of sense amplifiers;

receiving duplicate page command over the rendering bus, the duplicate page command specifying a second page of the DRAM array;

transferring the pixel data from the sense amplifiers to the second page of the DRAM array.

58. The method of claim 57, wherein the DRAM array comprises a plurality of DRAM banks and wherein the access page command specifies one of the DRAM banks.

59. The method of claim 58, wherein the step of transferring a set of pixel data from the first page of the DRAM array to a set of sense amplifiers comprises the step of transferring the pixel data from the first page in the DRAM bank specified by the access page command to the sense amplifiers.

60. The method of claim 57, wherein the DRAM array comprises a plurality of DRAM banks and wherein the duplicate page command specifies one of the DRAM banks.

61. The method of claim 57, wherein the step of transferring the pixel data from the sense amplifiers to the second page of the DRAM array comprises the step of transferring the pixel data from the sense amplifiers to the second page in the DRAM bank specified by the duplicate page command.

* * * * *

UNITED STATES PATENT AND TRADEMARK OFFICE
CERTIFICATE OF CORRECTION

PATENT NO. : 5,544,306
DATED : August 6, 1996
INVENTOR(S) : Deering et al.

Page 1 of 1

It is certified that error appears in the above-identified patent and that said Letters Patent is hereby corrected as shown below:

Title page,
*Attorney, Agent, or Firm*, please delete "Blakey" and insert -- Blakely --.

Column 5,
Line 31, please delete "a pick enable latch, of multiplexers" and insert -- a pick enable latch, a pair of multiplexers --.

Signed and Sealed this

Fifth Day of March, 2002

*Attest:*

JAMES E. ROGAN
*Attesting Officer*     Director of the United States Patent and Trademark Office